United States Patent [19]
Lee et al.

[11] Patent Number: 5,748,789
[45] Date of Patent: May 5, 1998

[54] TRANSPARENT BLOCK SKIPPING IN OBJECT-BASED VIDEO CODING SYSTEMS

[75] Inventors: Ming-Chieh Lee, Bellevue; Wei-ge Chen, Redmond, both of Wash.

[73] Assignee: Microsoft Corporation, Redmond, Wash.

[21] Appl. No.: 741,949

[22] Filed: Oct. 31, 1996

[51] Int. Cl.$^6$ .................................................. G06K 9/00
[52] U.S. Cl. ................................ 382/243; 382/239
[58] Field of Search ............................ 382/108, 164, 382/165, 166, 170, 173, 181, 190, 195, 199, 203, 209, 224, 232, 233, 234, 235, 236, 238, 239, 240, 241, 242, 243, 244, 248, 251, 282, 308, 197; 395/133; 348/415, 14, 416, 402, 384, 403, 407, 420; 358/462, 261.3; 345/139

[56] References Cited

U.S. PATENT DOCUMENTS

| | | | |
|---|---|---|---|
| 3,873,972 | 3/1975 | Levine | 340/146.3 AC |
| 4,727,365 | 2/1988 | Bunker et al. | 340/728 |
| 4,745,633 | 5/1988 | Waksman et al. | 382/56 |
| 4,751,742 | 6/1988 | Meeker | 382/41 |
| 4,754,492 | 6/1988 | Malvar | 382/41 |
| 4,802,005 | 1/1989 | Kondo | 358/135 |
| 4,912,549 | 3/1990 | Altman et al. | 358/17 |
| 4,999,705 | 3/1991 | Puri | 358/136 |
| 5,020,121 | 5/1991 | Rosenberg | 382/56 |
| 5,067,014 | 11/1991 | Bergen et al. | 358/105 |
| 5,070,465 | 12/1991 | Kato et al. | 395/141 |
| 5,086,477 | 2/1992 | Yu et al. | 382/8 |
| 5,103,306 | 4/1992 | Weiman et al. | 358/133 |
| 5,117,287 | 5/1992 | Koike et al. | 358/133 |
| 5,148,497 | 9/1992 | Pentland et al. | 382/54 |
| 5,155,594 | 10/1992 | Bernstein et al. | 358/136 |
| 5,214,504 | 5/1993 | Toriu et al. | 358/105 |
| 5,251,030 | 10/1993 | Tanaka | 358/136 |
| 5,258,836 | 11/1993 | Murata | 358/136 |
| 5,259,040 | 11/1993 | Hanna | 382/41 |
| 5,294,979 | 3/1994 | Patel et al. | 348/624 |
| 5,295,201 | 3/1994 | Yokohama | 382/48 |
| 5,329,311 | 7/1994 | Ward et al. | 348/180 |
| 5,376,971 | 12/1994 | Kadono et al. | 348/699 |

(List continued on next page.)

FOREIGN PATENT DOCUMENTS

| | | | |
|---|---|---|---|
| 395 293 A | 10/1990 | European Pat. Off. | H04N 7/137 |
| 474 307 A2 A3 | 3/1992 | European Pat. Off. | G06F 15/70 |
| 497 586 A | 8/1992 | European Pat. Off. | G06F 15/70 |
| 614 318 A2 A3 | 9/1994 | European Pat. Off. | H04N 7/13 |
| 625 853 A2 A3 | 11/1994 | European Pat. Off. | H04N 7/13 |
| WO91/11782 | 8/1991 | WIPO | G06K 9/36 |

OTHER PUBLICATIONS

Sanson, *Motion Affine Models Identification and Application to Television Image Coding*, SPIE vol. 1605 Visual Communications and Image Processing '91: Visual Communication, pp. 570–581.

(List continued on next page.)

*Primary Examiner*—Leo Boudreau
*Assistant Examiner*—Bijan Tadayon
*Attorney, Agent, or Firm*—Klarquist Sparkman Campbell Leigh & Whinston LLP

[57] ABSTRACT

A method implemented in an object-based video encoder or decoder uses shape information that describes the boundary of a group of pixels representing an object in a sequence of video frames to identify transparent blocks (e.g., macroblocks or blocks so that coding/decoding of these blocks can be skipped. In the object-based video coding method, encoders code shape separately from motion and texture, and shape information is available before the encoder/decoder codes/decodes texture and motion data. The encoder and decoder use this shape information to identify transparent macroblocks or blocks so that texture coding and possible motion coding can be skipped. This method for transparent block skipping reduces coding and decoding operations and reduces the number of bits needed to store a bitstream representing a compressed video sequence.

18 Claims, 39 Drawing Sheets

U.S. PATENT DOCUMENTS

| | | | |
|---|---|---|---|
| 5,424,783 | 6/1995 | Wong | 348/606 |
| 5,459,519 | 10/1995 | Scalise et al. | 348/431 |
| 5,467,441 | 11/1995 | Stone et al. | 395/133 |
| 5,467,442 | 11/1995 | Tsubota et al. | 395/135 |
| 5,517,327 | 5/1996 | Nakatani et al. | 358/462 |
| 5,572,258 | 11/1996 | Yokoyama | 348/415 |
| 5,574,572 | 11/1996 | Malinowski et al. | 358/451 |
| 5,598,215 | 1/1997 | Watanabe | 348/416 |
| 5,621,660 | 4/1997 | Chaddha et al. | 364/514 R |

OTHER PUBLICATIONS

Hötter, *Optimization and Efficiency of an Object–Oriented Analysis–Synthesis Coder*, IEEE Transactions on Circuits and Systems for Video Technology, Apr. 1994, No. 2, pp. 181–194.

Zakhor et al, *Edge–Based 3–D Camera Motion Estimation with Application to Video Coding*, IEEE Transactions on Image Processing, Oct. 1993, No. 4, pp. 481–498.

Meyer et al., *Region–Based Tracking Using Affine Motion Models in Long Image Sequences*, CVGIP: Image Understanding, vol. 60, No. 2, Sep. 1994, pp. 119–140.

Ozer, *Why MPEG is Hot*, PC Magazine, Apr. 11, 1995, pp. 130–131.

Fogg, *Survey of Software and Hardware VLC Architectures*, SPIE vol. 2186, pp. 29–37. No Date of Publication.

*Video Coding for Low Bitrate Communication*, Draft Recommendation H.263, International Telecommunication Union, Dec. 1995, 51 pages.

Foley et al. *Computer Graphics Principles and Practice*, Addison–Wesley Publishing Company, Inc., 1990, pp. 835–851. No Place of Public.

Nieweglowski et al., *A Novel Video Coding Scheme Based on Temporal Prediction Using Digital Image Warping*, IEEE Transactions on Consumer Electronics, vol. 39, No. 3, Aug. 1993, pp. 141–150.

Orchard, *Predictive Motion–Field Segmentation for Image Sequence Coding*, IEEE Transactions on Circuits and Systems for Video Technology, vol. 3, No. 1, Feb. 1993, pp. 54–70.

Seferidis et al. *General Approach to Block–Matching Motion Estimation*, Optical Engineering, vol. 32, No. 7, Jul. 1993, pp. 1464–1474.

Chang et al., *Transform Coding of Arbitrarily–Shaped Image Segments*, Proceedings of the ACM Multimedia 93, Aug. 1, 1993, pp. 83–90.

Chen et al., *A Block Transform Coder for Arbitrarily Shaped Image Segments*, ICIP–94, vol. I/III, Nov. 13, 1994, pp. 85–89.

Franke et al., *Constrained Iterative Restoration Techniques: A Powerful Tool in Region Oriented Texture Coding*, Signal Processing IV: Theories and Applications, Sep. 1988, pp. 1145–1148.

PCT/US96/15892 search report dated Feb. 17, 1997.

PCT/US96/15892 search report dated Apr. 28, 1997.

PCT/US97/04662 search report dated Jun. 9, 1997.

*JPEG Still Image Data Compression Standard*, by William B. Pennebaker and Joan L. Mitchell, Chapter 20, pp. 325–329, 1993. No Place of Publication.

Wong, *Nonlinear Scale–Space Filtering and Multiresolution System*, 1995 IEEE, pp. 774–787.

Defée et al., *Nonlinear Filters in Image Pyramid Generation*, 1991 IEEE, pp. 269–272.

Ranka et al, *Efficient Serial and Parallel Algorithms for Median Filtering*, 1991 IEEE, pp. 1462–1466.

Haddad et al, *Digital Signal Processing, Theory, Applications, and Hardware*, 1991, pp. 257–261.

Fig. 3B
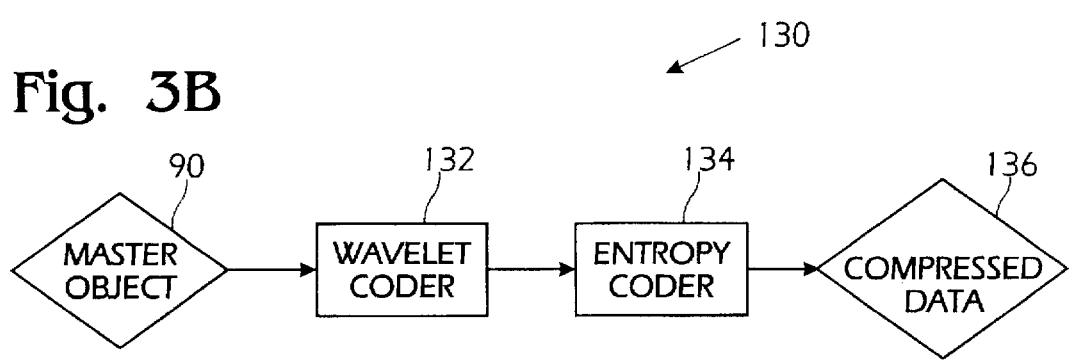
Fig. 23B
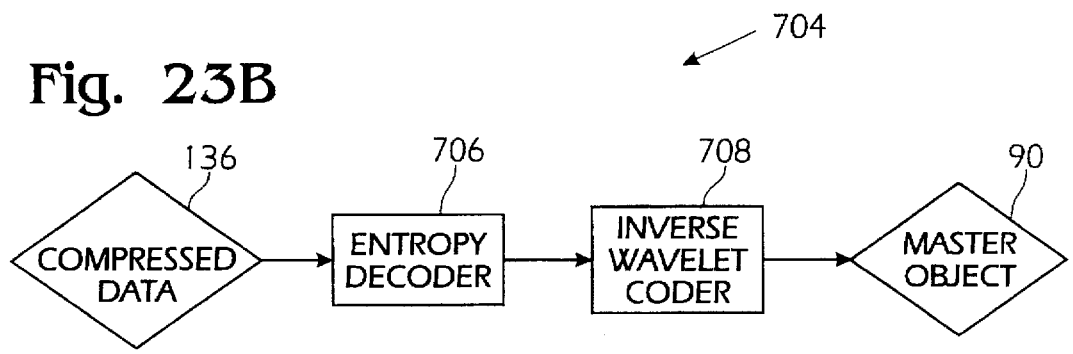
Fig. 20A
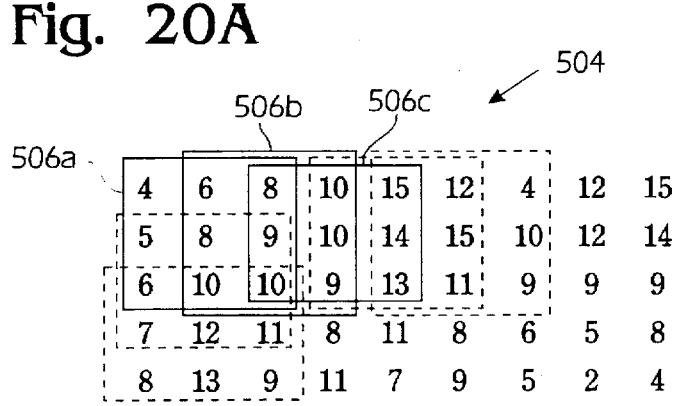
Fig. 20C
```
      515
8   10   12
10  10    9
```
Fig. 20B
```
       512
8   9  10  12  12
9  10  10  11  11
10 10  10   9   9
```
Fig. 20D
```
       520
8   9  10  11   12
9   9  10  10   10.5
10 10  10   9.5  9
```

INITIAL BLOCK — 282

```
A    B    C    D    E      ← 262
F    G    H    I    J
K    L    M    N    O
P    Q    R    S    T
U    V    W    X    Y
```
⎵ 264

OBJECT                                                                    ← 266

| 01 | 02 | 03 | 04 | 05 | 06 | 07 | 08 | 09 | 00 | ... |
| 12 | 13 | 14 | 15 | 16 | 17 | 18 | 19 | 10 | 11 | ... |
| 23 | 24 | 25 | 26 | 27 | 28 | 29 | 20 | 21 | 22 | ... |
| 34 | 35 | 36 | 37 | 38 | 39 | 30 | 31 | 32 | 33 | ... |
| 45 | 46 | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

INITIAL BLOCK SCANNING OBJECT (Step 1)
270(1)                                                                    ← 266

| 01E | 02 | 03 | 04 | 05 | 06 | 07 | 08 | 09 | 00 | ... |
| 12J | 13 | 14 | 15 | 16 | 17 | 18 | 19 | 10 | 11 | ... |
| 23O | 24 | 25 | 26 | 27 | 28 | 29 | 20 | 21 | 22 | ... |
| 34T | 35 | 36 | 37 | 38 | 39 | 30 | 31 | 32 | 33 | ... |
| 45Y | 46 | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

INITIAL BLOCK SCANNING OBJECT (Step 2)
270(2) 270(3)                                                             ← 266

| 01D | 02E | 03 | 04 | 05 | 06 | 07 | 08 | 09 | 00 | ... |
| 12I | 13J | 14 | 15 | 16 | 17 | 18 | 19 | 10 | 11 | ... |
| 23N | 24O | 25 | 26 | 27 | 28 | 29 | 20 | 21 | 22 | ... |
| 34S | 35T | 36 | 37 | 38 | 39 | 30 | 31 | 32 | 33 | ... |
| 45X | 46Y | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

INITIAL BLOCK SCANNING OBJECT (Step 5)

270(4) 270(5) 270(6) 270(7) 270(8)

| | | | | | | | | | | |
|---|---|---|---|---|---|---|---|---|---|---|
| 01A | 02B | 03C | 04D | 05E | 06 | 07 | 08 | 09 | 00 | ... |
| 12F | 13G | 14H | 15I | 16J | 17 | 18 | 19 | 10 | 11 | ... |
| 23K | 24L | 25M | 26N | 27O | 28 | 29 | 20 | 21 | 22 | ... |
| 34P | 35Q | 36R | 37S | 38T | 39 | 30 | 31 | 32 | 33 | ... |
| 45U | 46V | 47W | 48X | 49Y | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

INITIAL BLOCK SCANNING OBJECT (Step 6)

270(9) 270(10) 270(11) 270(12) 270(13)

| | | | | | | | | | | |
|---|---|---|---|---|---|---|---|---|---|---|
| 01 | 02A | 03B | 04C | 05D | 06E | 07 | 08 | 09 | 00 | ... |
| 12 | 13F | 14G | 15H | 16I | 17J | 18 | 19 | 10 | 11 | ... |
| 23 | 24K | 25L | 26M | 27N | 28O | 29 | 20 | 21 | 22 | ... |
| 34 | 35P | 36Q | 37R | 38S | 39T | 30 | 31 | 32 | 33 | ... |
| 45 | 46U | 47V | 48W | 49X | 40Y | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig.9F

INITIAL BLOCK SCANNING OBJECT (Step Q+5)

270(14) 270(15) 270(16) 270(17) 270(18)

| | | | | | | | | | | |
|---|---|---|---|---|---|---|---|---|---|---|
| 01 | 02 | 03 | 04 | 05 | 06 | 07 | 08 | 09 | 00 | ... |
| 12A | 13B | 14C | 15D | 16E | 17 | 18 | 19 | 10 | 11 | ... |
| 23F | 24G | 25H | 26I | 27J | 28 | 29 | 20 | 21 | 22 | ... |
| 34K | 35L | 36M | 37N | 38O | 39 | 30 | 31 | 32 | 33 | ... |
| 45P | 46Q | 47R | 48S | 49T | 40 | 41 | 42 | 43 | 44 | ... |
| 56U | 57V | 58W | 59X | 50Y | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig.9G

SUBSEQUENT HORIZONTAL BLOCK ←—276

```
B   C   D   E   U'
G   H   I   J   V'
L   M   N   O   W'
Q   R   S   T   X'
V   W   X   Y   Y'
_____/  \_/
      280        278
```

SUBSEQUENT HORIZONTAL BLOCK SCANNING OBJECT (Step 1)

288(1)

| 01 U' | 02 | 03 | 04 | 05 | 06 | 07 | 08 | 09 | 00 | ... |
|---|---|---|---|---|---|---|---|---|---|---|
| 12 V' | 13 | 14 | 15 | 16 | 17 | 18 | 19 | 10 | 11 | ... |
| 23 W' | 24 | 25 | 26 | 27 | 28 | 29 | 20 | 21 | 22 | ... |
| 34 X' | 35 | 36 | 37 | 38 | 39 | 30 | 31 | 32 | 33 | ... |
| 45 Y' | 46 | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

SUBSEQUENT HORIZONTAL BLOCK SCANNING OBJECT (Step 2)

270'(1)  288(2)

| 01 E | 02 U' | 03 | 04 | 05 | 06 | 07 | 08 | 09 | 00 | ... |
|---|---|---|---|---|---|---|---|---|---|---|
| 12 J | 13 V' | 14 | 15 | 16 | 17 | 18 | 19 | 10 | 11 | ... |
| 23 O | 24 W' | 25 | 26 | 27 | 28 | 29 | 20 | 21 | 22 | ... |
| 34 T | 35 X' | 36 | 37 | 38 | 39 | 30 | 31 | 32 | 33 | ... |
| 45 Y | 46 Y' | 47 | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

SUBSEQUENT HORIZONTAL BLOCK SCANNING OBJECT (Step 3)

270'(2)  270'(3)  288(3)

| 01 D | 02 E | 03 U' | 04 | 05 | 06 | 07 | 08 | 09 | 00 | ... |
|---|---|---|---|---|---|---|---|---|---|---|
| 12 I | 13 J | 14 V' | 15 | 16 | 17 | 18 | 19 | 10 | 11 | ... |
| 23 N | 24 O | 25 W' | 26 | 27 | 28 | 29 | 20 | 21 | 22 | ... |
| 34 S | 35 T | 36 X' | 37 | 38 | 39 | 30 | 31 | 32 | 33 | ... |
| 45 X | 46 Y | 47 Y' | 48 | 49 | 40 | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

SUBSEQUENT HORIZONTAL BLOCK SCANNING OBJECT (Step 6)

| | 270'(5) | 270'(6) | 270'(7) | 270'(8) | 288(4) | | | | | |
|---|---|---|---|---|---|---|---|---|---|---|
| 01 | 02 B | 03 C | 04 D | 05 E | 06 U' | 07 | 08 | 09 | 00 | ... |
| 12 | 13 G | 14 H | 15 I | 16 J | 17 V' | 18 | 19 | 10 | 11 | ... |
| 23 | 24 L | 25 M | 26 N | 27 O | 28 W' | 29 | 20 | 21 | 22 | ... |
| 34 | 35 Q | 36 R | 37 S | 38 T | 39 X' | 30 | 31 | 32 | 33 | ... |
| 45 | 46 V | 47 W | 48 X | 49 Y | 40 Y' | 41 | 42 | 43 | 44 | ... |
| 56 | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 10E

SUBSEQUENT HORIZONTAL BLOCK SCANNING OBJECT (Step Q+6)

| | 270'(15) | 270'(16) | 270'(17) | 270'(18) | 288(5) | | | | | |
|---|---|---|---|---|---|---|---|---|---|---|
| 01 | 02 | 03 | 04 | 05 | 06 | 07 | 08 | 09 | 00 | ... |
| 12 | 13 B | 14 C | 15 D | 16 E | 17 U' | 18 | 19 | 10 | 11 | ... |
| 23 | 24 G | 25 H | 26 I | 27 J | 28 V' | 29 | 20 | 21 | 22 | ... |
| 34 | 35 L | 36 M | 37 N | 38 O | 39 W' | 30 | 31 | 32 | 33 | ... |
| 45 | 46 Q | 47 R | 48 S | 49 T | 40 X' | 41 | 42 | 43 | 44 | ... |
| 56 | 57 V | 58 W | 59 X | 50 Y | 51 Y' | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

SUBSEQUENT VERTICAL BLOCK ← 294

INITIAL BLOCK SCANNING OBJECT (Step Q+1)

302(1)

| 01 | 02 | 03 | 04 | 05 | 06 | 07 | 08 | 09 | 00 | ... |
|----|----|----|----|----|----|----|----|----|----|-----|
| 12 J | 13 | 14 | 15 | 16 | 17 | 18 | 19 | 10 | 11 | ... |
| 23 O | 24 | 25 | 26 | 27 | 28 | 29 | 20 | 21 | 22 | ... |
| 34 T | 35 | 36 | 37 | 38 | 39 | 30 | 31 | 32 | 33 | ... |
| 45 Y | 46 | 47 | 48 | 49 | 40 | 41 | 42 | 43 | 44 | ... |
| 56 E' | 57 | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 11C

INITIAL BLOCK SCANNING OBJECT (Step Q+2)

302(2)  302(3)

| 01 | 02 | 03 | 04 | 05 | 06 | 07 | 08 | 09 | 00 | ... |
|----|----|----|----|----|----|----|----|----|----|-----|
| 12 I | 13 J | 14 | 15 | 16 | 17 | 18 | 19 | 10 | 11 | ... |
| 23 N | 24 O | 25 | 26 | 27 | 28 | 29 | 20 | 21 | 22 | ... |
| 34 S | 35 T | 36 | 37 | 38 | 39 | 30 | 31 | 32 | 33 | ... |
| 45 X | 46 Y | 47 | 48 | 49 | 40 | 41 | 42 | 43 | 44 | ... |
| 56 D' | 57 E' | 58 | 59 | 50 | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 11D

INITIAL BLOCK SCANNING OBJECT (Step Q+5)

302(4) 302(5) 302(6) 302(7) 302(8)

| 01 | 02 | 03 | 04 | 05 | 06 | 07 | 08 | 09 | 00 | ... |
|----|----|----|----|----|----|----|----|----|----|-----|
| 12 F | 13 G | 14 H | 15 I | 16 J | 17 | 18 | 19 | 10 | 11 | ... |
| 23 K | 24 L | 25 M | 26 N | 27 O | 28 | 29 | 20 | 21 | 22 | ... |
| 34 P | 35 Q | 36 R | 37 S | 38 T | 39 | 30 | 31 | 32 | 33 | ... |
| 45 U | 46 V | 47 W | 48 X | 49 Y | 40 | 41 | 42 | 43 | 44 | ... |
| 56 A' | 57 B' | 58 C' | 59 D' | 50 E' | 51 | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

304'(4) 304'(5) 304'(6) 304'(7) 304'(8)

INITIAL BLOCK SCANNING OBJECT (Step Q+6)
     302(9) 302(10) 302(11) 302(12) 302(13)

| 01 | 02 | 03 | 04 | 05 | 06 | 07 | 08 | 09 | 00 | ... |
|----|----|----|----|----|----|----|----|----|----|-----|
| 12 | 13 F | 14 G | 15 H | 16 O | 17 J | 18 | 19 | 10 | 11 | ... |
| 23 | 24 K | 25 L | 26 M | 27 N | 28 O | 29 | 20 | 21 | 22 | ... |
| 34 | 35 P | 36 Q | 37 R | 38 S | 39 T | 30 | 31 | 32 | 33 | ... |
| 45 | 46 U | 47 V | 48 W | 49 X | 40 Y | 41 | 42 | 43 | 44 | ... |
| 56 | 57 A' | 58 B' | 59 C' | 50 D' | 51 E' | 52 | 53 | 54 | 55 | ... |
| 67 | 68 | 69 | 60 | 61 | 62 | 63 | 64 | 65 | 66 | ... |
| 78 | 79 | 70 | 71 | 72 | 73 | 74 | 75 | 76 | 77 | ... |
| 89 | 80 | 81 | 82 | 83 | 84 | 85 | 86 | 87 | 88 | ... |
| 90 | 91 | 92 | 93 | 94 | 95 | 96 | 97 | 98 | 99 | ... |

Fig. 11E

INITIAL BLOCK SCANNING OBJECT (Step 2Q+5)
302(14) 302(15) 302(16) 302(17) 302(18)

| 05 | 02 | 03 | 04 | | 06 | 07 | 08 | 09 | 00 | ... |
|----|----|----|----|---|----|----|----|----|----|-----|
| 18 | 13 | 14 | 15 | | 17 | 18 | 19 | 10 | 11 | ... |
| 23 F | 24 G | 25 H | 26 I | J | 28 | 29 | 20 | 21 | 22 | ... |
| 38 K | 35 L | 36 M | 37 N | O | 39 | 30 | 31 | 32 | 33 | ... |
| 49 P | 46 Q | 47 R | 48 S | T | 40 | 41 | 42 | 43 | 44 | ... |
| 56 U | 57 V | 58 W | 59 X | Y | 51 | 52 | 53 | 54 | 55 | ... |
| 67 A' | 68 B' | 69 C' | 60 D' | E' | 62 | 63 | 64 | 65 | 66 | ... |
| 78 | 79 | 70 | 71 | | 73 | 74 | 75 | 76 | 77 | ... |
| 89 | 80 | 81 | 82 | | 84 | 85 | 86 | 87 | 88 | ... |
| 90 | 91 | 92 | 93 | | 95 | 96 | 97 | 98 | 99 | ... |

Fig. 11F

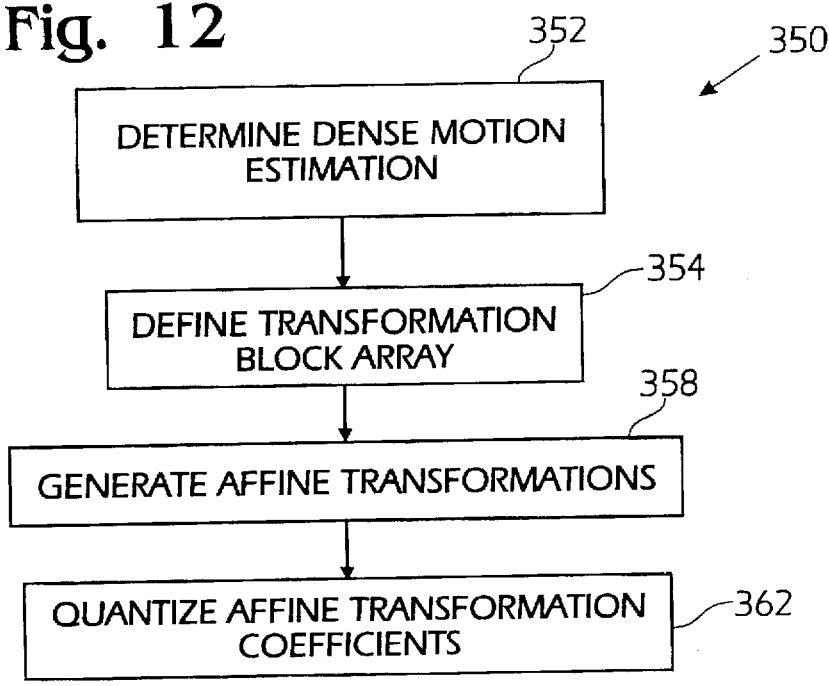
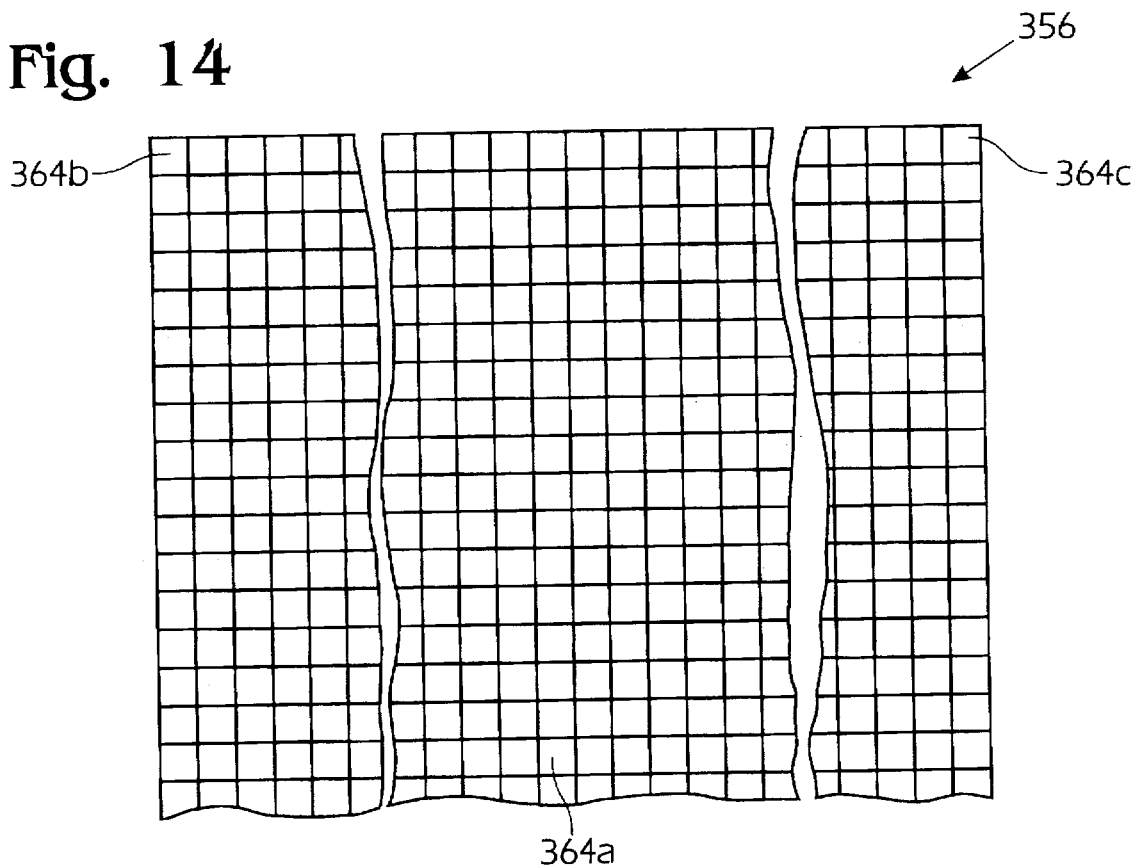

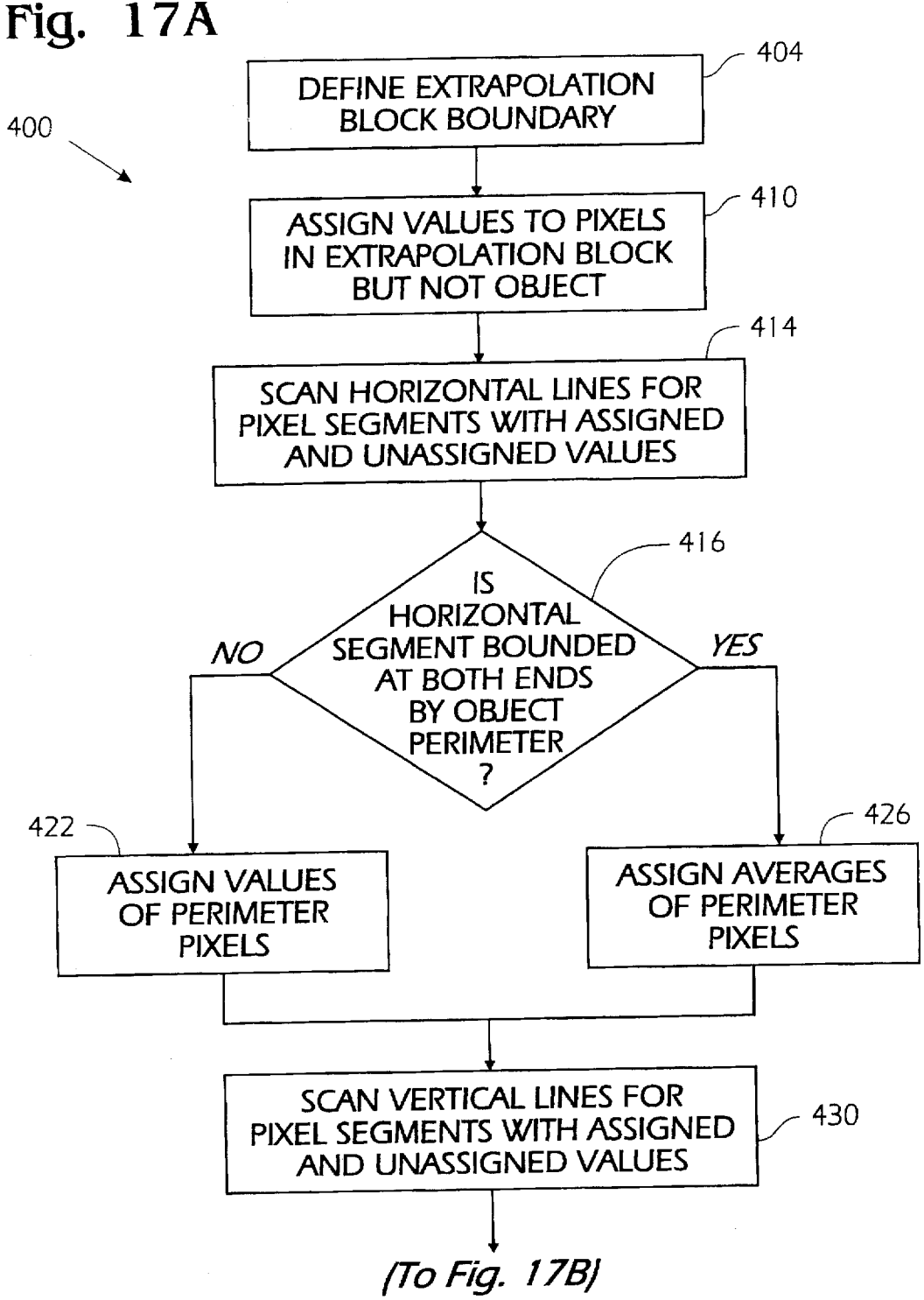

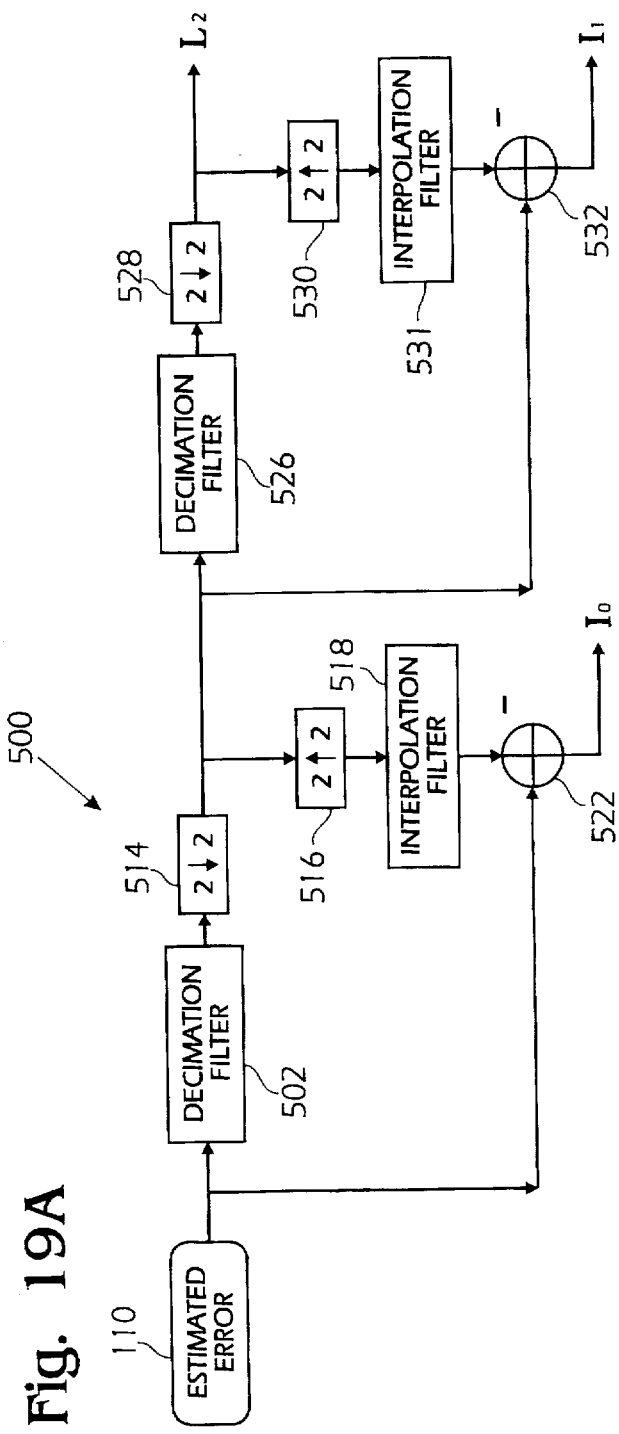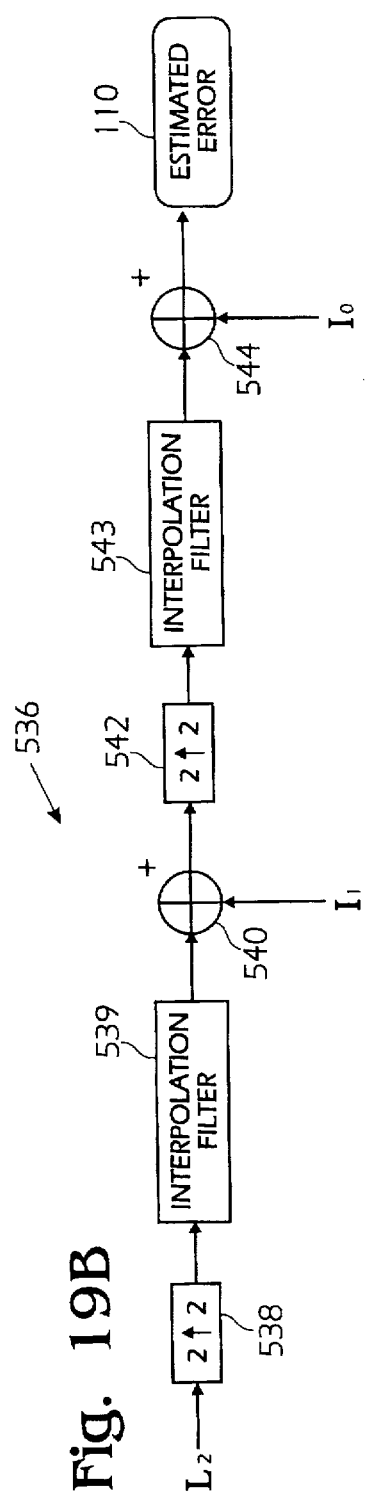
Fig. 19A
Fig. 19B

TRANSPARENT BLOCK SKIPPING IN OBJECT-BASED VIDEO CODING SYSTEMS

FIELD OF THE INVENTION

The invention relates to processes for coding video signals and, in particular, to an object-based video coding process.

BACKGROUND OF THE INVENTION

Full-motion video displays based upon analog video signals have long been available in the form of television. With recent increases in computer processing capabilities and affordability, full-motion video displays based upon digital video signals are becoming more widely available. Digital video systems can provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels according to the display resolution of a particular system. As examples, VHS-based systems have display resolutions of 320×480 pixels, NTSC-based systems have display resolutions of 720×486 pixels, and high-definition television (HDTV) systems under development have display resolutions of 1360×1024 pixels.

The amounts of raw digital information included in video sequences are massive. Storage and transmission of these amounts of video information is infeasible with conventional personal computer equipment. With reference to a digitized form of a relatively low resolution VHS image format having a 320×480 pixel resolution, a full-length motion picture of two hours in duration could correspond to 100 gigabytes of digital video information. By comparison, conventional compact optical disks have capacities of about 0.6 gigabytes, magnetic hard disks have capacities of 1–2 gigabytes, and compact optical disks under development have capacities of up to 8 gigabytes.

In response to the limitations in storing or transmitting such massive amounts of digital video information, various video compression standards or processes have been established, including MPEG-1, MPEG-2, and H.26X. These conventional video compression techniques utilize similarities between successive image frames, referred to as temporal or interframe correlation, to provide interframe compression in which pixel-based representations of image frames are converted to motion representations. In addition, the conventional video compression techniques utilize similarities within image frames, referred to as spatial or intraframe correlation, to provide intraframe compression in which the motion representations within an image frame are further compressed. Intraframe compression is based upon conventional processes for compressing still images, such as discrete cosine transform (DCT) encoding.

Although differing in specific implementations, the MPEG-1, MPEG-2, and H.26X video compression standards are similar in a number of respects. The following description of the MPEG-2 video compression standard is generally applicable to the others.

MPEG-2 provides interframe compression and intraframe compression based upon square blocks or arrays of pixels in video images. A video image is divided into transformation blocks having dimensions of 16×16 pixels. For each transformation block TN in an image frame N, a search is performed across the image of a next successive video frame N+1 or immediately preceding image frame N−1 (i.e., bidirectionally) to identify the most similar respective transformation blocks TN+1 or TN−1.

Ideally, and with reference to a search of the next successive image frame, the pixels in transformation blocks TN and TN+1 are identical, even if the transformation blocks have different positions in their respective image frames. Under these circumstances, the pixel information in transformation block TN+1 is redundant to that in transformation block TN. Compression is achieved by substituting the positional translation between transformation blocks TN and TN+1 for the pixel information in transformation block TN+1. In this simplified example, a single translational vector designated (X, Y) for the video information associated with each of the 256 pixels in transformation block TN+1.

Frequently, the video information (i.e., pixels) in the corresponding transformation blocks TN and TN+1 are not identical. The difference between them is designated a transformation block error E, which often is significant. Although it is compressed by a conventional compression process such as discrete cosine transform (DCT) encoding, the transformation block error E is cumbersome and limits the extent (ratio) and the accuracy by which video signals can be compressed.

Large transformation block errors E arise in block-based video compression methods for several reasons. The block-based motion estimation represents only translational motion between successive image frames. The only change between corresponding transformation blocks TN and TN+1 that can be represented are changes in the relative positions of the transformation blocks. A disadvantage of such representations is that full-motion video sequences frequently include complex motions other than translation, such as rotation, magnification and sheer. Representing such complex motions with simple translational approximations results in the significant errors.

Another aspect of video displays is that they typically include multiple image features or objects that change or move relative to each other. Objects may be distinct characters, articles, or scenery within a video display. With respect to a scene in a motion picture, for example, each of the characters (i.e., actors) and articles (i.e., props) in the scene could be a different object.

The relative motion between objects in a video sequence is another source of significant transformation block errors E in conventional video compression processes. Due to the regular configuration and size of the transformation blocks, many of them encompass portions of different objects. Relative motion between the objects during successive image frames can result in extremely low correlation (i.e., high-transformation errors E) between corresponding transformation blocks. Similarly, the appearance of portions of objects in successive image frames (e.g., when a character turns) also introduces high-transformation errors E.

Conventional video compression methods appear to be inherently limited due to the size of transformation errors E. With the increased demand for digital video display capabilities, improved digital video compression processes are required.

SUMMARY OF THE INVENTION

The invention provides a method for reducing overhead during the encoding and decoding of video "objects" in an object-based video encoder. An object is a group of pixels in a video frame used to display something that behaves as a physical entity. In particular, this entity preferably demonstrates relatively rigid body motion and color invariance, but this is not an absolute requirement. Object-based coding is a region-based coding scheme (as opposed to a block based coding scheme) where the regions are defined by the shapes of the objects. The method of the invention reduces coding overhead and the number of bits needed to code objects in a sequence of video frames by using shape information to identify transparent transformation blocks around an object and then skipping encoding/decoding of these blocks.

In an object-based video encoder or decoder designed according to the invention, shape information is available independent of motion estimation and texture information. As such, the method of the invention can use the shape information to identify transparent transformation blocks and skip texture and possibly motion coding and decoding for these blocks. An encoder employing this method evaluates the shape of an object to determine whether a given block is transparent, i.e. covered by the object. If the block is transparent, the encoder can skip texture coding for inter and intra frame blocks. The encoder can also skip coding of motion estimation data, such as motion vectors or transformation coefficients for inter frame blocks. Similarly, the decoder can use decoded shape information to identify transparent blocks and skip texture or motion decoding for these blocks.

The method of the invention applies to transformation blocks as well as smaller blocks inside a transformation block (sub-transformation blocks). The objects in an object based coding scheme have an associated bounding region, typically a bounding rectangle, that encloses the boundary or "shape" of the object. To encode motion and texture data for an object, the encoder divides the bounding region into transformation blocks and encodes the object's motion and texture data for these blocks. In some implementations, transformation blocks are further divided into smaller blocks, which we refer to as subtransformation blocks. One example of transformation and sub-transformation blocks are 16×16 pixel macroblocks and 8×8 pixel blocks. However, the size of these blocks can vary and is not critical to the invention.

The invention provides a number of advantages. One significant advantage is that transparent block skipping saves operations. Instead of encoding transparent blocks, they are merely skipped. This improves performance in both the encoder and decoder. In addition to saving operations, the method reduces the number of bits required to encode object-based video. Rather than coding transparent portions of a bounding region with a constant, such as zero values for all transparent pixels, transparent blocks can be skipped without sending any additional information. No additional information is necessary because shape information is available independently and can be used to identify transparent blocks.

These and additional features and advantages of the invention will become more apparent from the following detailed description and accompanying drawing.

BRIEF DESCRIPTION OF THE DRAWINGS

FIG. 3B is a functional block diagram of a master object encoder process.

FIG. 9A is a schematic representation of a first pixel block used for identifying corresponding pixels in different image frames. FIG. 9B is a schematic representation of an array of pixels corresponding to a search area in a prior image frame where corresponding pixels are sought. FIGS. 9C-9G are schematic representations of the first pixel block being scanned across the pixel array of FIG. 9B to identify corresponding pixels.

FIG. 10A is a schematic representation of a second pixel block used for identifying corresponding pixels in different image frames. FIGS. 10B-10F are schematic representations of the second pixel block being scanned across the pixel array of FIG. 9B to identify corresponding pixels.

FIG. 11A is a schematic representation of a third pixel block used for identifying corresponding pixels in different image frames. FIGS. 11B-11F are schematic representations of the third pixel block being scanned across the pixel array of FIG. 9B.

FIG. 12 is a function block diagram of a multi-dimensional transformation method that includes generating a mapping between objects in first and second successive image frames and quantitizing the mapping for transmission or storage.

FIG. 14 is an enlarged simplified representation showing three selected pixels of a transformation block used in the quantization of affine transformation coefficients determined by the method of FIG. 12.

FIGS. 17A and 17B are a functional block diagram of a precompression extrapolation method for extrapolating image features of arbitrary configuration to a predefined configuration to facilitate compression.

FIGS. 19A and 19B are functional block diagrams of an encoder method and a decoder method, respectively, employing a Laplacian pyramid encoder method.

FIGS. 20A–20D are simplified representations of the color component values of an arbitrary set or array of pixels processed according to the encoder process of FIG. 19A.

FIG. 23B is a functional diagram of a master object decoder process.

DETAILED DESCRIPTION

Figure 1:
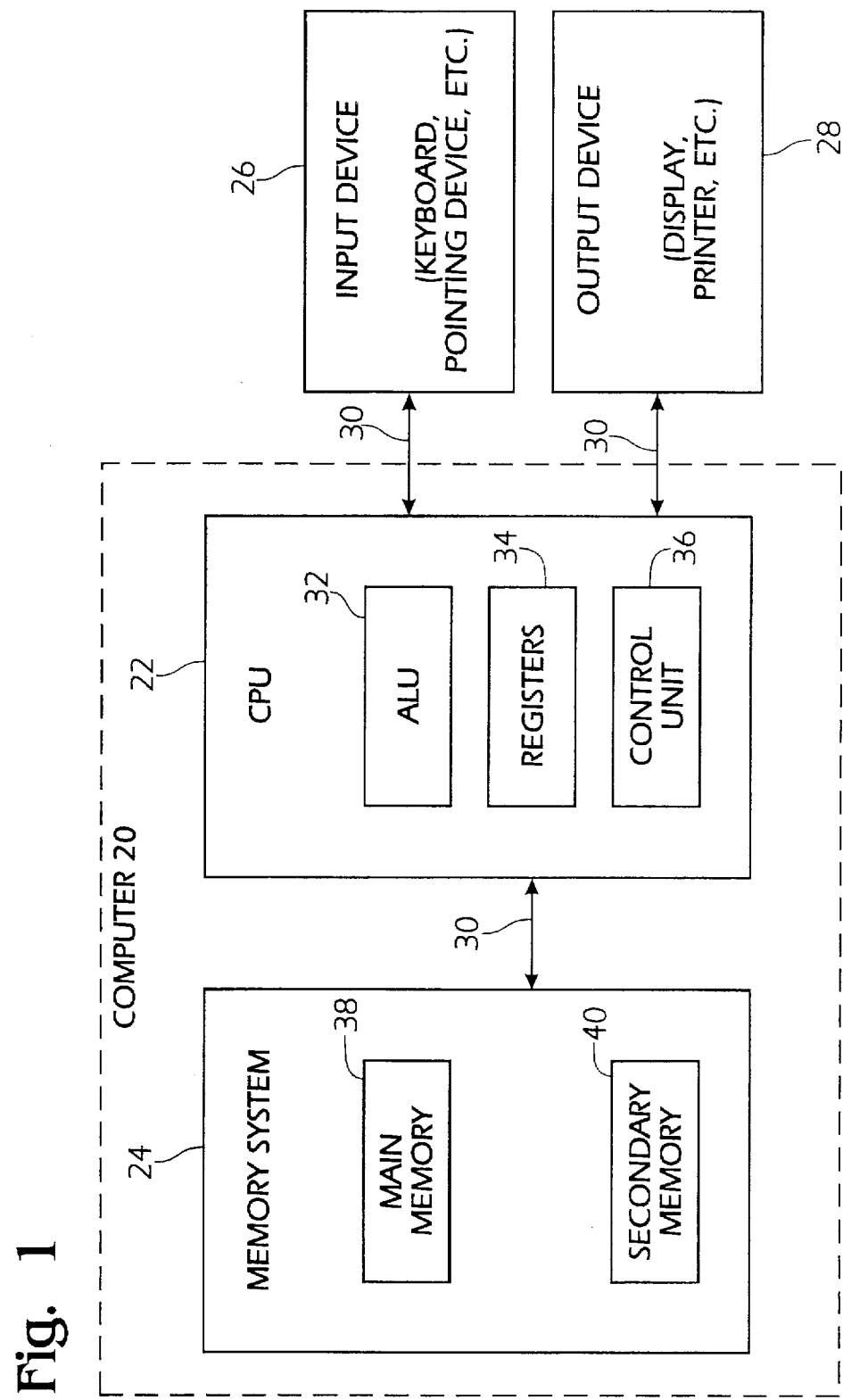
FIG. 1 is a block diagram of a computer system that may be used to implement a method and apparatus embodying the invention.

Referring to FIG. 1, an operating environment for the preferred embodiment of the present invention is a computer system 20, either of a general purpose or a dedicated type, that comprises at least one high speed processing unit (CPU) 22, in conjunction with a memory system 24, an input device 26, and an output device 28. These elements are interconnected by a bus structure 30.

The illustrated CPU 22 is of familiar design and includes an ALU 32 for performing computations, a collection of registers 34 for temporary storage of data and instructions, and a control unit 36 for controlling operation of the system 20. CPU 22 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 24 includes main memory 38 and secondary storage 40. Illustrated main memory 38 takes the form of 16 megabytes of semiconductor RAM memory. Secondary storage 40 takes the form of long term storage, such as ROM, optical or magnetic disks, flash memory, or tape. Those skilled in the art will appreciate that memory system 24 may comprise many other alternative components. The input and output devices 26, 28 are also familiar. The input device 26 can comprise a keyboard, a mouse, a physical transducer (e.g., a microphone), etc. The output device 28 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 24.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 24, as well as other processing of signals. The memory locations where data bits are maintained are physical locations that have particular electrical, magnetic, or optical properties corresponding to the data bits.

Figure 2A:
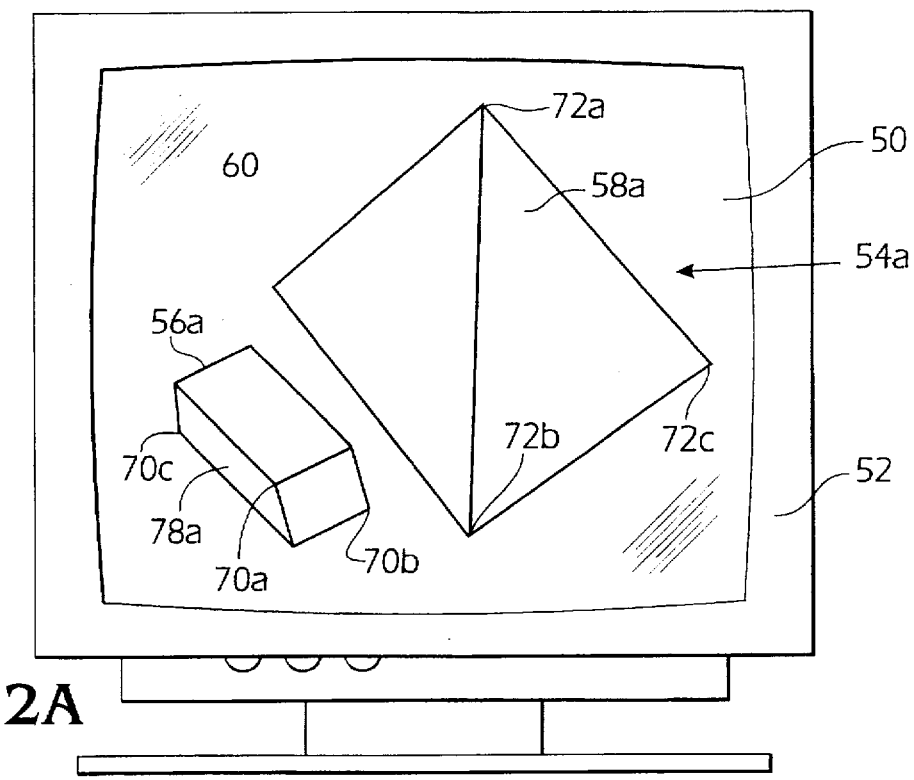
FIGS. 2A and 2B are simplified representations of a display screen of a video display device showing two successive image frames corresponding to a video signal.
Figure 2B:
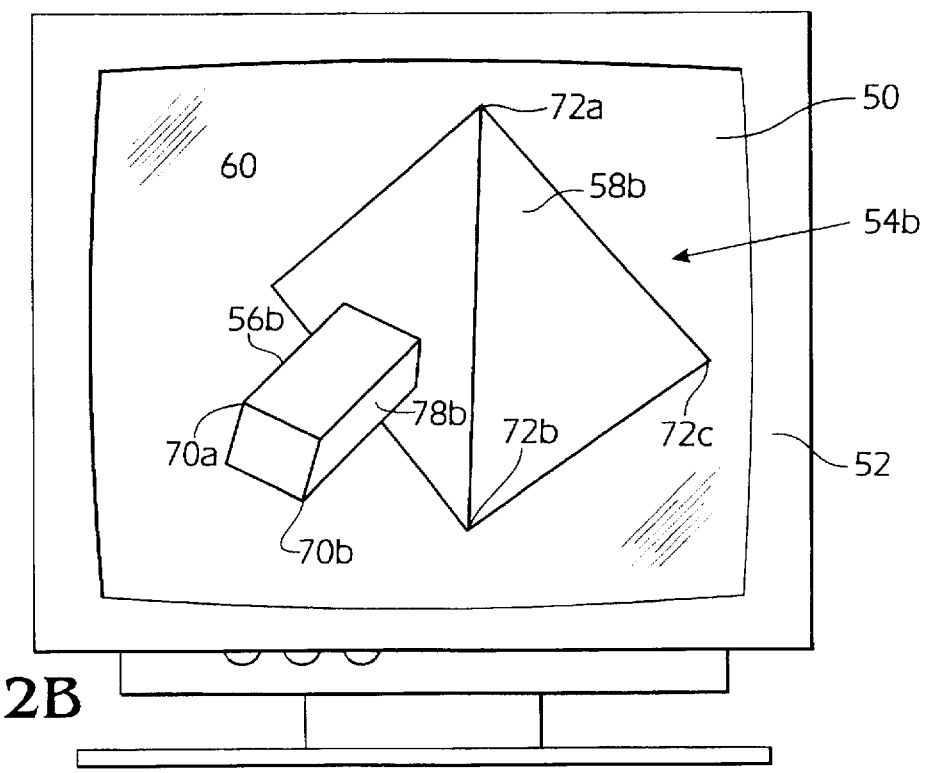

FIGS. 2A and 2B are simplified representations of a display screen 50 of a video display device 52 (e.g., a television or a computer monitor) showing two successive image frames 54a and 54b of a video image sequence represented electronically by a corresponding video signal. Video signals may be in any of a variety of video signal formats including analog television video formats such as NTSC, PAL, and SECAM, and pixelated or digitized video signal formats typically used in computer displays, such as VGA, CGA, and EGA. Preferably, the video signals corresponding to image frames are of a digitized video signal format, either as originally generated or by conversion from an analog video signal format, as is known in the art.

Image frames 54a and 54b each include a rectangular solid image feature 56 and a pyramid image feature 58 that are positioned over a background 60. Image features 56 and 58 in image frames 54a and 54b have different appearances because different parts are obscured and shown. For purposes of the following description, the particular form of an image feature in an image frame is referred to as an object or, alternatively, a mask. Accordingly, rectangular solid image feature 56 is shown as rectangular solid objects 56a and 56b in respective image frames 54a and 54b, and pyramid image feature 58 is shown as pyramid objects 58a and 58b in respective image frames 54a and 54b.

Pyramid image feature 58 is shown with the same position and orientation in image frames 54a and 54b and would "appear" to be motionless when shown in the video sequence. Rectangular solid 56 is shown in frames 54a and 54b with a different orientation and position relative to pyramid 58 and would "appear" to be moving and rotating relative to pyramid 58 when shown in the video sequence. These appearances of image features 58 and 60 are figurative and exaggerated. The image frames of a video sequence typically are displayed at rates in the range of 30–80 Hz. Human perception of video motion typically requires more than two image frames. Image frames 54a and 54b provide, therefore, a simplified representation of a conventional video sequence for purposes of illustrating the present invention. Moreover, it will be appreciated that the present invention is in no way limited to such simplified video images, image features, or sequences and, to the contrary, is applicable to video images and sequences of arbitrary complexity.

Video Compression Encoder Process Overview

Figure 3A:
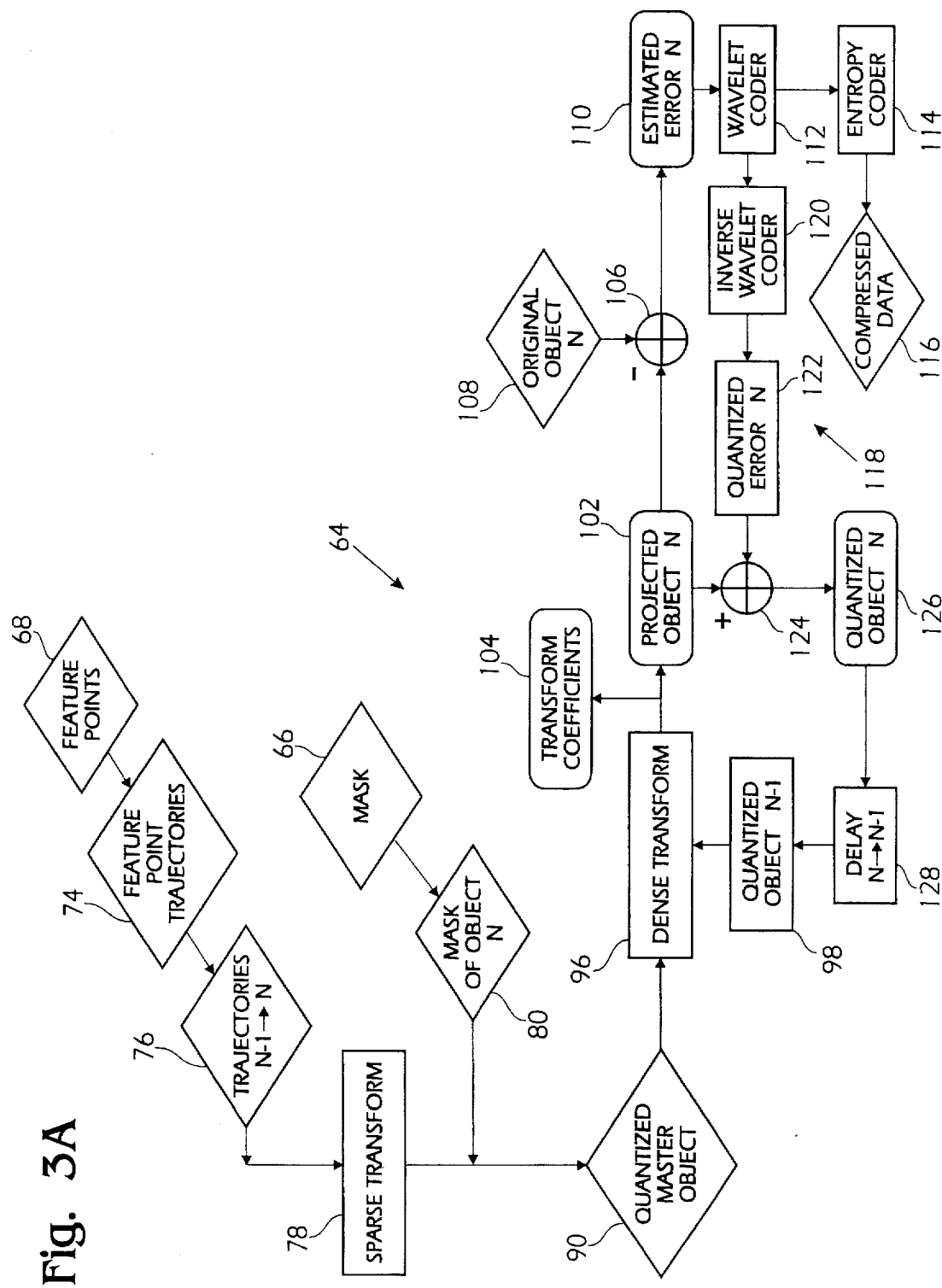
FIG. 3A is a generalized functional block diagram of a video compression encoder process for compressing digitized video signals representing display motion in video sequences of multiple image frames.

FIG. 3A is a generalized functional block diagram of a video compression encoder process 64 for compressing digitized video signals representing display motion in video sequences of multiple image frames. Compression of video information (i.e., video sequences or signals) can provide economical storage and transmission of digital video information in applications that include, for example, interactive or digital television and multimedia computer applications. For purposes of brevity, the reference numerals assigned to function blocks of encoder process 64 are used interchangeably in reference to the results generated by the function blocks.

Conventional video compression techniques utilize similarities between successive image frames, referred to as temporal or interframe correlation, to provide interframe compression in which pixel-based representations of image frames are converted to motion representations. In addition, conventional video compression techniques utilize similarities within image frames, referred to as spatial or intraframe correlation, to provide intraframe compression in which the motion representations within an image frame are further compressed.

In such conventional video compression techniques, including MPEG-1, MPEG-2, and H.26X, the temporal and spatial correlations are determined relative to simple translations of fixed, regular (e.g., square) arrays of pixels. Video information commonly includes, however, arbitrary video motion that cannot be represented accurately by translating square arrays of pixels. As a consequence, conventional video compression techniques typically include significant error components that limit the compression rate and accuracy.

In contrast, encoder process 64 utilizes object-based video compression to improve the accuracy and versatility of encoding interframe motion and intraframe image features. Encoder process 64 compresses video information relative to objects of arbitrary configurations, rather than fixed, regular arrays of pixels. This reduces the error components and thereby improves the compression efficiency and accuracy. As another benefit, object-based video compression provides interactive video editing capabilities for processing compressed video information.

Referring to FIG. 3A, function block 66 indicates that user-defined objects within image frames of a video sequence are segmented from other objects within the image frames. The objects may be of arbitrary configuration and preferably represent distinct image features in a display image. Segmentation includes identifying the pixels in the image frames corresponding to the objects. The user-defined objects are defined in each of the image frames in the video sequence. In FIGS. 2A and 2B, for example, rectangular solid objects 56a and 56b and pyramid objects 58a and 58b are separately segmented.

The segmented objects are represented by binary or multi-bit (e.g., 8-bit) "alphachannel" masks of the objects. The object masks indicate the size, configuration, and position of an object on a pixel-by-pixel basis. For purposes of simplicity, the following description is directed to binary masks in which each pixel of the object is represented by a single binary bit rather than the typical 24-bits (i.e., 8 bits for each of three color component values). Multi-bit (e.g., 8-bit) masks also have been used.

Function block 68 indicates that "feature points" of each object are defined by a user. Feature points preferably are distinctive features or aspects of the object. For example, corners 70a–70c and corners 72a–72c could be defined by a user as feature points of rectangular solid 56 and pyramid 58, respectively. The pixels corresponding to each object mask and its feature points in each image frame are stored in an object database included in memory system 24.

Function block 74 indicates that changes in the positions of feature points in successive image frames are identified and trajectories determined for the feature points between successive image frames. The trajectories represent the direction and extent of movement of the feature points. Function block 76 indicates that trajectories of the feature points in the object between prior frame N-1 and current frame N also is retrieved from the object data base.

Function block 78 indicates that a sparse motion transformation is determined for the object between prior frame N-1 and current frame N. The sparse motion transformation is based upon the feature point trajectories between frames N-1 and N. The sparse motion transformation provides an approximation of the change of the object between prior frame N-1 and current frame N.

Function block 80 indicates that a mask of an object in a current frame N is retrieved from the object data base in memory system 24.

Function block 90 indicates that a quantized master object or "sprite" is formed from the objects or masks 66 corresponding to an image feature in an image frame sequence and feature point trajectories 74. The master object preferably includes all of the aspects or features of an object as it is represented in multiple frames. With reference to FIGS. 2A and 2B, for example, rectangular solid 56 in frame 54b includes a side 78b not shown in frame 54a. Similarly, rectangular solid 56 includes a side 78a in frame 54a not shown in frame 54b. The master object for rectangular solid 56 includes both sides 78a and 78b.

Sparse motion transformation 78 frequently will not provide a complete representation of the change in the object between frames N-1 and N. For example, an object in a prior frame N-1, such as rectangular object 54a, might not include all the features of the object in the current frame N, such as side 78b of rectangular object 54b.

To improve the accuracy of the transformation, therefore, an intersection of the masks of the object in prior frame N-1 and current frame N is determined, such as by a logical AND function as is known in the art. The mask of the object in the current frame N is subtracted from the resulting intersection to identify any portions or features of the object in the current frame N not included in the object in the prior frame N-1 (e.g., side 78b of rectangular object 54b, as described above). The newly identified portions of the object are incorporated into master object 90 so that it includes a complete representation of the object in frames N-1 and N.

Function block 96 indicates that a quantized form of an object 98 in a prior frame N-1 (e.g., rectangular solid object 56a in image frame 54a) is transformed by a dense motion transformation to provide a predicted form of the object 102 in a current frame N (e.g., rectangular solid object 56b in image frame 54b). This transformation provides object-based interframe compression.

The dense motion transformation preferably includes determining an affine transformation between quantized prior object 98 in frame N-1 and the object in the current frame N and applying the affine transformation to quantized prior object 98. The preferred affine transformation is represented by affine transformation coefficients 104 and is capable of describing translation, rotation, magnification, and shear. The affine transformation is determined from a dense motion estimation, preferably including a pixel-by-pixel mapping, between prior quantized object 98 and the object in the current frame N.

Predicted current object 102 is represented by quantized prior object 98, as modified by dense motion transformation 96, and is capable of representing relatively complex motion, together with any new image aspects obtained from master object 90. Such object-based representations are relatively accurate because the perceptual and spatial continuity associated with objects eliminates errors arising from the typically changing relationships between different objects in different image frames. Moreover, the object-based representations allow a user to represent different objects with different levels of resolution to optimize the relative efficiency and accuracy for representing objects of varying complexity.

Function block 106 indicates that for image frame N, predicted current object 102 is subtracted from original object 108 for current frame N to determine an estimated error 110 in predicted object 102. Estimated error 110 is a compressed representation of current object 108 in image frame N relative to quantized prior object 98. More specifically, current object 108 may be decoded or reconstructed from estimated error 110 and quantized prior object 98.

Function block 112 indicates that estimated error 110 is compressed or "coded" by a conventional "lossy" still image compression method such as lattice subband (wavelet) compression or encoding as described in *Multirate Systems and Filter Banks* by Vaidyanathan, PTR Prentice-Hall, Inc., Englewood Cliffs, N.J., (1993) or discrete cosine transform (DCT) encoding as described in *JPEG: Still Image Data Compression Standard* by Pennebaker et al., Van Nostrand Reinhold, New York (1993).

As is known in the art, "lossy" compression methods introduce some data distortion to provide increased data compression. The data distortion refers to variations between the original data before compression and the data resulting after compression and decompression. For purposes of illustration below, the compression or encoding of function block 102 is presumed to be wavelet encoding.

Function block 114 indicates that the wavelet encoded estimated error from function block 112 is further compressed or "coded" by a conventional "lossless" still image compression method to form compressed data 116. A preferred conventional "lossless" still image compression method is entropy encoding as described in *JPEG: Still Image Data Compression Standard* by Pennebaker et al. As is known in the art, "lossless" compression methods introduce no data distortion.

An error feedback loop 118 utilizes the wavelet encoded estimated error from function block 112 for the object in frame N to obtain a prior quantized object for succeeding frame N+1. As an initial step in feedback loop 118, function block 120 indicates that the wavelet encoded estimated error from function block 112 is inverse wavelet coded, or wavelet decoded, to form a quantized error 122 for the object in image frame N.

The effect of successively encoding and decoding estimated error 110 by a lossy still image compression method is to omit from quantized error 122 video information that is generally imperceptible by viewers. This information typically is of higher frequencies. As a result, omitting such higher frequency components typically can provide image compression of up to about 200% with only minimal degradation of image quality.

Function block 124 indicates that quantized error 122 and predicted object 102, both for image frame N, are added together to form a quantized object 126 for image frame N. After a timing coordination delay 128, quantized object 126 becomes quantized prior object 98 and is used as the basis for processing the corresponding object in image frame N+1.

Encoder process 64 utilizes the temporal correlation of corresponding objects in successive image frames to obtain improved interframe compression, and also utilizes the spatial correlation within objects to obtain accurate and efficient intraframe compression. For the interframe compression, motion estimation and compensation are performed so that an object defined in one frame can be estimated in a successive frame. The motion-based estimation of the object in the successive frame requires significantly less information than a conventional block-based representation of the object. For the intraframe compression, an estimated error signal for each object is compressed to utilize the spatial correlation of the object within a frame and to allow different objects to be represented at different resolutions. Feedback loop 118 allows objects in subsequent frames to be predicted from fully decompressed objects, thereby preventing accumulation of estimation error.

Encoder process 64 provides as an output a compressed or encoded representation of a digitized video signal representing display motion in video sequences of multiple image frames. The compressed or encoded representation includes object masks 66, feature points 68, affine transform coefficients 104, and compressed error data 116. The encoded representation may be stored or transmitted, according to the particular application in which the video information is used.

FIG. 3B is a functional block diagram of a master object encoder process 130 for encoding or compressing master object 90. Function block 132 indicates that master object 90 is compressed or coded by a conventional "lossy" still image compression method such as lattice subband (wavelet) compression or discrete cosine transform (DCT) encoding. Preferably, function block 132 employs wavelet encoding.

Function block 134 indicates that the wavelet encoded master object from function block 132 is further compressed or coded by a conventional "lossless" still image compression method to form compressed master object data 136. A preferred conventional lossless still image compression method is entropy encoding.

Encoder process 130 provides as an output compressed master object 136. Together with the compressed or encoded representations provided by encoder process 64, compressed master object 136 may be decompressed or decoded after storage or transmission to obtain a video sequence of multiple image frames.

Encoder process 64 is described with reference to encoding video information corresponding to a single object within an image frame. As shown in FIGS. 2A and 2B and indicated above, encoder process 64 is performed separately for each of the objects (e.g., objects 56 and 58 of FIGS. 2A and 2B) in an image frame. Moreover, many video images include a background over which arbitrary numbers of image features or objects are rendered. Preferably, the background is processed as an object after all user-designated objects are processed.

Processing of the objects in an image frame requires that the objects be separately identified. Preferably, encoder process 64 is applied to the objects of an image frame beginning with the forward-most object or objects and proceeding successively to the back-most object (e.g., the background). The compositing of the encoded objects into a video image preferably proceeds from the rear-most object (e.g., the background) and proceeds successively to the forward-most object (e.g., rectangular solid 56 in FIGS. 2A and 2B). The layering of encoding objects may be communicated as distinct layering data associated with the objects of an image frame or, alternatively, by transmitting or obtaining the encoded objects in a sequence corresponding to the layering or compositing sequence.

Object Segmentation and Tracking

In a preferred embodiment, the segmentation of objects within image frames referred to in function block 66 allows interactive segmentation by users. This object segmentation technique provides improved accuracy in segmenting objects and is relatively fast and provides users with optimal flexibility in defining objects to be segmented.

Figure 4:
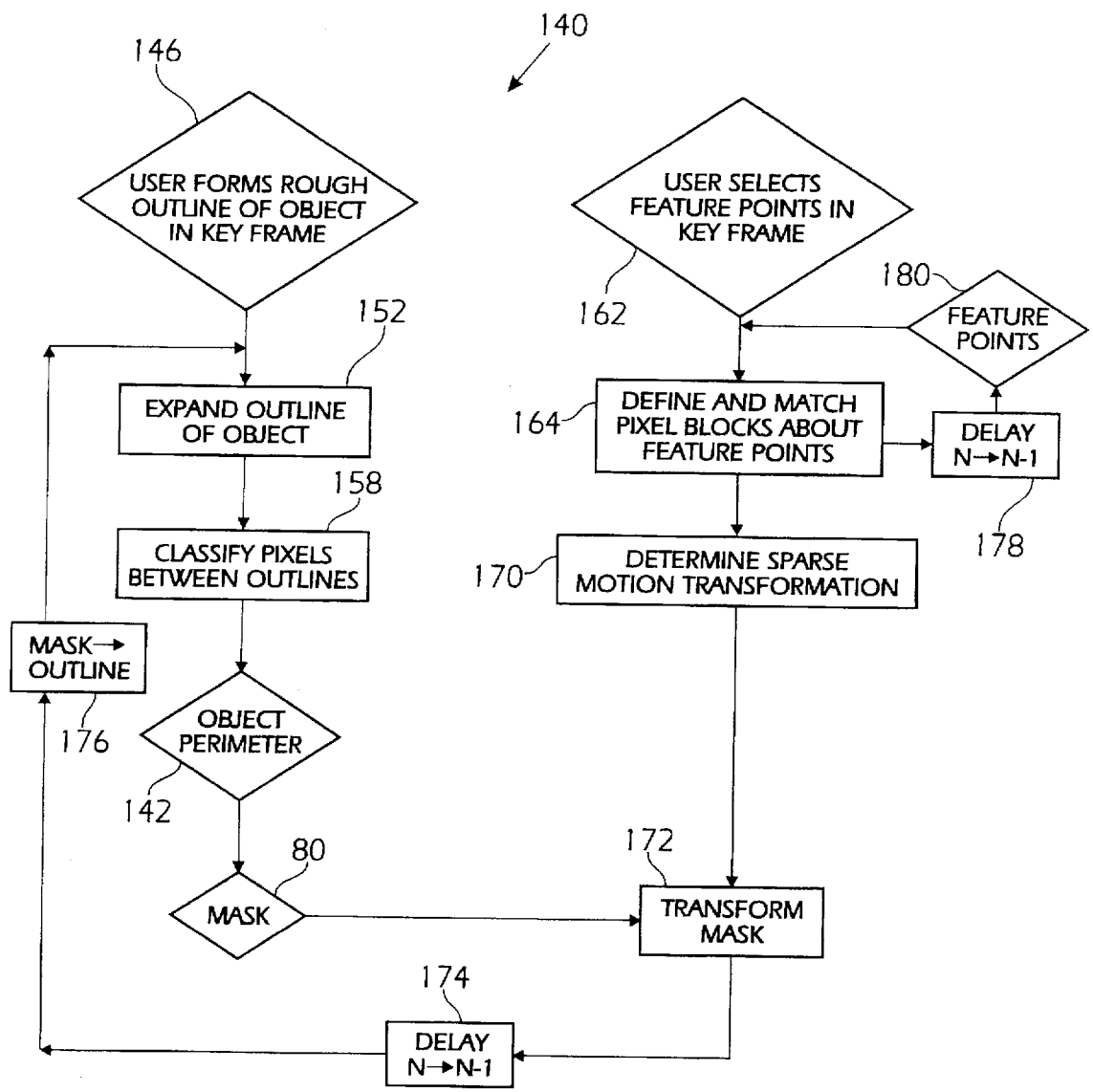
FIG. 4 is a functional block diagram of an object segmentation process for segmenting selected objects from an image frame of a video sequence.

FIG. 4 is a functional block diagram of an object segmentation process 140 for segmenting selected objects from an image frame of a video sequence. Object segmentation according to process 140 provides a perceptual grouping of objects that is accurate and quick and easy for users to define.

Figure 5A:
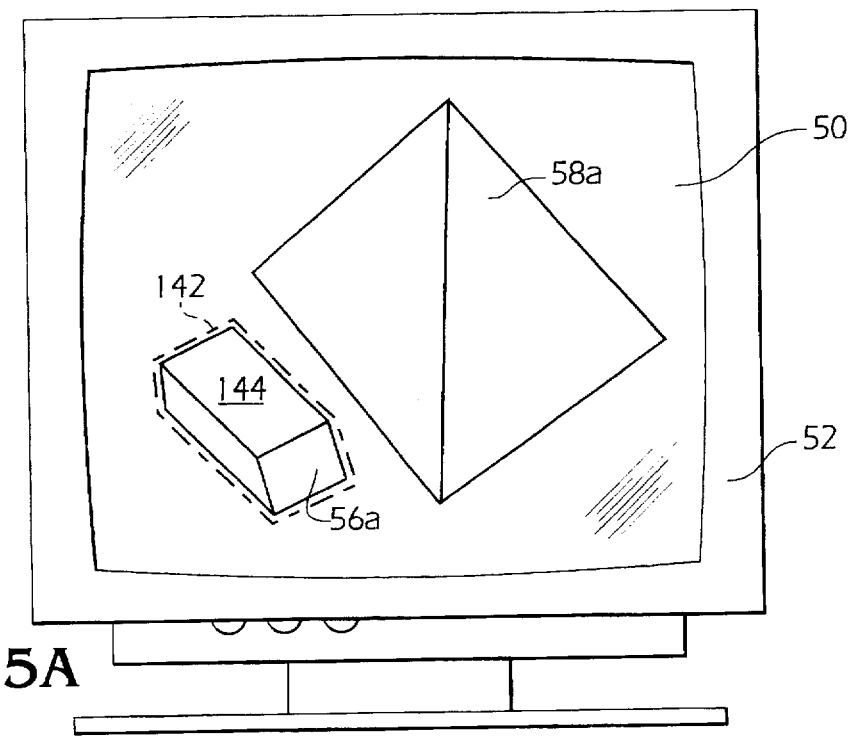
FIG. 5A is simplified representation of display screen of the video display device of FIG. 2A.

FIG. 5A is simplified representation of display screen 50 of video display device 52 showing image frame 54a and the segmentation of rectangular solid object 56a. In its rendering on display screen 50, rectangular solid object 56a includes an object perimeter 142 (shown spaced apart from object 56a for clarity) that bounds an object interior 144. Object interior 144 refers to the outline of object 56a on display screen 50 and in general may correspond to an inner surface or, as shown, an outer surface of the image feature.

Figure 5B:
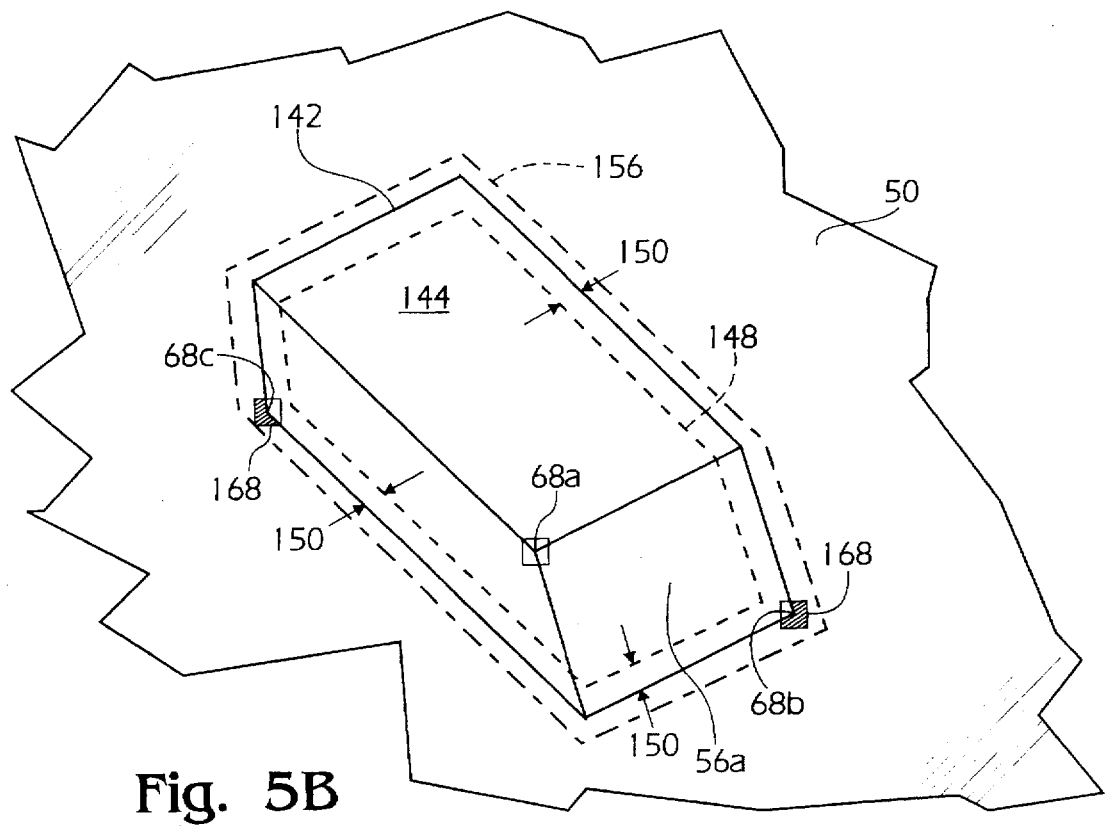
FIG. 5B is an enlarged representation of a portion of the display screen of FIG. 5A.

FIG. 5B is an enlarged representation of a portion of display screen 50 showing the semi-automatic segmentation of rectangular solid object 56a. The following description is made with specific reference to rectangular solid object 56a, but is similarly applicable to each object to be segmented from an image frame.

Function block 146 indicates that a user forms within object interior 144 an interior outline 148 of object perimeter 142. The user preferably forms interior outline 148 with a conventional pointer or cursor control device, such as a mouse or trackball. Interior outline 148 is formed within a nominal distance 150 from object perimeter 142. Nominal distance 150 is selected by a user to be sufficiently large that the user can form interior outline 148 relatively quickly within nominal distance 150 of perimeter 142. Nominal distance 150 corresponds, for example, to between about 4 and 10 pixels.

Function block 146 is performed in connection with a key frame of a video sequence. With reference to a scene in a conventional motion picture, for example, the key frame could be the first frame of the multiple frames in a scene. The participation of the user in this function renders object segmentation process 140 semi-automatic, but significantly increases the accuracy and flexibility with which objects are segmented. Other than for the key frame, objects in subsequent image frames are segmented automatically as described below in greater detail.

Function block 152 indicates that interior outline 148 is expanded automatically to form an exterior outline 156. The formation of exterior outline 156 is performed as a relatively simple image magnification of outline 148 so that exterior outline 156 is a user-defined number of pixels from interior outline 148. Preferably, the distance between interior outline 148 and exterior outline 156 is approximately twice distance 150.

Function block 158 indicates that pixels between interior outline 148 and exterior outline 156 are classified according to predefined attributes as to whether they are within object interior 144, thereby to identify automatically object perimeter 142 and a corresponding mask 80 of the type described with reference to FIG. 3A. Preferably, the image attributes include pixel color and position, but either attribute could be used alone or with other attributes.

In the preferred embodiment, each of the pixels in interior outline 148 and exterior outline 156 defines a "cluster center" represented as a five-dimensional vector in the form of (r, g, b, x, y). The terms r, g, and b correspond to the respective red, green, and blue color components associated with each of the pixels, and the terms x and y correspond to the pixel locations. The m-number of cluster center vectors corresponding to pixels in interior outline 148 are denoted as $\{I_0, I_1, \ldots, I_{m-1}\}$, and the n-number of cluster center vectors corresponding pixels in exterior outline 156 are denoted as $\{O_0, O_1, \ldots, O_{n-1}\}$.

Pixels between the cluster center vectors $I_i$ and $O_j$ are classified by identifying the vector to which each pixel is closest in the five-dimensional vector space. For each pixel, the absolute distance $d_i$ and $d_j$ to each of respective cluster center vectors $I_i$ and $O_j$ is computed according to the following equations:

$$d_i = w_{color}(|r-r_i|+|g-g_i|+|b-b_i|)+w_{coord}(|x-x_i|+|y-y_i|), 0 \leq i < m,$$

$$d_j = w_{color}(|r-r_j|+|g-g_j|+|b-b_j|)+w_{coord}(|x-x_j|+|y-y_j|), 0 \leq j < n,$$

in which $w_{color}$ and $w_{coord}$ are weighting factors for the respective color and pixel position information. Weighting factors $w_{color}$ and $w_{coord}$ are of values having a sum of 1 and otherwise selectable by a user. Preferably, weighting factors $w_{color}$ and $w_{coord}$ are of an equal value of 0.5. Each pixel is associated with object interior 144 or exterior according to the minimum five-dimensional distance to one of the cluster center vectors $I_i$ and $O_j$.

Function block 162 indicates that a user selects at least two, and preferable more (e.g. 4 to 6), feature points in each object of an initial or key frame. Preferably, the feature points are relatively distinctive aspects of the object. With reference to rectangular solid image feature 56, for example, corners 70a–70c could be selected as feature points.

Function block 164 indicates that a block 166 of multiple pixels centered about each selected feature point (e.g., corners 70a–70c) is defined and matched to a corresponding block in a subsequent image frame (e.g., the next successive image frame). Pixel block 166 is user defined, but preferably includes a 32×32 pixel array that includes only pixels within image interior 144. Any pixels 168 (indicated by cross-hatching) of pixel block 166 falling outside object interior 144 as determined by function block 158 (e.g., corners 70b and 70c) are omitted. Pixel blocks 166 are matched to the corresponding pixel blocks in the next image frame according to a minimum absolute error identified by a conventional block match process or a polygon match process, as described below in greater detail.

Function block 170 indicates that a sparse motion transformation of an object is determined from the corresponding feature points in two successive image frames. Function block 172 indicates that mask 80 of the current image frame is transformed according to the sparse motion transformation to provide an estimation of the mask 80 for the next image frame. Any feature point in a current frame not identified in a successive image frame is disregarded.

Function block 174 indicates that the resulting estimation of mask 80 for the next image frame is delayed by one frame, and functions as an outline 176 for a next successive cycle. Similarly, function block 178 indicates that the corresponding feature points also are delayed by one frame, and utilized as the initial feature points 180 for the next successive frame.

Polygon Match Method

Figure 6:
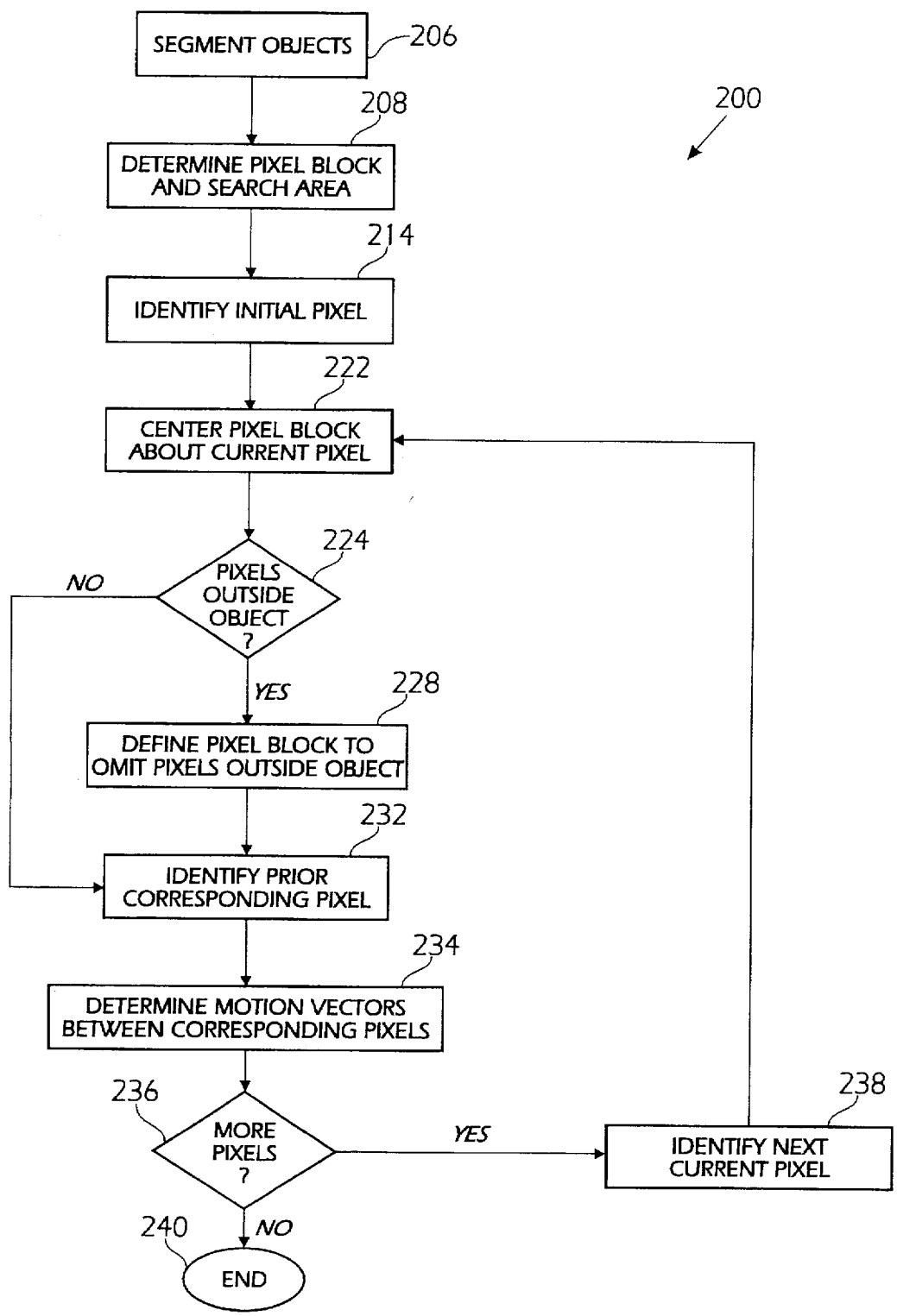
FIG. 6 is a functional block diagram of a polygon match process for determining a motion vector for corresponding pairs of pixels in corresponding objects in successive image frames.

FIG. 6 is a functional block diagram of a polygon match process 200 for determining a motion vector for each corresponding pair of pixels in successive image frames. Such a dense motion vector determination provides the basis for determining the dense motion transformations 96 of FIG. 3A.

Polygon match process 200 is capable of determining extensive motion between successive image frames like the conventional block match process. In contrast to the conventional block match process, however, polygon match process 200 maintains its accuracy for pixels located near or at an object perimeter and generates significantly less error. A preferred embodiment of polygon match method 200 has improved computational efficiency.

Figure 7A:
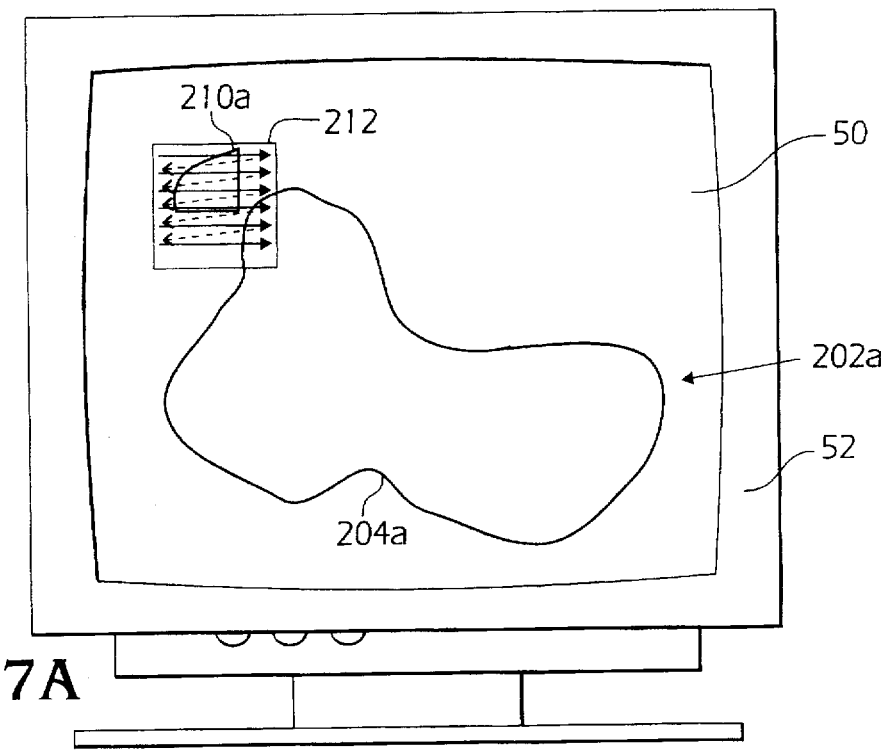
FIGS. 7A and 7B are simplified representations of a display screen showing two successive image frames with two corresponding objects.

Polygon block method 200 is described with reference to FIGS. 7A and 7B, which are simplified representations of display screen 50 showing two successive image frames 202a and 202b in which an image feature 204 is rendered as objects 204a and 204b, respectively.

Function block 206 indicates that objects 204a and 204b for image frames 202a and 202b are identified and segmented by, for example, object segmentation method 140.

Function block 208 indicates that dimensions are determined for a pixel block 210b (e.g., 15×15 pixels) to be applied to object 204b and a search area 212 about object 204a. Pixel block 210b defines a region about each pixel in object 204b for which region a corresponding pixel block 210a is identified in object 204a. Search area 212 establishes a region within which corresponding pixel block 210a is sought. Preferably, pixel block 210b and search area 212 are right regular arrays of pixels and of sizes defined by the user.

Function block 214 indicates that an initial pixel 216 in object 204b is identified and designated the current pixel. Initial pixel 216 may be defined by any of a variety of criteria such as, for example, the pixel at the location of greatest vertical extent and minimum horizontal extent. With the pixels on display screen 50 arranged according to a coordinate axis 220 as shown, initial pixel 216 may be represented as the pixel of object 214b having a maximum y-coordinate value and a minimum x-coordinate value.

Function block 222 indicates that pixel block 210b is centered at and extends about the current pixel.

Figure 7B:
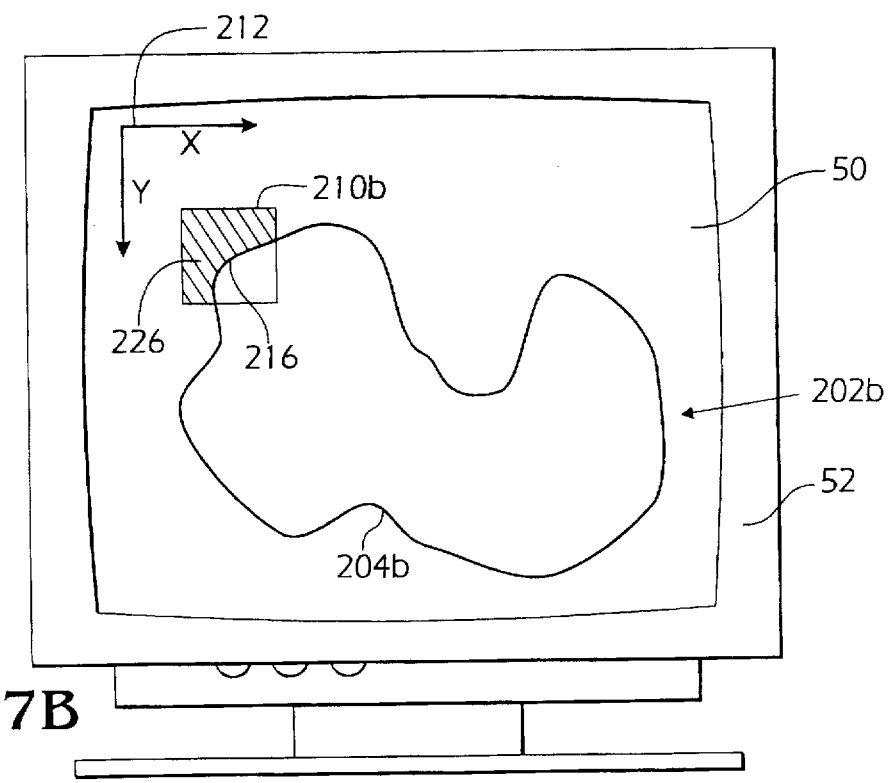

Function block 224 represents an inquiry as to whether pixel block 210b includes pixels that are not included in object 204b (e.g., pixels 226 shown by cross-hatching in FIG. 7B). This inquiry is made with reference to the objects identified according to function block 206. Whenever pixels within pixel block 210b positioned at the current pixel fall outside object 204b, function block 224 proceeds to function block 228 and otherwise proceeds to function block 232.

Function block 228 indicates that pixels of pixel block 210b falling outside object 204b (e.g., pixels 226) are omitted from the region defined by pixel block 210b so that it includes only pixels within object 204b. As a result, pixel block 210b defines a region that typically would be of a polygonal shape more complex than the originally defined square or rectangular region.

Function block 232 indicates that a pixel in object 204a is identified as corresponding to the current pixel in object 204b. The pixel in object 204a is referred to as the prior corresponding pixel. Preferably, the prior corresponding pixel is identified by forming a pixel block 210a about each pixel in search area 212 and determining a correlation between the pixel block 210a and pixel block 210b about the current pixel in object 204b. Each correlation between pixel blocks 210a and 210b may be determined, for example, a means absolute error. The prior corresponding pixel is identified by identifying the pixel block 210a in search area 212 for which the mean absolute error relative to pixel block 210b is minimized. A mean absolute error E for a pixel block 210a relative to pixel block 210b may be determined as:

$$E = \sum_{i=0}^{m-1} \sum_{j=0}^{n-1} (|r_{ij} - r_{ij}'| + |g_{ij} - g_{ij}'| + |b_{ij} - b_{ij}'|),$$

in which the terms $r_{ij}'$, $g_{ij}'$, and $b_{ij}'$ correspond to the respective red, green, and blue color components associated with each of the pixels in pixel block 210b and the terms $r_{ij}'$, $g_{ij}'$, and $b_{ij}'$ correspond to the respective red, green, and blue color components associated with each of the pixels in pixel block 210a.

As set forth above, the summations for the mean absolute error E imply pixel blocks having pixel arrays having m×n pixel dimensions. Pixel blocks 210b of polygonal configuration are accommodated relatively simply by, for example, defining zero values for the color components of all pixels outside polygonal pixel blocks 210b.

Function block 234 indicates that a motion vector MV between each pixel in object 204b and the corresponding prior pixel in object 204a is determined. A motion vector is defined as the difference between the locations of the pixel in object 204b and the corresponding prior pixel in object 204a: MV=($|x_i-x_k'|$, $|y_j-y_l'|$), in which the terms $x_i$ and $y_j$ correspond to the respective x- and y-coordinate positions of the pixel in pixel block 210b, and the terms $x_k'$ and $y_1'$ correspond to the respective x- and y-coordinate positions of the corresponding prior pixel in pixel block 210a.

Function block 236 represents an inquiry as to whether object 204b includes any remaining pixels. Whenever object 204b includes remaining pixels, function block 236 proceeds to function block 238 and otherwise proceeds to end block 240.

Function block 238 indicates that a next pixel in object 204b is identified according to a predetermined format or sequence. With the initial pixel selected as described above in reference to function block 214, subsequent pixels may be defined by first identifying the next adjacent pixel in a row (i.e., of a common y-coordinate value) and, if object 204 includes no other pixels in a row, proceeding to the first or left-most pixel (i.e., of minimum x-coordinate value) in a next lower row. The pixel so identified is designated the current pixel and function block 238 returns to function block 222.

Polygon block method 200 accurately identifies corresponding pixels even if they are located at or near an object perimeter. A significant source of error in conventional block matching processes is eliminated by omitting or disregarding pixels of pixel blocks 210b falling outside object 204b. Conventional block matching processes rigidly apply a uniform pixel block configuration and are not applied with reference to a segmented object. The uniform block configurations cause significant errors for pixels adjacent the perimeter of an object because the pixels outside the object can undergo significant changes as the object moves or its background changes. With such extraneous pixel variations included in conventional block matching processes, pixels in the vicinity of an object perimeter cannot be correlated accurately with the corresponding pixels in prior image frames.

For each pixel in object 204b, a corresponding prior pixel in object 204a is identified by comparing pixel block 210b with a pixel block 210a for each of the pixels in prior object 204a. The corresponding prior pixel is the pixel in object 204a having the pixel block 210a that best correlates to pixel block 210b. If processed in a conventional manner, such a determination can require substantial computation to identify each corresponding prior pixel. To illustrate, for pixel blocks having dimensions of n×n pixels, which are significantly smaller than a search area 212 having dimensions of m×m pixels, approximately $n^2 \times m^2$ calculations are required to identify each corresponding prior pixel in the prior object 204a.

Pixel Block Correlation Process

Figure 8:
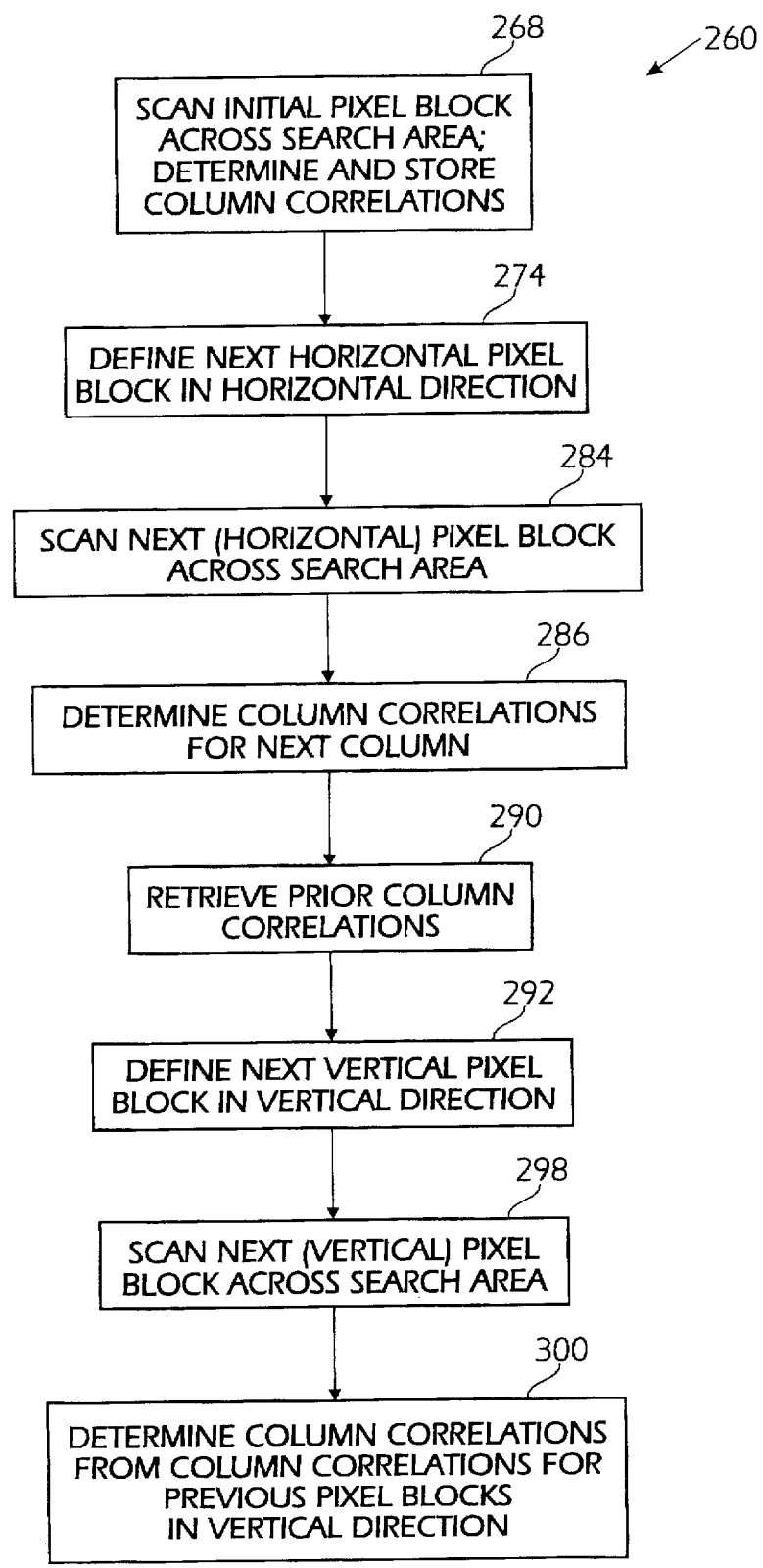
FIG. 8 is a functional block diagram of an alternative pixel block correlation process.

FIG. 8 is a functional block diagram of a modified pixel block correlation process 260 that preferably is substituted for the one described with reference to function block 232. Modified correlation process 260 utilizes redundancy inherent in correlating pixel blocks 210b and 210a to significantly reduce the number of calculations required.

Figures 9A, 9B, 9C, 9D:
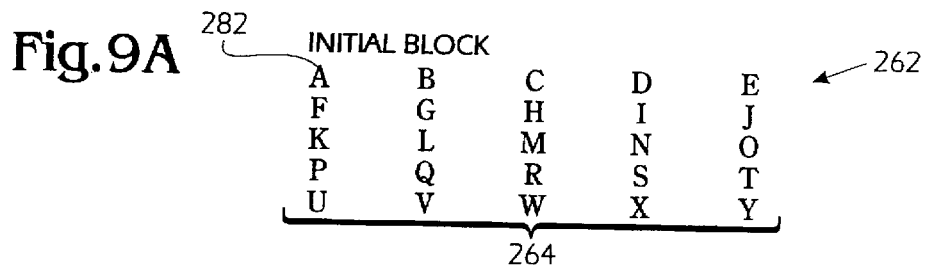

Correlation process 260 is described with reference to FIGS. 9A-9G and 10A-10G, which schematically represent arbitrary groups of pixels corresponding to successive image frames 202a and 202b. In particular, FIG. 9A is a schematic representation of a pixel block 262 having dimensions of 5×5 pixels in which each letter corresponds to a different pixel. The pixels of pixel block 262 are arranged as a right regular array of pixels that includes distinct columns 264. FIG. 9B represents an array of pixels 266 having dimensions of q×q pixels and corresponding to a search area 212 in a prior image frame 202a. Each of the numerals in FIG. 9B represents a different pixel. Although described with reference to a conventional right regular pixel block 262, correlation process 260 is similarly applicable to polygonal pixel blocks of the type described with reference to polygon match process 200.

Function block 268 indicates that an initial pixel block (e.g., pixel block 262) is defined with respect to a central pixel M and scanned across a search area 212 (e.g., pixel array 266) generally in a raster pattern (partly shown in FIG. 7A) as in a conventional block match process. FIGS. 9C-9G schematically illustrate five of the approximately $q^2$ steps in the block matching process between pixel block 262 and pixel array 266.

Although the scanning of pixel block 262 across pixel array 266 is performed in a conventional manner, computations relating to the correlation between them are performed differently in this implementation. In particular, a correlation (e.g., a mean absolute error) is determined and stored for each column 264 of pixel block 262 in each scan position. The correlation that is determined and stored for each column 264 of pixel block 262 in each scanned position is referred to as a column correlation 270, several of which are symbolically indicated in FIGS. 9C-9G by referring to the correlated pixels. To illustrate, FIG. 9C shows a column correlation 270(1) that is determined for the single column 264 of pixel block 262 aligned with pixel array 266. Similarly, FIG. 9D shows column correlations 270(2) and 270(3) that are determined for the two columns 264 of pixel block 262 aligned with pixel array 266. FIGS. 9E-9G show similar column correlations with pixel block 262 at three exemplary subsequent scan positions relative to pixel array 266.

The scanning of initial pixel block 262 over pixel array 266 provides a stored array or database of column correlations. With pixel block 262 having r-number of columns 264, and pixel array 266 having q×q pixels, the column correlation database includes approximately $rq^2$ number of column correlations. This number of column correlations is only approximate because pixel block 262 preferably is initially scanned across pixel array 266 such that pixel M is aligned with the first row of pixels in pixel array 266.

The remaining steps beginning with the one indicated in FIG. 9C occur after two complete scans of pixel block 262 across pixel array 266 (i.e., with pixel M aligned with the first and second rows of pixel array 266).

Function block 274 indicates that a next pixel block 276 (FIG. 10A) is defined from, for example, image frame 202b with respect to a central pixel N in the same row as pixel M. Pixel block 276 includes a column 278 of pixels not included in pixel block 262 and columns 280 of pixels included in pixel block 262. Pixel block 276 does not include a column 282 (FIG. 9A) that was included in pixel block 262. Such an incremental definition of next pixel block 276 is substantially the same as that used in conventional block matching processes.

Function block 284 indicates that pixel block 276 is scanned across pixel array 266 in the manner described above with reference to function block 268. As with FIGS. 9C–9G, FIGS. 10B–10G represent the scanning of pixel block 276 across pixel array 266.

Function block 286 indicates that for column 278 a column correlation is determined and stored at each scan position. Accordingly, column correlations 288(1)–288(5) are made with respect to the scanned positions of column 278 shown in respective FIGS. 10B–10F.

Figures 10A, 10B, 10C, 10D:
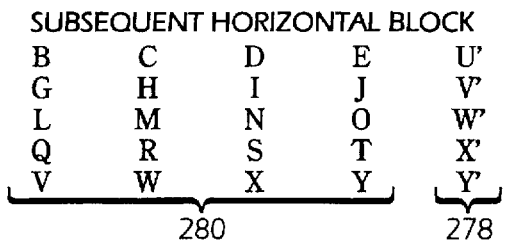

Function block 290 indicates that for each of columns 280 in pixel block 276 a stored column determination is retrieved for each scan position previously computed and stored in function block 268. For example, column correlation 270(1) of FIG. 9C is the same as column correlation 270'(1) of FIG. 10C. Similarly, column correlations 270'(2), 270'(3), 270' (5)–270'(8), and 270'(15)–270'(18) of FIGS. 10D–10F are the same as the corresponding column correlations in FIGS. 9D, 9E, and 9G. For pixel block 276, therefore, only one column correlation 288 is calculated for each scan position. As a result, the number of calculations required for pixel block 276 is reduced by nearly 80 percent.

Function block 292 indicates that a subsequent pixel block 294 (FIG. 11A) is defined with respect to a central pixel R in the next successive row relative to pixel M. Pixel block 294 includes columns 296 of pixels that are similar to but distinct from columns 264 of pixels in pixel block 262 of FIG. 9A. In particular, columns 296 include pixels A'–E' not included in columns 264. Such an incremental definition of subsequent pixel block 294 is substantially the same as that used in conventional block matching processes.

Function block 298 indicates that pixel block 294 is scanned across pixel array 266 (FIG. 9B) in the manner described above with reference to function blocks 268 and 276. FIGS. 11B–11F represent the scanning of pixel block 294 across pixel array 266.

Function block 300 indicates that a column correlation is determined and stored for each of columns 296. Accordingly, column correlations 302(1)–302(18) are made with respect to the scanned positions of columns 296 shown in FIGS. 11B–11F.

Each of column correlations 302(1)–302(18) may be calculated in an abbreviated manner with reference to column correlations made with respect to pixel block 262 (FIG. 9A).

For example, column correlations 302(4)–302(8) of FIG. 11D include subcolumn correlations 304'(4)–304'(8) that are the same as subcolumn correlations 304(4)–304(8) of FIG. 9E. Accordingly, column correlations 302(4)–302(8) may be determined from respective column correlations 270(4)–270 (8) by subtracting from the latter correlation values for pixels 01A, 02B, 03C, 04D, and 05E to form subcolumn correlations 304(4)–304(8), respectively. Column correlations 302(4)–302(8) may be obtained by adding correlation values for the pixel pairs 56A', 57B',58C', 59D' and 50E' to the respective subcolumn correlation values 304(4)–304(8), respectively.

The determination of column correlations 302(4)–302(8) from respective column correlations 270(4)–270(8) entails subtracting individual pixel correlation values corresponding to the row of pixels A–E of pixel block 262 not included in pixel block 294, and adding pixel correlation values for the row of pixels A'–E' included in pixel block 294 but not pixel block 262. This method substitutes for each of column correlations 302(4)–302(8), one substraction and one addition for the five additions that would be required to determine each column correlation in a conventional manner. With pixel blocks of larger dimensions as are preferred, the improvement of this method over conventional calculation methods is even greater. Conventional block matching processes identify only total block correlations for each scan position of initial pixel block 262 relative to pixel array 266. As a consequence, all correlation values for all pixels must be calculated separately for each scan position. In contrast, correlation process 260 utilizes stored column correlations 270 to significantly reduce the number of calculations required. The improvements in speed and processor resource requirements provided by correlation process 260 more than offset the system requirements for storing the column correlations.

It will be appreciated that correlation process 260 has been described with reference to FIGS. 9–11 to illustrate specific features of this implementation. As shown in the illustrations, this implementation includes recurring or cyclic features that are particularly suited to execution by a computer system. These recurring or cyclic features are dependent upon the dimensions of pixel blocks and pixel arrays and are well understood and can be implemented by persons skilled in the art.

Multi-Dimensional Transformation

Figure 13:
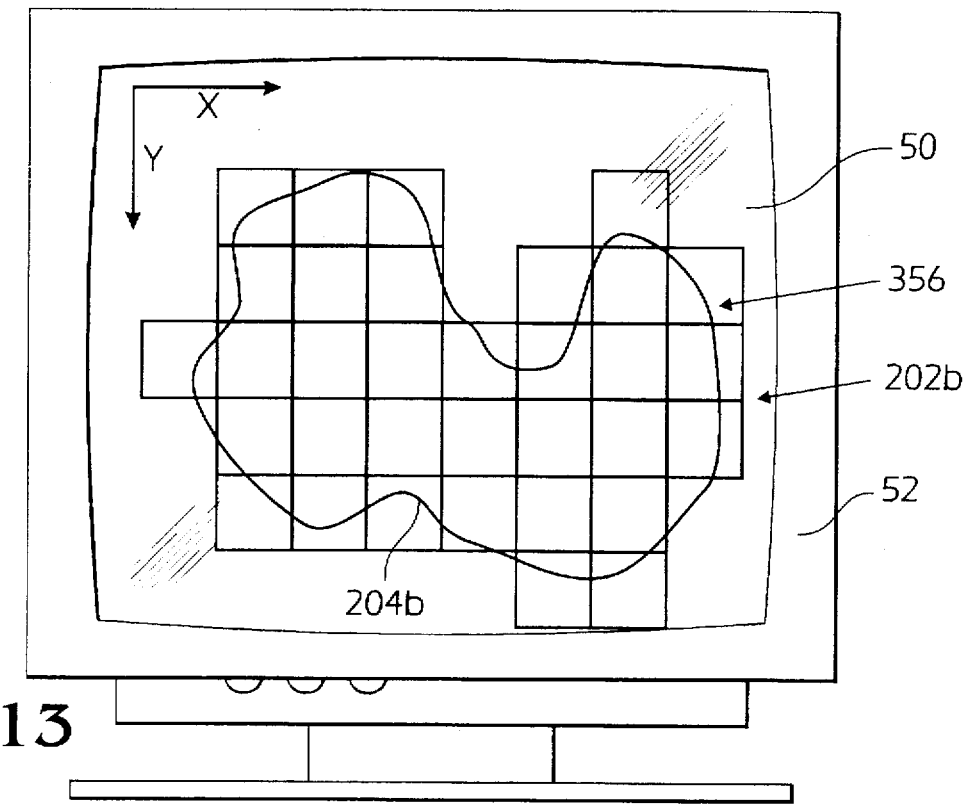
FIG. 13 is a simplified representation of a display screen showing the image frame of FIG. 7B for purposes of illustrating the multi-dimensional transformation method of FIG. 12.

FIG. 12 is a functional block diagram of a transformation method 350 that includes generating a multi-dimensional transformation between objects in first and second successive image frames and quantitizing the mapping for transmission or storage. The multi-dimensional transformation preferably is utilized in connection with function block 96 of FIG. 3. Transformation method 350 is described with reference to FIG. 7A and FIG. 13, the latter of which like FIG. 7B is a simplified representation of display screen 50 showing image frame 202b in which image feature 204 is rendered as object 204b.

Transformation method 350 preferably provides a multi-dimensional affine transformation capable of representing complex motion that includes any or all of translation, rotation, magnification, and shear. Transformation method 350 provides a significant improvement over conventional video compression methods such a MPEG-1, MPEG-2, and H.26X, which are of only one dimension and represent only translation. In this regard, the dimensionality of a transformation refers to the number of coordinates in the generalized form of the transformation, as described below in greater detail. Increasing the accuracy with which complex motion is represented results in fewer errors than by conventional representations, thereby increasing compression efficiency.

Function block 352 indicates that a dense motion estimation of the pixels in objects 204a and 204b is determined. Preferably, the dense motion estimation is obtained by polygon match process 200. As described above, the dense motion estimation includes motion vectors between pixels at coordinates $(x_i, y_i)$ in object 204b of image frame 202b and corresponding pixels at locations $(x_i', y_i')$ of object 204a in image frame 202a.

Function block 354 indicates that an array of transformation blocks 356 is defined to encompass object 204b. Preferably, transformation blocks 356 are right regular arrays of pixels having dimensions of, for example, 32×32 pixels.

Function block 358 indicates that a multi-dimensional affine transformation is generated for each transformation block 356. Preferably, the affine transformations are of first order and represented as:

$$x_i' = ax_i + by_i + c$$

$$y_i'=dx_i+ey_i+f,$$

and are determined with reference to all pixels for which the motion vectors have a relatively high confidence. These affine transformations are of two dimensions in that $x_i$ and $y_i$ are defined relative to two coordinates: $x_i$ and $y_i$.

The relative confidence of the motion vectors refers to the accuracy with which the motion vector between corresponding pixels can be determined uniquely relative to other pixels. For example, motion vectors between particular pixels that are in relatively large pixel arrays and are uniformly colored (e.g., black) cannot typically be determined accurately. In particular, for a black pixel in a first image frame, many pixels in the pixel array of the subsequent image frame will have the same correlation (i.e., mean absolute value error between pixel blocks).

In contrast, pixel arrays in which pixels correspond to distinguishing features typically will have relatively high correlations for particular corresponding pixels in successive image frames.

The relatively high correlations are preferably represented as a minimal absolute value error determination for particular pixel. Motion vectors of relatively high confidence may, therefore, be determined relative to such uniquely low error values. For example, a high confidence motion vector may be defined as one in which the minimum absolute value error for the motion vector is less than the next greater error value associated with the pixel by a difference amount that is greater than a threshold difference amount. Alternatively, high confidence motion vectors may be defined with respect to the second order derivative of the absolute error values upon which the correlations are determined. A second order derivative of more than a particular value would indicate a relatively high correlation between specific corresponding pixels.

With n-number of pixels with such high-confidence motion vectors, the preferred affine transformation equations are solved with reference to n-number of corresponding pixels in image frames 202a and 202b. Images frames must include at least three corresponding pixels in image frames 202a and 202b with high confidence motion vectors to solve for the six unknown coefficients a, b, c, d, e, and f of the preferred affine transformation equations. With the preferred dimensions, each of transformation blocks 356 includes $2^{10}$ pixels of which significant numbers typically have relatively high confidence motion vectors. Accordingly, the affine transformation equations are over-determined in that a significantly greater number of pixels are available to solve for the coefficients a, b, c, d, e, and f.

The resulting n-number of equations may be represented by the linear algebraic expression:

$$\begin{bmatrix} X_0 & Y_0 & 1 \\ X_1 & Y_1 & 1 \\ X_1 & Y_1 & 1 \\ \cdot & \cdot & \cdot \\ \cdot & \cdot & \cdot \\ \cdot & \cdot & \cdot \\ X_n-1 & Y_n-1 & 1 \end{bmatrix} \begin{bmatrix} a \\ b \\ c \end{bmatrix} = \begin{bmatrix} X_0 \\ X_1 \\ \cdot \\ \cdot \\ \cdot \\ X'_{N-1} \end{bmatrix}$$

-continued $$\begin{bmatrix} X_0 & Y_0 & 1 \\ X_1 & Y_1 & 1 \\ X_1 & Y_1 & 1 \\ \cdot & \cdot & \cdot \\ \cdot & \cdot & \cdot \\ \cdot & \cdot & \cdot \\ X_n-1 & Y_n-1 & 1 \end{bmatrix} \begin{bmatrix} d \\ e \\ f \end{bmatrix} = \begin{bmatrix} Y_0 \\ Y_1 \\ \cdot \\ \cdot \\ \cdot \\ Y_{N-1} \end{bmatrix}$$

Preferably these equations are solved by a conventional singular value decomposition (SVD) method, which provides a minimal least-square error for the approximation of the dense motion vectors. A conventional SVD method is described, for example, in *Numerical Recipes in C*, by Press et al., Cambridge University Press, (1992).

As described above, the preferred two-dimensional affine transformation equations are capable of representing translation, rotation, magnification, and shear of transformation blocks 356 between successive image frames 202a and 202b. In contrast, conventional motion transformation methods used in prior compression standards employ simplified transformation equations of the form:

$$x_i'=x_i+g$$

$$y_i'=y_i+h$$

The prior simplified transformation equations represent motion by only two coefficients, g and h, which represents only one-third the amount of information (i.e., coefficients) obtained by the preferred multi-dimensional transformation equations. To obtain superior compression of the information obtained by transformation method 350 relative to conventional compression methods, the dimensions of transformation block 356 preferably are more than three times larger than the corresponding 16×16 pixel blocks employed in MPEG-1 and MPEG-2 compression methods. The preferred 32×32 pixel dimensions of transformation blocks 356 encompass four times the number of pixels employed in the transformation blocks of conventional transformation methods. The larger dimensions of transformation blocks 356, together with the improved accuracy with which the affine transformation coefficients represent motion of the transformation blocks 356, allow transformation method 350 to provide greater compression than conventional compression methods.

It will be appreciated that the affine coefficients generated typically would be non-integer, floating point values that could be difficult to compress adequately without adversely affecting their accuracy. Accordingly, it is preferable to quantize the affine transformation coefficient to reduce the bandwidth required to store or transmit them.

Function block 362 indicates that the affine transformation coefficients generated with reference to function block 358 are quantized to reduce the bandwidth required to store or transmit them. FIG. 14 is an enlarged fragmentary representation of a transformation block 356 showing three selected pixels, 364a, 364b, and 364c from which the six preferred affine transformation coefficients a–f may be determined.

Pixels 364a–364c are represented as pixel coordinates $(x_1, y_1)$, $(x_2, y_2)$, and $(x_3, y_3)$, respectively. Based upon the dense motion estimation of function block 352, pixels 364a–364c have respective corresponding pixels $(x_1', y_1')$, $(y_2', y_2')$, $(x_3'y_3')$ in preceding image frame 202a. As is conventional, pixel locations $(x_i, y_i)$ are represented by integer values and are solutions to the affine transformation equations upon which the preferred affine transformation coefficients are based. Accordingly, selected pixels 364a–364c are used to calculate the corresponding pixels from the preceding image frame 202a, which typically will be floating point values.

Quantization of these floating point values is performed by converting to integer format the difference between corresponding pixels $(x_i-x'_i, y_i-y'_i)$. The affine transformation coefficients are determined by first calculating the pixel values $(x'_i, y'_i)$ from the difference vectors and the pixel values $(x_i, y_i)$, and then solving the multi-dimensional transformation equations of function block 358 with respect to the pixel values $(x'_i, y'_i)$.

As shown in FIG. 14, pixels 364a–364c preferably are distributed about transformation block 356 to minimize the sensitivity of the quantization to local variations within transformation block 356. Preferably, pixel 364a is positioned at or adjacent the center of transformation block 356, and pixels 364b and 364c are positioned at upper corners. Also in the preferred embodiment, the selected pixels for each of the transformation blocks 356 in object 204b have the same positions, thereby allowing the quantization process to be performed efficiently.

Another aspect of the quantization method of function block 362 is that different levels of quantization may be used to represent varying degrees of motion. As a result, relatively simple motion (e.g., translation) may be represented by fewer selected pixels 364 than are required to represent complex motion. With respect to the affine transformation equations described above, pixel 364a $(x_i, y_i)$ from object 204b and the corresponding pixel $(x_1', y_1')$ from object 204a are sufficient to solve simplified affine transformation equations of the form:

$$x_1'=y_1+c$$

$$y_1'=y_1+f$$

which represent translation between successive image frames. Pixel 364a specifically is used because its central position generally represents translational motion independent of the other types of motion. Accordingly, a user may selectively represent simplified motion such as translation with simplified affine transformation equations that require one-third the data required to represent complex motion.

Similarly, a pair of selected pixels $(x_1, y_1)$ (e.g., pixel 364a ) and $(x_2, y_2)$ (i.e., either of pixels 364b and 364c) from object 204b and the corresponding pixels $(x_1', y_1')$ and $(x_2', y_2')$ from object 204a are sufficient to solve simplified affine transformation equations of the form:

$$x_1'=ax_i+c$$

$$y_i'=ey_i+f$$

which are capable of representing motions that include translation and magnification between successive image frames. In the simplified form:

$$x=a\cos\theta x+\sin\theta y+c$$

$$y=\sin\theta x+a\cos\theta y+f$$

the corresponding pairs of selected pixels are capable of representing motions that include translation, rotation, and isotropic magnification. In this simplified form, the common coefficients of the x and y variables allow the equations to be solved by two corresponding pairs of pixels.

Accordingly, a user may selectively represent moderately complex motion that includes translation, rotation, and magnification with partly simplified affine transformation equations. Such equations would require two-thirds the data required to represent complex motion. Adding the third selected pixel $(x_3, y_3)$ from object 204b, the corresponding pixel $(x_3', y_3')$ from object 204a, and the complete preferred affine transformation equations allows a user also to represent shear between successive image frames.

A preferred embodiment of transformation method 350 (FIG. 12) is described as using uniform transformation blocks 356 having dimensions of, for example, 32×32 pixels. The preferred multi-dimensional affine transformations described with reference to function block 358 are determined with reference to transformation blocks 356. It will be appreciated that the dimensions of transformation blocks 356 directly affect the compression ratio provided by this method.

Fewer transformation blocks 356 of relatively large dimensions are required to represent transformations of an object between image frames than the number of transformation blocks 356 having smaller dimensions. A consequence of uniformly large transformation blocks 356 is that correspondingly greater error can be introduced for each transformation block. Accordingly, uniformly sized transformation blocks 356 typically have moderate dimensions to balance these conflicting performance constraints.

Transformation Block Optimization

Figure 16:
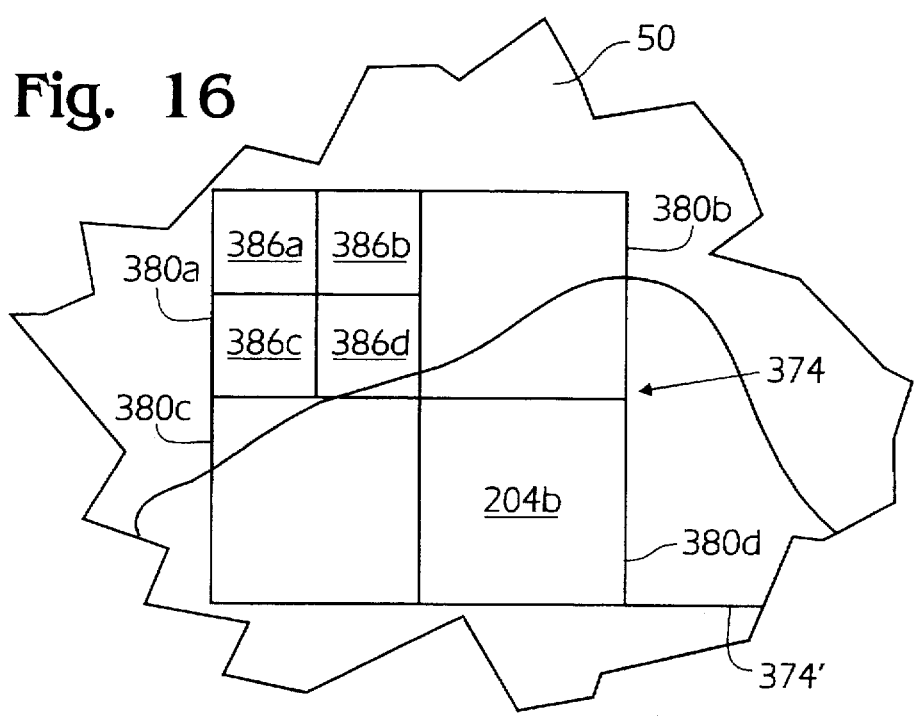
FIG. 16 is a simplified fragmentary representation of a display screen showing the image frame of FIG. 7B for purposes of illustrating the transformation block optimization method of FIG. 15.
Figure 15:
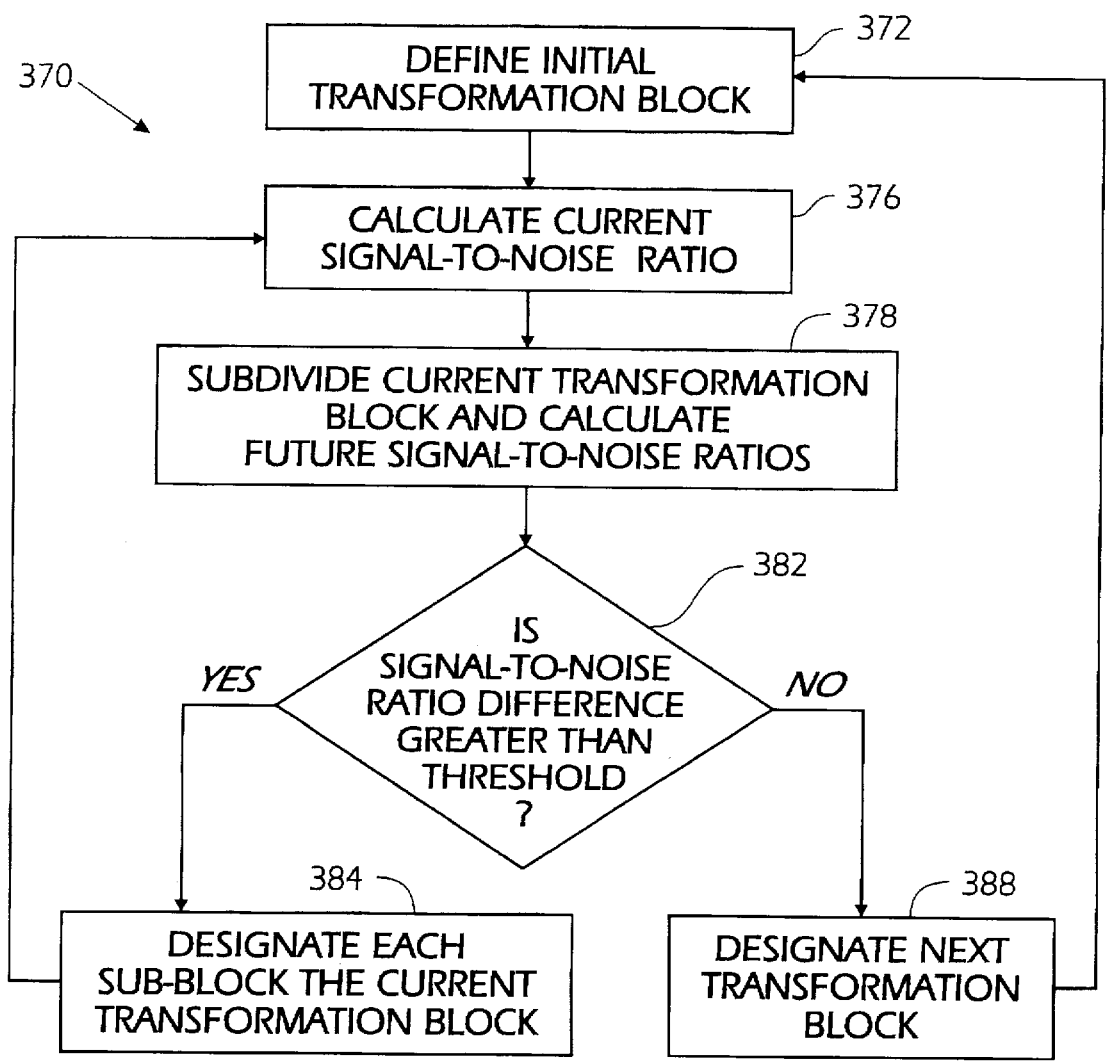
FIG. 15 is a functional block diagram of a transformation block optimization method utilized in an alternative embodiment of the multi-dimensional transformation method of FIG. 12.

FIG. 15 is a functional block diagram of a transformation block optimization method 370 that automatically selects transformation block dimensions that provide a minimal error threshold. Optimization method 370 is described with reference to FIG. 16, which is a simplified representation of display screen 50 showing a portion of image frame 202b with object 204b.

Function block 372 indicates that an initial transformation block 374 is defined with respect to object 204b. Initial transformation block 374 preferably is of maximal dimensions that are selectable by a user and are, for example, 64×64 pixels. Initial transformation block 374 is designated the current transformation block.

Function block 376 indicates that a current signal-to-noise ratio (CSNR) is calculated with respect to the current transformation block. The signal-to-noise ratio preferably is calculated as the ratio of the variance of the color component values of the pixel within the current transformation block (i.e., the signal) to the variance of the color components values of the pixels associated with estimated error 98 (FIG. 3).

Function block 378 indicates that the current transformation block (e.g., transformation block 374) is subdivided into, for example, four equal sub-blocks 380a–380d, affine transformations are determined for each of sub-blocks 380a–380d, and a future signal-to-noise ratio is determined with respect to the affine transformations. The future signal-to-noise ratio is calculated in substantially the same manner as the current signal-to-noise ratio described with reference to function block 376.

Inquiry block 382 represents an inquiry as to whether the future signal-to-noise ratio is greater than the current signal-to-noise ratio by more than a user-selected threshold amount. This inquiry represents a determination that further subdivision of the current transformation block (e.g., transformation block 374) would improve the accuracy of the affine transformations by at least the threshold amount. Whenever the future signal-to-noise ratio is greater than the current signal-to-noise ratio by more than the threshold amount, inquiry block 382 proceeds to function block 384, and otherwise proceeds to function block 388.

Function block 384 indicates that sub-blocks 380a–380d are successively designated the current transformation block, and each are analyzed whether to be further subdivided. For purposes of illustration, sub-block 380a is designated the current transformation and processed according to function block 376 and further sub-divided into sub-blocks 386a–386d. Function block 388 indicates that a next successive transformation block 374' is identified and designated an initial or current transformation block.

Precompression Extracompression Extrapolation Method

Figure 17B:
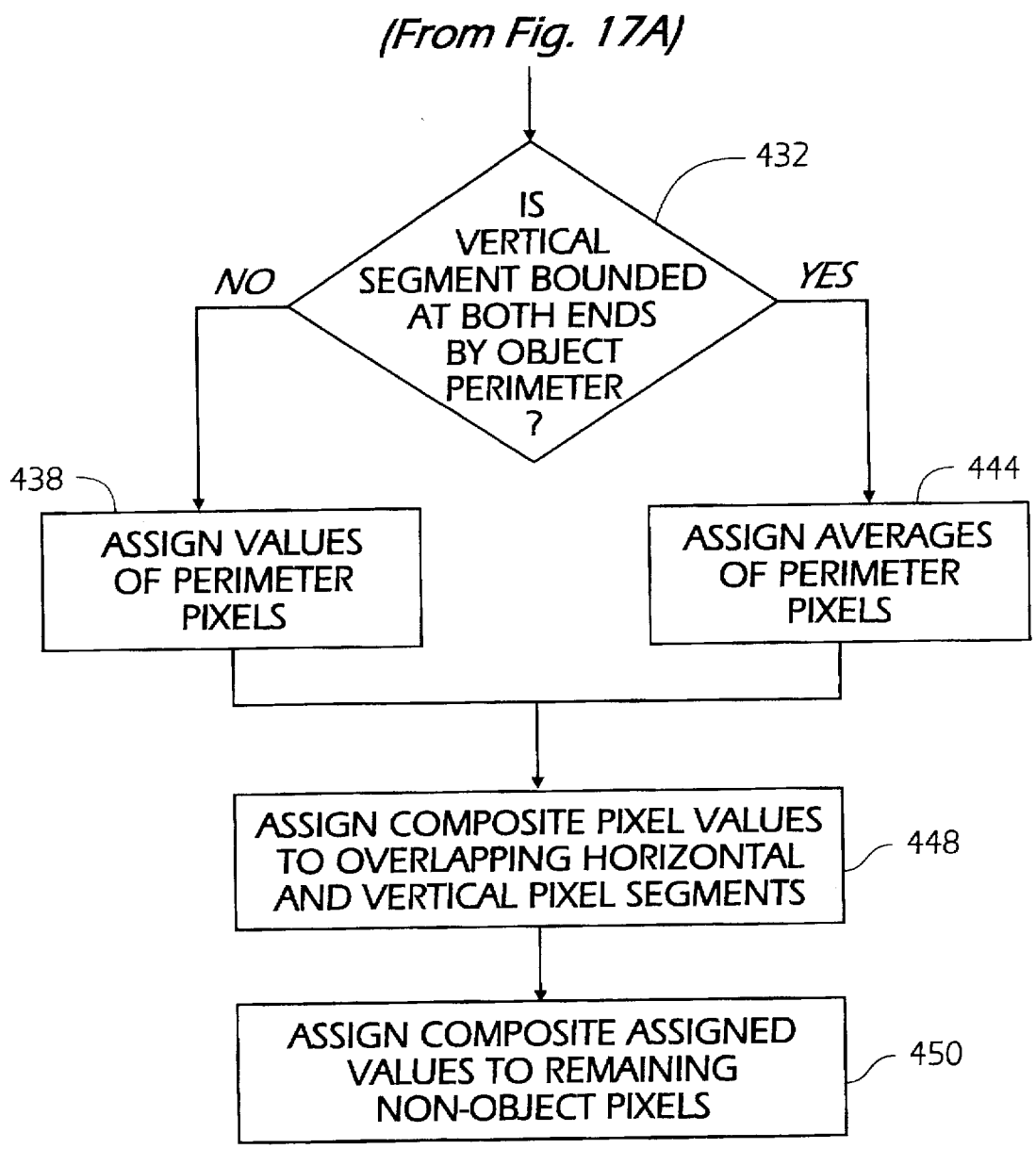

FIGS. 17A and B are a functional block diagram of a precompression extrapolation method 400 for extrapolating image features of arbitrary configuration to a predefined configuration to facilitate compression in accordance with function block 112 of encoder process 64 (both of FIG. 3). Extrapolation method 400 allows the compression of function block 112 to be performed in a conventional manner such as DCT or lattice wavelet compression, as described above.

Conventional still image compression methods such a lattice wavelet compression or discrete cosine transforms (DCT) operate upon rectangular arrays of pixels. The methods described here are applicable to image features or objects of arbitrary configuration. Extrapolating such objects or image features to a rectangular pixel array configuration allows use of conventional still image compression methods such as lattice wavelet compression or DCT. Extrapolation method 400 is described below with reference to FIGS. 18A–18D, which are representations of display screen 50 on which a simple object 402 is rendered to show various aspects of extrapolation method 400.

Figure 18A:
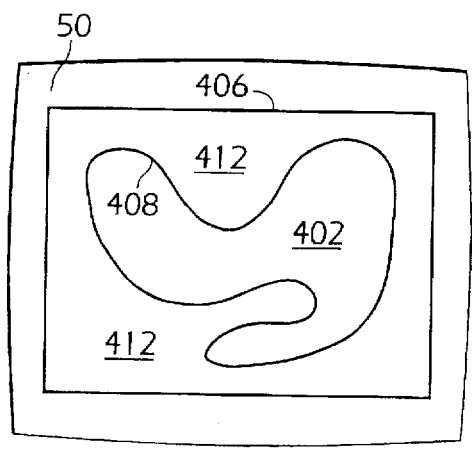
FIGS. 18A-18D are representations of a display screen on which a simple object is rendered to show various aspects of the extrapolation method of FIG. 14.

Function block 404 indicates that an extrapolation block boundary 406 is defined about object 402. Extrapolation block boundary 406 preferably is rectangular. Referring to FIG. 18A, the formation of extrapolation block boundary 406 about object 402 is based upon an identification of a perimeter 408 of object 402 by, for example, object segmentation method 140 (FIG. 4). Extrapolation block boundary 406 is shown encompassing object 402 in its entirety for purposes of illustration. It will be appreciated that extrapolation block boundary 406 could alternatively encompass only a portion of object 402. As described with reference to object segmentation method 140, pixels included in object 402 have color component values that differ from those of pixels not included in object 402.

Function block 410 indicates that all pixels 412 bounded by extrapolation block boundary 406 and not included in object 402 are assigned a predefined value such as, for example, a zero value for each of the color components.

Function block 414 indicates that horizontal lines of pixels within extrapolation block boundary 406 are scanned to identify horizontal lines with horizontal pixel segments having both zero and non-zero color component values.

Figure 18B:
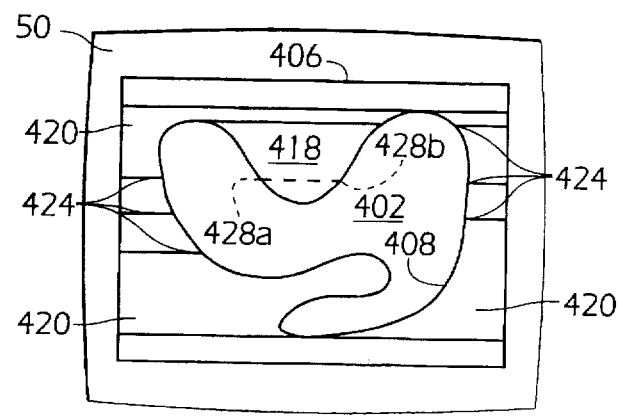

Function block 416 represents an inquiry as to whether the horizontal pixel segments having color component values of zero are bounded at both ends by perimeter 408 of object 402. Referring to FIG. 18B, region 418 represents horizontal pixel segments having color component values of zero that are bounded at both ends by perimeter 408. Regions 420 represent horizontal pixel segments that have color component values of zero and are bounded at only one end by perimeter 408. Function block 416 proceeds to function block 426 for regions 418 in which the pixel segments have color component values of zero bounded at both ends by perimeter 408 of object 402, and otherwise proceeds to function block 422.

Function block 422 indicates that the pixels in each horizontal pixel segment of a region 420 is assigned the color component values of a pixel 424 (only exemplary ones shown) in the corresponding horizontal lines and perimeter 408 of object 402. Alternatively, the color component values assigned to the pixels in regions 420 are functionally related to the color component values of pixels 424.

Function block 426 indicates that the pixels in each horizontal pixel segment in region 418 are assigned color component values corresponding to, and preferably equal to, an average of the color component values of pixels 428a and 428b that are in the corresponding horizontal lines and on perimeter 408.

Function block 430 indicates that vertical lines of pixels within extrapolation block boundary 406 are scanned to identify vertical lines with vertical pixel segments having both zero and non-zero color component values.

Figure 18C:
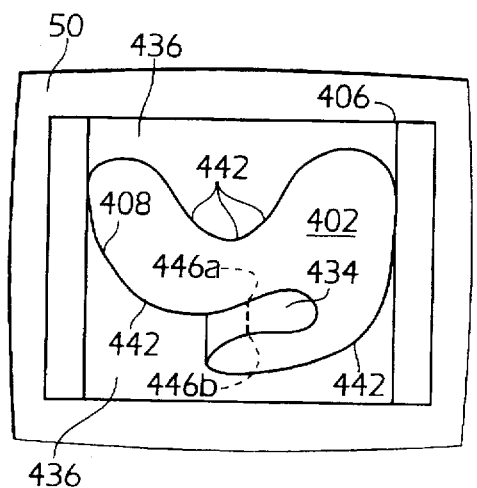

Function block 432 represents an inquiry as to whether the vertical pixel segments in vertical lines having color component values of zero are bounded at both ends by perimeter 408 of object 402. Referring to FIG. 18C, region 434 represents vertical pixel segments having color component values of zero that are bounded at both ends by perimeter 408. Regions 436 represent vertical pixel segments that have color component values of zero and are bounded at only one end by perimeter 408. Function block 432 proceeds to function block 444 for region 434 in which the vertical pixel segments have color component values of zero bounded at both ends by perimeter 408 of object 402, and otherwise proceeds to function block 438.

Function block 438 indicates that the pixels in each vertical pixel segment of region 436 are assigned the color component values of pixels 442 (only exemplary ones shown) in the vertical lines and perimeter 408 of object 402. Alternatively, the color component values assigned to the pixels in region 436 are functionally related to the color component values of pixels 442.

Function block 444 indicates that the pixels in each vertical pixel segment in region 434 are assigned color component values corresponding to, and preferably equal to, an average of the color component values of pixels 446a and 446b that are in the horizontal lines and on perimeter 408.

Function block 448 indicates that pixels that are in both horizontal and vertical pixel segments that are assigned color component values according to this method are assigned composite color component values that relate to, and preferably are the average of, the color component values otherwise assigned to the pixels according to their horizontal and vertical pixel segments.

Examples of pixels assigned such composite color component values are those pixels in regions 418 and 434.

Figure 18D:
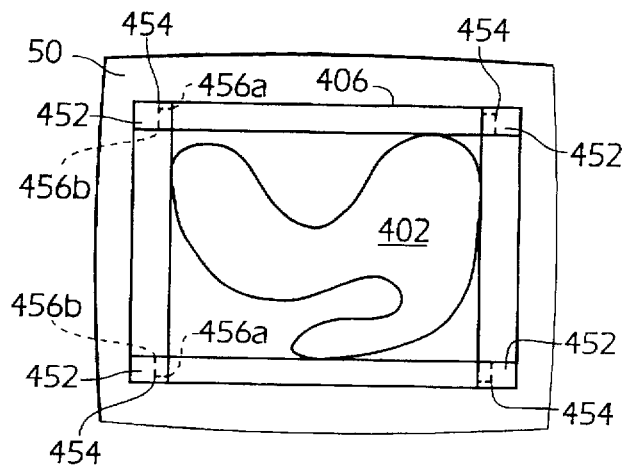

Function block 450 indicates that regions 452 of pixels bounded by extrapolation block boundary 406 and not intersecting perimeter 408 of object 402 along a horizontal or vertical line are assigned composite color component values that are related to, and preferably equal to the average of, the color component values assigned to adjacent pixels. Referring to FIG. 18D, each of pixels 454 in regions 452 is assigned a color component value that preferably is the average of the color component values of pixels 456a and 456b that are aligned with pixel 454 along respective horizontal and vertical lines and have non-zero color component values previously assigned by this method.

A benefit of object extrapolation process 400 is that is assigns smoothly varying color component values to pixels not included in object 402 and therefore optimizes the compression capabilities and accuracy of conventional still image compression methods. In contrast, prior art zero padding or mirror image methods, as described by Chang et al., "Transform Coding of Arbitrarily-Shaped Image Segments," ACM Multimedia, pp. 83–88, June, 1993, apply compression to extrapolated objects that are filled with pixels having zero color components values such as those applied in function block 410. The drastic image change than occurs between an object and the zero-padded padded regions introduces high frequency changes that are difficult to compress or introduce image artifacts upon compression. Object extrapolation method 400 overcomes such disadvantages.

Alternative Encoder Method

FIG. 19A is a functional block diagram of an encoder method 500 that employs a Laplacian pyramid encoder with unique filters that maintain nonlinear aspects of image features, such as edges, while also providing high compression. Conventional Laplacian pyramid encoders are described, for example, in the Laplacian Pyramid as a Compact Image Code by Burt and Addleson, IEEE Trans. Comm., Vol. 31, No. 4, pp. 532–540, April 1983. Encoder method 500 is capable of providing the encoding described with reference to function block 112 of video compression encoder process 64 shown in FIG. 3, as well as whenever else DCT on wavelet encoding is suggested or used. By way of example, encoder method 500 is described with reference to encoding of estimated error 110 (FIG. 3).

A first decimation filter 502 receives pixel information corresponding to an estimated error 110 (FIG. 3) and filters the pixels according to a filter criterion. In a conventional Laplacian pyramid method, the decimation filter is a low-pass filter such as a Gaussian weighting function. In accordance with encoder method 500, however, decimation filter 502 preferably employs a median filter and, more specifically, a 3×3 nonseparable median filter.

To illustrate, FIG. 20A is a simplified representation of the color component values for one color component (e.g., red) for an arbitrary set or array of pixels 504. Although described with particular reference to red color component values, this illustration is similarly applied to the green and blue color component values of pixels 504.

With reference to the preferred embodiment of decimation filter 502, filter blocks 506 having dimensions of 3×3 pixels are defined among pixels 504. For each pixel block 506, the median pixel intensity value is identified or selected. With reference to pixel blocks 506a–506c, for example, decimation filter 502 provides the respective values of 8, 9, and 10, which are listed as the first three pixels 512 in FIG. 20B.

It will be appreciated, however, that decimation filter 502 could employ other median filters. Accordingly, for each group of pixels having associated color component values of $\{a_0, a_1, \ldots, a_{n-1}\}$ the median filter would select a median value $a_M$.

A first 2×2 down sampling filter 514 samples alternate pixels 512 in vertical and horizontal directions to provide additional compression. FIG. 20C represents a resulting compressed set of pixels 515.

A 2×2 up sample filter 516 inserts a pixel of zero value in place of each pixel 512 omitted by down sampling filter 514, and interpolation filter 518 assigns to the zero-value pixel a pixel value of an average of the opposed adjacent pixels, or a previous assigned value if the zero-value pixel is not between an opposed pair of non-zero value pixels. To illustrate, FIG. 20D represents a resulting set or array of value pixels 520.

A difference 522 is taken between the color component values of the set of pixels 504 and the corresponding color component values for set of pixels 520 to form a zero-order image component $I_0$.

A second decimation filter 526 receives color component values corresponding to the compressed set of pixels 515 generated by first 2×2 down sampling filter 514. Decimation filter 526 preferably is the same as decimation filter 502 (e.g., a 3×3 nonseparable median filter). Accordingly, decimation filter 526 functions in the same manner as decimation filter 502 and delivers a resulting compressed set or array of pixels (not shown) to a second 2×2 down sampling filter 528.

Down sampling filter 528 functions in the same manner as down sampling filter 514 and forms a second order image component $L_2$ that also is delivered to a 2×2 up sample filter 530 and an interpolation filter 531 that function in the same manner as up sample filter 516 and interpolation filter 518, respectively. A difference 532 is taken between the color component values of the set of pixels 515 and the resulting color component values provided by interpolation filter 531 to form a first-order image component $I_1$.

The image components $I_0$, $I_1$, and $L_2$ are respective $$n \times n, \ \frac{n}{2} \times \frac{n}{2}, \ \frac{n}{4} \times \frac{n}{4}$$

sets of color component values that represent the color component values for an n×n array of pixels 504.

Image component $I_0$ maintains the high frequency components (e.g., edges) of an image represented by the original set of pixel 504. Image components $I_1$ and $L_2$ represent low frequency aspects of the original image. Image components $I_0$, $I_1$ and $L_2$ provide relative compression of the original image. Image component $I_0$ and $I_1$ maintain high frequency features (e.g., edges) in a format that is highly compressible due to the relatively high correlation between the values of adjacent pixels. Image component $L_2$ is not readily compressible because it includes primarily low frequency image features, but is a set of relatively small size.

FIG. 19B is a functional block diagram of a decoder method 536 that decodes or inverse encodes image components $I_0$, $I_1$, and $L_2$ generated by encoder method 500. Decoder method 536 includes a first 2×2 up sample filter 538 that receives image component $L_2$ and interposes a pixel of zero value between each adjacent pair of pixels. An interpolation filter 539 assigns to the zero-value pixel a pixel value that preferably is an average of the values of the adjacent pixels, or a previous assigned value if the zero-value pixel is not between an opposed pair of non-zero-value pixels. First 2×2 up sample filter 538 operates in substantially the same manner as up sample filters 516 and 530 of FIG. 19A, and interpolation filter 539 operates in substantially the same manner as interpolation filters 518 and 531.

A sum 540 is determined between image component $I_1$ and the color component values corresponding to the decompressed set of pixels generated by first 2×2 up sample filter 538 and interpolation filter 539. A second 2×2 up sample filter 542 interposes a pixel of zero value between each adjacent pair of pixels generated by sum 540. An interpolation filter 543 assigns to the zero-value pixel a pixel value that includes an average of the values of the adjacent pixels, or a previous assigned value if the zero-value pixel is not between an opposed pair of non-zero-value pixels. Up sample filter 542 and interpolation filter 543 are substantially the same as up sample filter 538 and interpolation filter 539, respectively.

A sum 544 sums the image component 10 with the color component values corresponding to the decompressed set of pixels generated by second 2×2 up sample filter 542 and interpolation filter 543. Sum 544 provides decompressed estimated error 110 corresponding to the estimated error 110 delivered to encoder process 500.

Transform Coding of Motion Vectors

Conventional video compression encoder processes, such as MPEG-1 or MPEG-2, utilize only sparse motion vector fields to represent the motion of significantly larger pixel arrays of a regular size and configuration. The motion vector fields are sparse in that only one motion vector is used to represent the motion of a pixel array having dimensions of, for example, 16×16 pixels. The sparse motion vector fields, together with transform encoding of underlying images or pixels by, for example, discrete cosine transform (DCT) encoding, provide conventional video compression encoding.

In contrast, video compression encoding process 64 (FIG. 3) utilizes dense motion vector fields in which motion vectors are determined for all, or virtually all, pixels of an object. Such dense motion vector fields significantly improve the accuracy with which motion between corresponding pixels is represented. Although the increased accuracy can significantly reduce the errors associated with conventional sparse motion vector field representations, the additional information included in dense motion vector fields represent an increase in the amount of information representing a video sequence. Therefore, dense motion vector fields are themselves compressed or encoded to improve the compression ratio.

Figure 21:
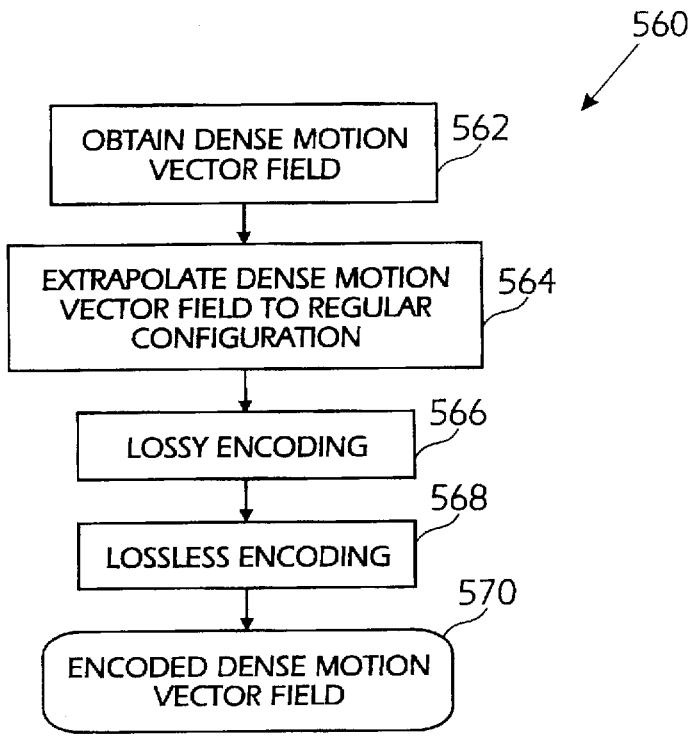
FIG. 21 is a functional block diagram of a motion vector encoding process.

FIG. 21 is a functional block diagram of a motion vector encoding process 560 for encoding or compressing motion vector fields and, preferably, dense motion vector fields such as those generated in accordance with dense motion transformation 96 of FIG. 3. It will be appreciated that such dense motion vector fields from a selected object typically will have greater continuity or "smoothness" than the underlying pixels corresponding to the object. As a result, compression or encoding of the dense motion vector fields will attain a greater compression ratio than would compression or encoding of the underlying pixels.

Function block 562 indicates that a dense motion vector field is obtained for an object or a portion of an object in accordance with, for example, the processes of function block 96 described with reference to FIG. 3. Accordingly, the dense motion vector field will correspond to an object or other image portion of arbitrary configuration or size.

Function block 564 indicates that the configuration of the dense motion vector field is extrapolated to a regular, preferably rectangular, configuration to facilitate encoding or compression. Preferably, the dense motion vector field configuration is extrapolated to a regular configuration by precompression extrapolation method 400 described with reference to FIGS. 17A and 17B. It will be appreciated that conventional extrapolation methods, such as a mirror image method, could alternatively be utilized.

Function block 566 indicates that the dense motion vector field with its extrapolated regular configuration is encoded or compressed according to conventional encoding transformations such as, for example, discrete cosine transformation (DCT) or lattice wavelet compression, the former of which is preferred.

Function block 568 indicates that the encoded dense motion vector field is further compressed or encoded by a conventional lossless still image compression method such as entropy encoding to form an encoded dense motion vector field 570. Such a still image compression method is described with reference to function block 114 of FIG. 3.

Compression of Quantized Objects From Previous Vidoe Frames

Referring to FIG. 3, video compression encoder process 64 uses quantized prior object 98 determined with reference to a prior frame N-1 to encode a corresponding object in a next successive frame N. As a consequence, encoder process 64 requires that quantized prior object 98 be stored in an accessible memory buffer. With conventional video display resolutions, such a memory buffer would require a capacity of at least one megabyte to store the quantized prior object 98 for a single video frame. Higher resolution display formats would require correspondingly larger memory buffers.

Figure 22:
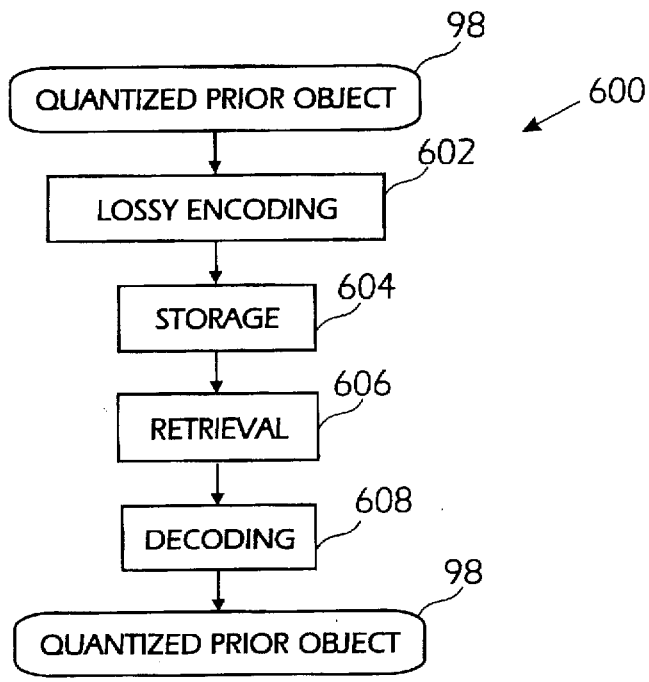
FIG. 22 is a functional block diagram of an alternative quantized object encoder-decoder process.

FIG. 22 is a functional block diagram of a quantized object encoder-decoder (codec) process 600 that compresses and selectively decompresses quantized prior objects 98 to reduce the required capacity of a quantized object memory buffer.

Function block 602 indicates that each quantized object 98 in an image frame is encoded on a block-by-block manner by a lossy encoding or compression method such as discrete cosine transform (DCT) encoding or lattice subband (wavelet) compression.

Function block 604 indicates that the encoded or compressed quantized objects are stored in a memory buffer (not shown).

Function block 606 indicates that encoded quantized objects are retrieved from the memory buffer in anticipation of processing a corresponding object in a next successive video frame.

Function block 608 indicates that the encoded quantized object is inverse encoded by, for example, DCT or wavelet decoding according to the encoding processes employed with respect to function block 602.

Codec process 600 allows the capacity of the corresponding memory buffer to be reduced by up to about 80%. Moreover, it will be appreciated that codec process 600 would be similarly applicable to the decoder process corresponding to video compression encoder process 64.

Video Compression Decoder Process Overview

Video compression encoder process 64 of FIG. 3 provides encoded or compressed representations of video signals corresponding to video sequences of multiple image frames. The compressed representations include object masks 66, feature points 68, affine transform coefficients 104, and compressed error data 116 from encoder process 64 and compressed master objects 136 from encoder process 130. These compressed representations facilitate storage or transmission of video information, and are capable of achieving compression ratios of up to 300 percent greater than those achievable by conventional video compression methods such as MPEG-2.

It will be appreciated, however, that retrieving such compressed video information from data storage or receiving transmission of the video information requires that it be decoded or decompressed to reconstruct the original video signal so that it can be rendered by a display device such as video display device 52 (FIGS. 2A and 2B). As with conventional encoding processes video information is substantially the inverse of the process by which the original video signal is encoded or compressed.

Figure 23A:
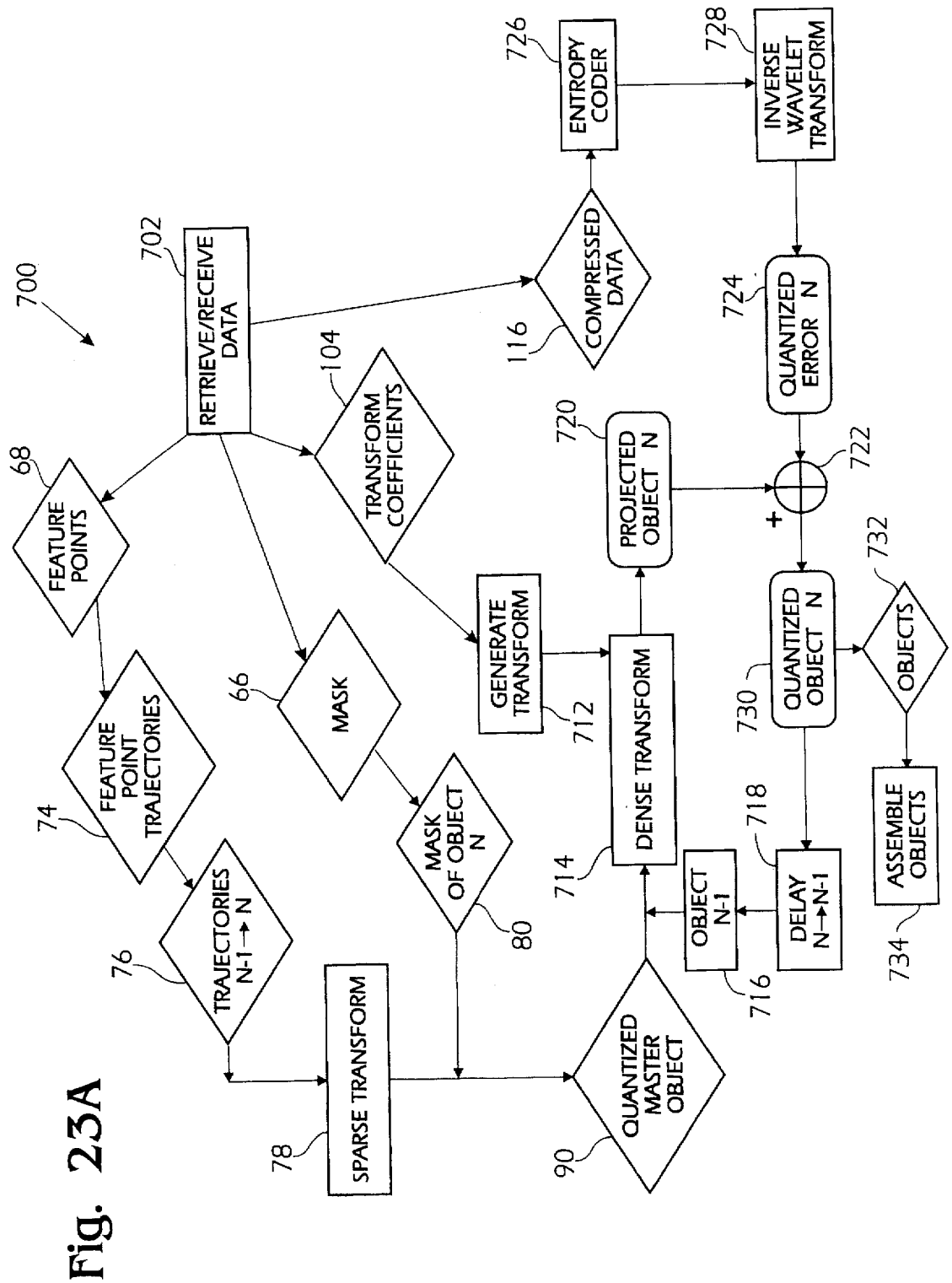
FIG. 23A is a generalized functional block diagram of a video compression decoder process matched to the encoder process of FIG. 3.

FIG. 23A is a functional block diagram of a video compression decoder process 700 for decompressing video information generated by video compression encoder process 64 of FIG. 3. For purposes of consistency with the description of encoder process 64, decoder process 700 is described with reference to FIGS. 2A and 2B. Decoder process 700 retrieves from memory or receives as a transmission encoded video information that includes object masks 66, feature points 68, compressed master objects 136, affine transform coefficients 104, and compressed error data 116.

Decoder process 700 performs operations that are the inverse of those of encoder process 64 (FIG. 3). Accordingly, each of the above-described preferred operations of encoder process 64 having a decoding counterpart would similarly be inversed.

Function block 702 indicates that masks 66, feature points 68, transform coefficients 104, and compressed error data 116 are retrieved from memory or received as a transmission for processing by decoder process 700.

FIG. 23B is a functional block diagram of a master object decoder process 704 for decoding or decompressing compressed master object 136. Function block 706 indicates that compressed master object data 136 are entropy decoded by the inverse of the conventional lossless entropy encoding method in function block 134 of FIG. 3B. Function block 708 indicates that the entropy decoded master object from function block 706 is decoded according to an inverse of the conventional lossy wavelet encoding process used in function block 132 of FIG. 3B.

Function block 712 indicates that dense motion transformations, preferably multi-dimensional affine transformations, are generated from affine coefficients 104. Preferably, affine coefficients 104 are quantized in accordance with transformation method 350 (FIG. 12), and the affine transformations are generated from the quantized affine coefficients by performing the inverse of the operations described with reference to function block 362 (FIG. 12).

Function block 714 indicates that a quantized form of an object 716 in a prior frame N-1 (e.g., rectangular solid object 56a in image frame 54a) provided via a timing delay 718 is transformed by the dense motion transformation to provide a predicted form of the object 720 in a current frame N (e.g., rectangular solid object 56b in image frame 54b).

Function block 722 indicates that for image frame N, predicted current object 720 is added to a quantized error 724 generated from compressed error data 116. In particular, function block 726 indicates that compressed error data 116 is decoded by an inverse process to that of compression process 114 (FIG. 3A). In the preferred embodiment, function blocks 114 and 726 are based upon a conventional lossless still image compression method such as entropy encoding.

Function block 728 indicates that the entropy decoded error data from function block 726 is further decompressed or decoded by a conventional lossy still image compression method corresponding to that utilized in function block 112 (FIG. 3A). In the preferred embodiment, the decompression or decoding of function block 728 is by a lattice subband (wavelet) process or a discrete cosine transform (DCT) process.

Function block 722 provides quantized object 730 for frame N as the sum of predicted object 720 and quantized error 724, representing a reconstructed or decompressed object 732 that is delivered to function block 718 for reconstruction of the object in subsequent frames.

Function block 734 indicates that quantized object 732 is assembled with other objects of a current image frame N to form a decompressed video signal.

Simplified Chanin Encoding

Masks, objects, sprites, and other graphical features, commonly are represented by their contours. As shown in and explained with reference to FIG. 5A, for example, rectangular solid object 56a is bounded by an object perimeter or contour 142. A conventional process or encoding or compressing contours is referred to as chain encoding.

Figure 24A:
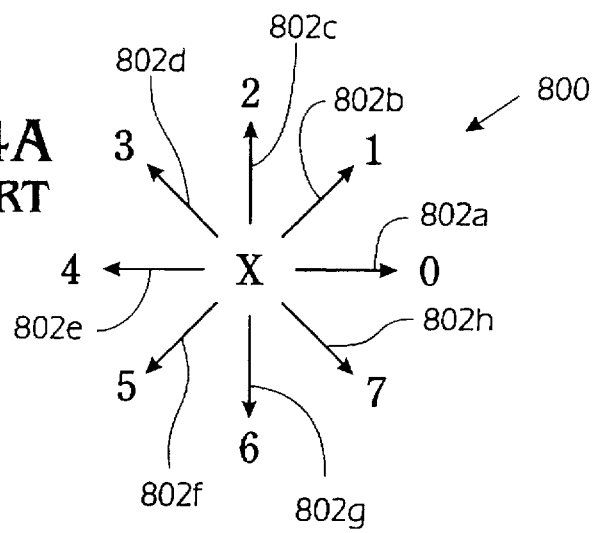
FIG. 24A is a diagrammatic representation of a conventional chain code format.

FIG. 24A shows a conventional eight-point chain code 800 from which contours on a conventional recta-linear pixel array are defined. Based upon a current pixel location X, a next successive pixel location in the contour extends in one of directions 802a–802h. The chain code value for the next successive pixel is the numeric value corresponding to the particular direction 802. As examples, the right, horizontal direction 802a corresponds to the chain code value 0, and the downward, vertical direction 802g corresponds to the chain code value 6. Any continuous contour can be described from eight-point chain code 800.

Figure 24B:
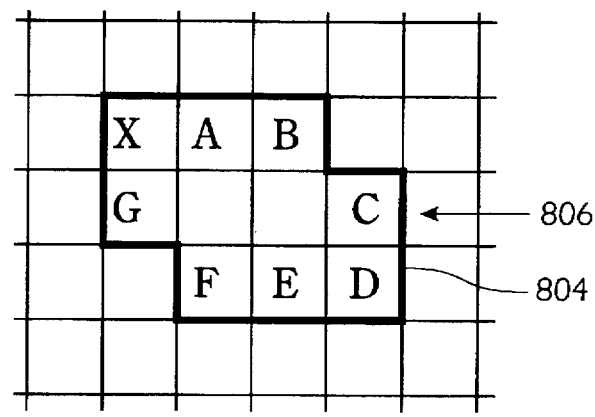
FIG. 24B is a simplified representation of an exemplary contour for processing with the chain code format of FIG. 24A.

With reference to FIG. 24B, a contour 804 represented by pixels 806 designated X and A–G can be encoded in a conventional manner by the chain code sequence {00764432}. In particular, beginning from pixel X, pixels A and B are positioned in direction 0 relative to respective pixels X and A. Pixel C is positioned in direction 7 relative to pixel B. Remaining pixels D–G are similarly positioned in directions corresponding to the chain code values listed above. In a binary representation, each conventional chain code value is represented by three digital bits.

Figure 25B:
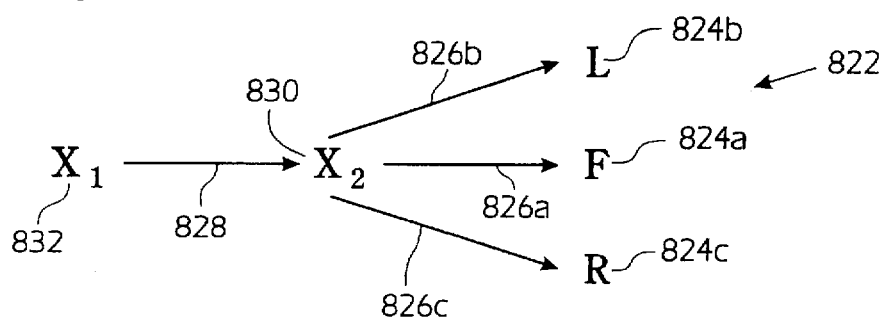
FIG. 25B is a diagrammatic representation of a chain code format.
Figure 25A:
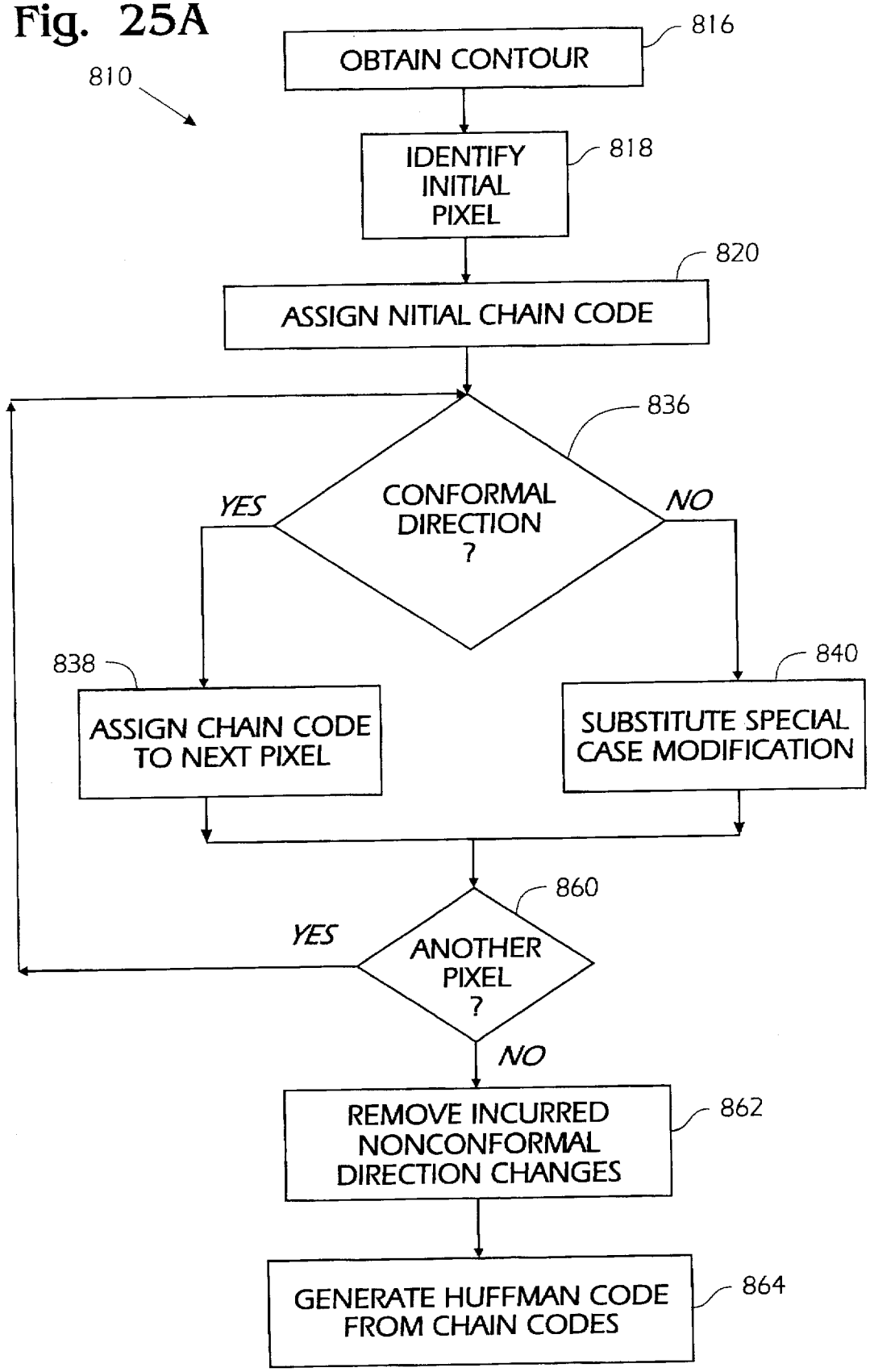
FIG. 25A is a functional block diagram of a chain coding process.

FIG. 25A is a functional block diagram of a chain code process 810 capable of providing contour compression ratios at least about twice those of conventional chain code processes. Chain code process 810 achieves such improved compression ratios by limiting the number of chain codes and defining them relative to the alignment of adjacent pairs of pixels. Based upon experimentation, it has been discovered that the limited chain codes of chain code process 810 directly represent more than 99.8% of pixel alignments of object or mask contours. Special case chain code modifications accommodate the remaining less than 0.2% of pixel alignment as described below in greater detail.

Function block 816 indicates that a contour is obtained for a mask, object, or sprite. The contour may be obtained, for example, by object segmentation process 140 described with reference to FIGS. 4 and 5.

Function block 818 indicates that an initial pixel in the contour is identified. The initial pixel may be identified by common methods such as, for example, a pixel with minimal X-axis and Y-axis coordinate positions.

Function block 820 indicates that a predetermined chain code is assigned to represent the relationship between the initial pixel and the next adjacent pixel in the contour. Preferably, the predetermined chain code corresponds to a forward direction.

FIG. 25B is a diagrammatic representation of a three-point chain code 822. Chain code 822 includes three chain codes 824a, 824b, and 824c that correspond to a forward direction 826a, a leftward direction 826b, and a rightward direction 826c, respectfully. Directions 826a–826c are defined relative to a preceding alignment direction 828 between a current pixel 830 and an adjacent pixel 832 representing the preceding pixel in the chain code.

Preceding alignment direction 828 may extend in any of the directions 802 shown in FIG. 24A, but is shown with a specific orientation (i.e., right, horizontal) for purposes of illustration. Direction 826a is defined, therefore, as the same as direction 828. Directions 826b and 826c differ from direction 828 by leftward and rightward displacements of one pixel.

It has been determined experimentally that slightly more than 50% of chain codes 824 correspond to forward direction 826a, and slightly less than 25% of chain codes 824 correspond to each of directions 826b and 826c.

Function block 836 represents an inquiry as to whether the next adjacent pixel in the contour conforms to one of directions 826. Whenever the next adjacent pixel in the contour conforms to one of directions 826, function block 836 proceeds to function block 838, and otherwise proceeds to function block 840.

Function block 838 indicates that the next adjacent pixel is assigned a chain code 824 corresponding to its direction 826 relative to the direction 828 along which the adjacent preceding pair of pixels are aligned.

Function block 840 indicates that a pixel sequence conforming to one of directions 826 is substituted for the actual nonconformal pixel sequence. Based upon experimentation, it has been determined that such substitutions typically will arise in fewer than 0.2% of pixel sequences in a contour and may be accommodated by one of six special-case modifications.

Figure 25C:
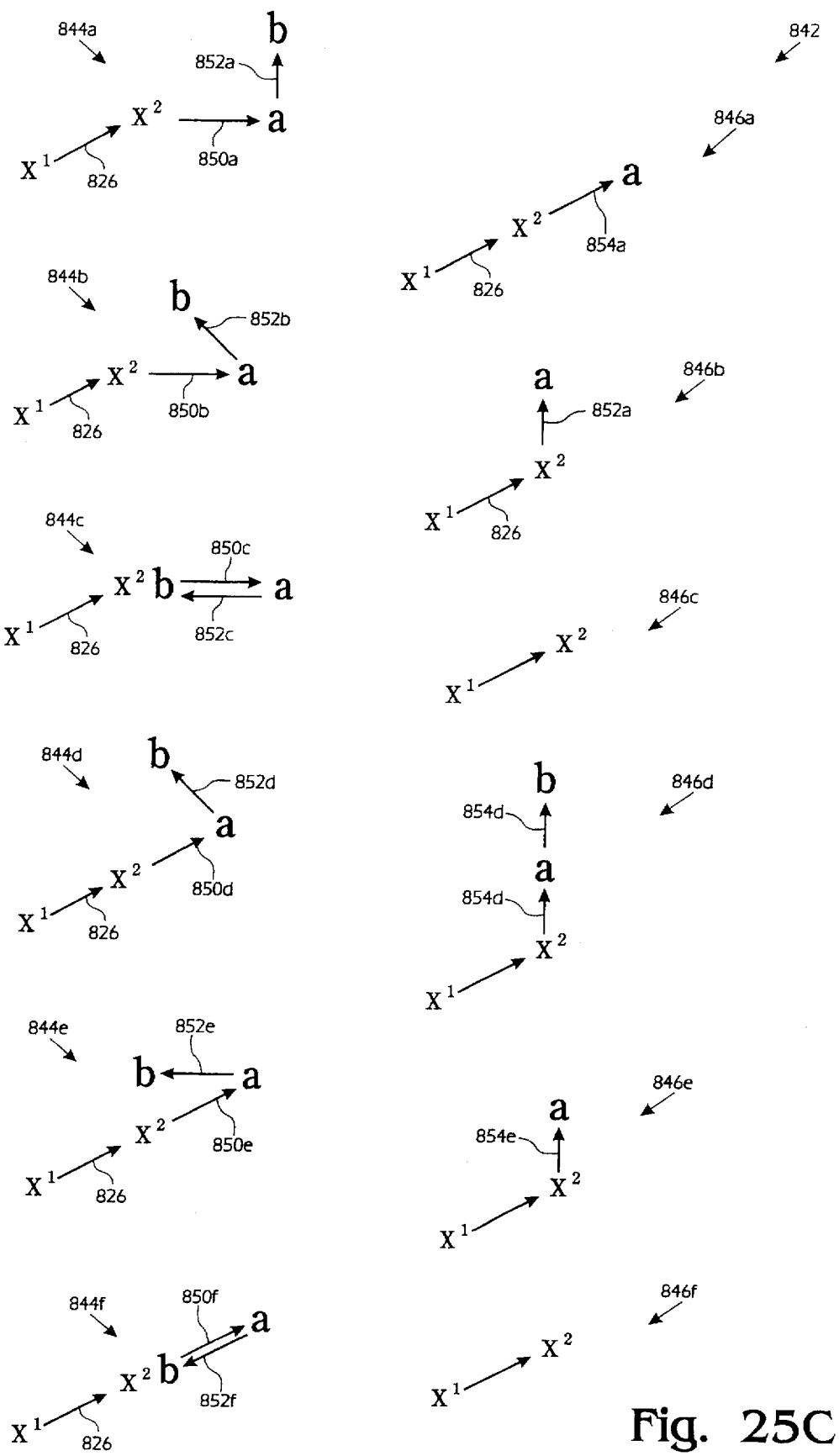
FIG. 25C is a diagrammatic representation of special case chain code modifications used in the process of FIG. 25A.

FIG. 25C is a diagrammatic representation of the six special-case modifications 842 for converting nonconformal pixel sequences to pixel sequences that conform to directions 826. Within each modification 842, a pixel sequence 844 is converted to a pixel sequence 846. In each of pixel sequences 844 of adjacent respective pixels $X^1$, $X^2$, A, B, the direction between pixels A and B does not conform to one of directions 826 due to the alignment of pixel A relative to the alignment of pixels $X^1$ and $X^2$.

In pixel sequence 844a, initial pixel alignments 850a and 852a represent a nonconformal right-angle direction change. Accordingly, in pixel sequence 846a, pixel A of pixel sequence 844a is omitted, resulting in a pixel direction 854a that conforms to pixel direction 826a. Pixel sequence modifications 842b–842f similarly convert nonconformal pixel sequences 844b–844f to conformal sequences 846b–846f, respectively.

Pixel sequence modifications 842 omit pixels that cause pixel direction alignments that change by 90° or more relative to the alignments of adjacent preceding pixels X1 and X2. One effect is to increase the minimum radius of curvature of a contour representing a right angle to over three pixels. Pixel modifications 842 cause, therefore, a minor loss of extremely fine contour detail. However, the loss of such details is acceptable under most viewing conditions.

Function block 860 represents an inquiry as to whether there is another pixel in the contour to be assigned a chain code. Whenever there is another pixel in the contour to be assigned a chain code, function block returns to function block 836, and otherwise proceeds to function block 862.

Function block 862 indicates that nonconformal pixel alignment directions introduced or incurred by the process of function block 840 are removed. In a preferred embodiment, the nonconformal direction changes may be omitted simply by returning to function block 816 and repeating process 810 until no nonconformed pixel sequences remain, which typically is achieved in fewer than 8 iterations. In an alternative embodiment, such incurred nonconformal direction changes may be corrected in "real-time" by checking for and correcting any incurred nonconformal direction changes each time a nonconformal direction change is modified.

Function block 864 indicates that a Huffinan code is generated from the resulting simplified chain code. With chain codes 824a–824c corresponding to directions 826A–826C that occur for about 50%, 25% and 25% of pixels in a contour, respective Huffinan codes of 0, 11, and 10 are assigned. Such first order Huffinan codes allow chain process 810 to represent contours at a bit rate of less than 1.5 bits per pixel in the contour. Such a bitrate represents approximately a 50% compression ratio improvement over conventional chain code processes.

It will be appreciated that higher order Huffinan coding could provide higher compression ratios. Higher order Huffinan coding includes, for example, assigning predetermined values to preselected sequences of first order Huffman codes.

Sprite Generation

In some object based video coding methods, sprites are generated for use in connection with encoding determinate motion video (movie). Bitmaps are accreted into bitmap series that comprise a plurality of sequential bitmaps of sequential images from an image source. Accretion is used to overcome the problem of occluded pixels where objects or figures move relative to one another or where one figure occludes another similar to the way a foreground figure occludes the background. For example, when a foreground figure moves and reveals some new background, there is no way to build that new background from a previous bitmap unless the previous bitmap was first enhanced by including in it the pixels that were going to be uncovered in the subsequent bitmap. This method takes an incomplete image of a figure and looks forward in time to find any pixels that belong to the image but are not to be immediately visible. Those pixels are used to create a composite bitmap for the figure. With the composite bitmap, any future view of the figure can be created by distorting the composite bitmap.

The encoding process begins by an operator identifying the figures and the parts of the figures of a current bitmap from a current bitmap series.

Feature or distortion points are selected by the operator on the features of the parts about which the parts of the figures move. A current grid of triangles is superimposed onto the parts of the current bitmap. The triangles that constitute the current grid of triangles are formed by connecting adjacent distortion points.

The distortion points are the vertices of the triangles. The current location of each triangle on the current bitmap is determined and stored to the storage device. A portion of data of the current bitmap that defines the first image within the current location of each triangle is retained for further use.

A succeeding bitmap that defines a second image of the current bitmap series is received from the image source, and the figures and the parts of the figure are identified by the operator. Next, the current grid of triangles from the current bitmap is superimposed onto the succeeding bitmap. The distortion points of current grid of triangles are realigned to coincide with the features of the corresponding figures on the succeeding bitmap. The realigned distortion points form a succeeding grid of triangles on the succeeding bitmap of the second image. The succeeding location of each triangle on the succeeding bitmap is determined and stored to the storage device. A portion of data of the succeeding bitmap that defines the second image within the succeeding location of each triangle is retained for further use.

The process of determining and storing the current and succeeding locations of each triangle is repeated for the plurality of sequential bitmaps of the current bitmap series. When that process is completed, an average image of each triangle in the current bitmap series is determined from the separately retained data. The average image of each triangle is stored to the storage device.

During playback, the average image of each triangle of the current bitmap series and the current location of each triangle of the current bitmap are retrieved from the storage device. A predicted bitmap is generated by calculating a transformation solution for transforming the average image of each triangle in the current bitmap series to the current location of each triangle of the current bitmap and applying the transformation solution to the average image of each triangle. The predicted bitmap is passed to the monitor for display.

In connection with a playback determinate motion video (video game) in which the images are determined by a controlling program at playback, a sprite bitmap is stored in its entirety on a storage device. The sprite bitmap comprises a plurality of data bits that define a sprite image. The sprite bitmap is displayed on a monitor, and the parts of the sprite are identified by an operator and distortion points are selected for the sprite's parts.

A grid of triangles is superimposed onto the parts of the sprite bitmap. The triangles that constitute the grid of triangles are formed by connecting adjacent distortion points. The distortion points are the vertices of the triangles. The location of each triangle of the sprite bitmap is determined and stored to the storage device.

During playback, a succeeding location of each triangle is received from a controlling program. The sprite bitmap and the succeeding location of each triangle on the sprite bitmap are recalled from the storage device and passed to the display processor. The succeeding location of each triangle is also passed to the display processor.

A transformation solution is calculated for each triangle on the sprite bitmap. A succeeding bitmap is then generated in the display processor by applying the transformation solution of each triangle derived from the sprite bitmap the defines the sprite image within the location of each triangle. The display processor passes the succeeding sprite bitmap to a monitor for display. This process is repeated for each succeeding location of each triangle requested by the controlling program.

Figure 26:
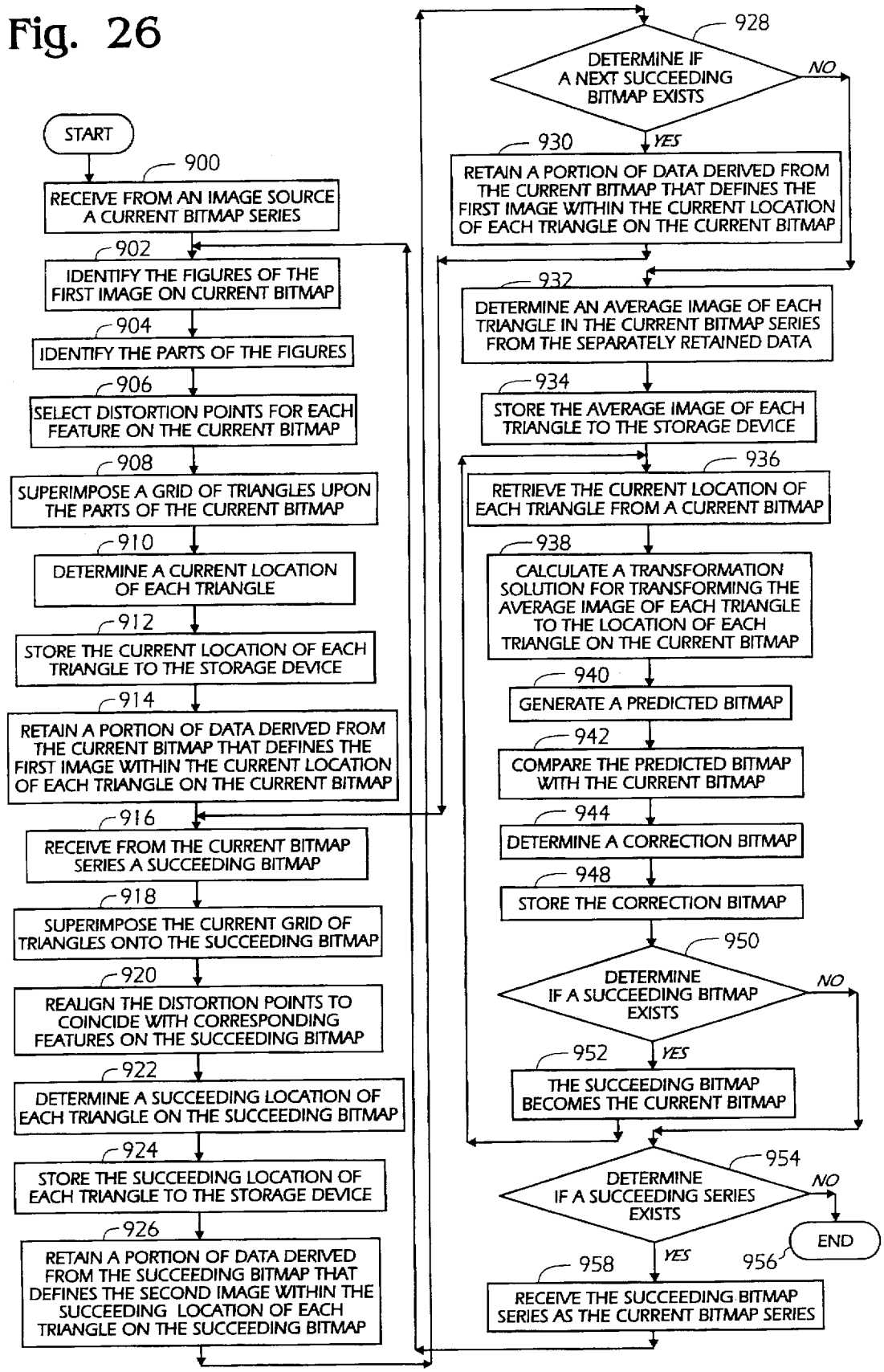
FIG. 26 is a functional block diagram of a sprite generating or encoding process.

As shown in FIG. 26, an encoding procedure for a movie motion video begins at step 900 by the CPU 22 receiving from an image source a current bitmap series. The current bitmap series comprises a plurality of sequential bitmaps of sequential images. The current bitmap series has a current bitmap that comprises a plurality of data bits which define a first image from the image source. The first image comprises at least one figure having at least one part.

Proceeding to step 902, the first image is displayed to the operator on the monitor 28. From the monitor 28, the figures of the first image on the current bitmap are identified by the operator. The parts of the figure on the current bitmap are then identified by the operator at step 904.

Next, at step 906, the operator selects feature or distortion points on the current bitmap. The distortion points are selected so that the distortion points coincide with features on the bitmap where relative movement of a part is likely to occur. It will be understood by those skilled in the art that the figures, the parts of the figures and the distortion points on a bitmap may be identified by the computer system 20 or by assistance from it. It is preferred, however, that the operator identify the figures, the parts of the figures and the distortion points on a bitmap.

Figure 27B:
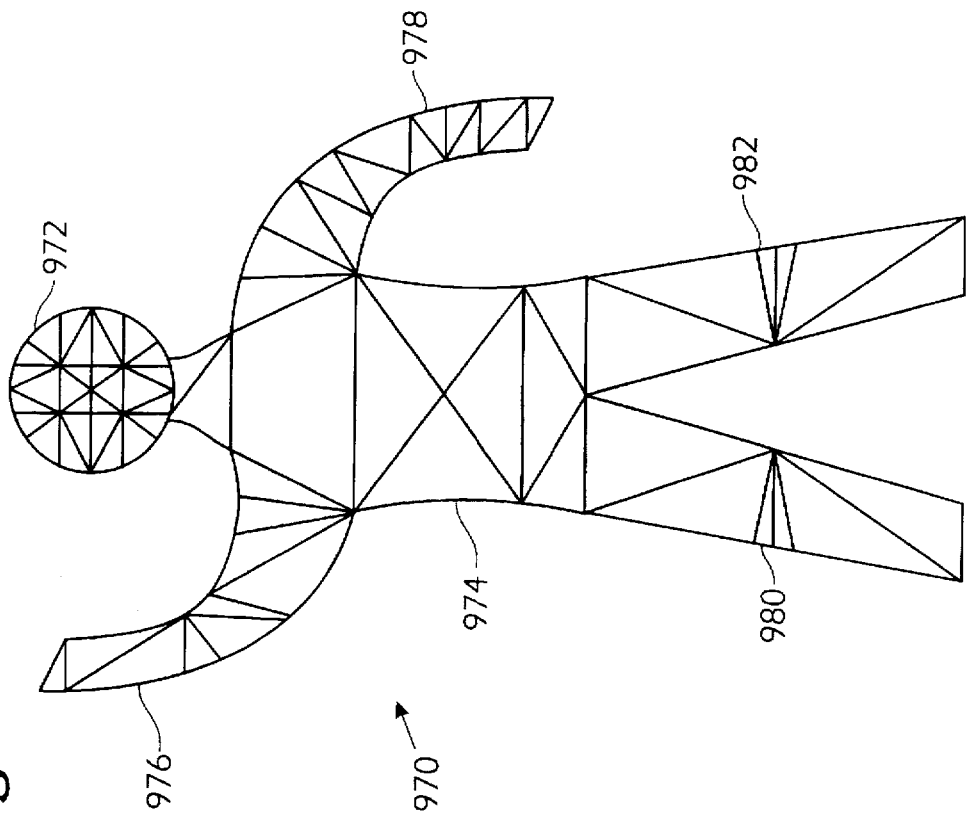
FIGS. 27A and 27B are respective first and second objects defined by bitmaps and showing grids of triangles superimposed over the objects in accordance with the process of FIG. 26.
Figure 27A:
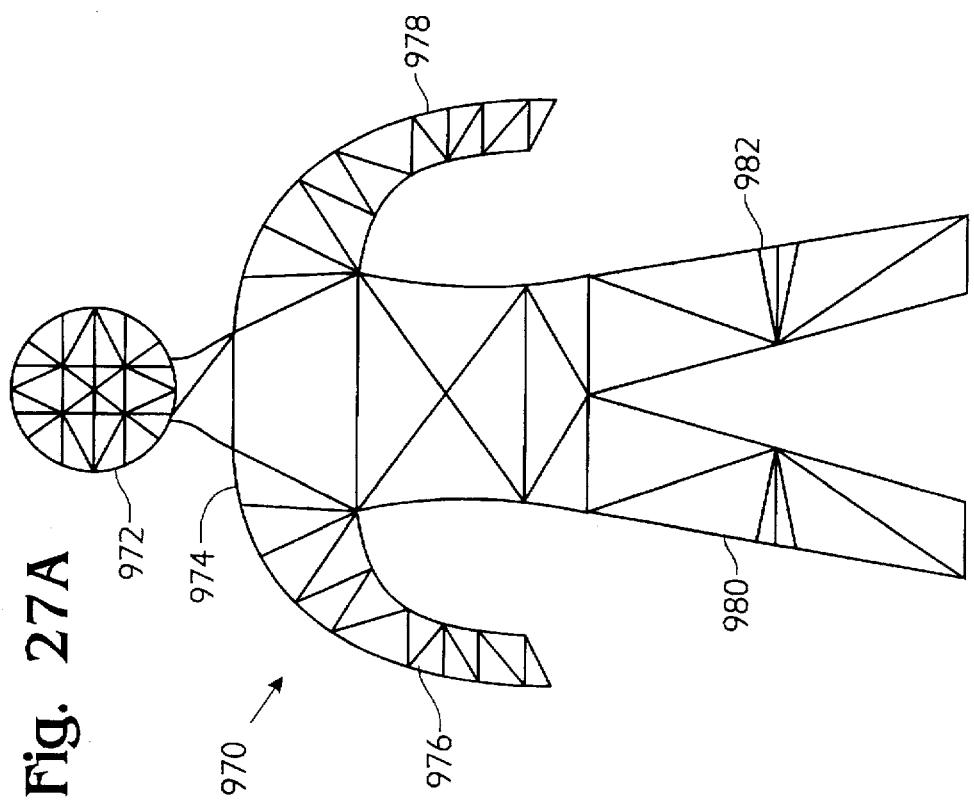

Proceeding to step 908, a current grid of triangles is superimposed onto the parts of the current bitmap by the computer system 20. With reference to FIG. 27A, the current grid comprises triangles formed by connecting adjacent distortion points. The distortion points form the vertices of the triangles. More specifically, the first image of the current bit map comprises a figure, which is a person 970. The person 970 has six parts corresponding to a head 972, a torso 974, a right arm 976, a left arm 978, right leg 980, and a left leg 982. Distortion points are selected on each part of the person 970 so that the distortion points coincide with features where relative movement of a part is likely to occur. A current grid is superimposed over each part with the triangles of each current grid formed by connecting adjacent distortion points. Thus, the distortion points form the vertices of the triangles.

At step 910, the computer system 20 determines a current location of each triangle on the current bitmap. The current location of each triangle on the current bitmap is defined by the location of the distortion points that form the vertices of the triangle. At step 912, the current location of each triangle is stored to the storage device. A portion of data derived from the current bitmap that defines the first image within the current location of each triangle is retained at step 914.

Next, at step 916, a succeeding bitmap of the current bitmap series is received by the CPU 22. The succeeding bitmap comprises a plurality of data bits which define a second image of the current bitmap series. The second image may or may not include figures that correspond to the figures in the first image. For the following steps, the second image is assumed to have figures that corresponds to the figures in the first image. At step 918, the current grid of triangles is superimposed onto the succeeding bitmap. The second image with the superimposed triangular grid is displayed to the operator on the monitor 28.

At step 920, the distortion points are realigned to coincide with corresponding features on the succeeding bitmap by the operator with assistance from the computer system 20. The computer system 20 realigns the distortion using block matching. Any mistakes are corrected by the operator. With reference to FIG. 27B, the realigned distortion points form a succeeding grid of triangles. The realigned distortion points are the vertices of the triangles. More specifically, the second image of the succeeding bitmap of person 200 includes head 972, torso 974, right arm 976, left arm 978, right leg 980, and left leg 982. In the second image, however, the right arm 980 is raised. The current grids of the first image have been superimposed over each part and their distortion points realigned to coincide with corresponding features on the second image. The realigned distortion points define succeeding grids of triangles. The succeeding grids comprise triangles formed by connecting the realigned distortion points. Thus, the realigned distortion point form the vertices of the triangles of the succeeding grids.

Proceeding to step 922, a succeeding location of each triangle of the succeeding bitmap is determined by the computer system 20. At step 924, the succeeding location of each triangle on the succeeding bitmap is stored the storage device. A portion of data derived from the succeeding bitmap that defines the second image within the succeeding location of each triangle is retained at step 926. Step 926 leads to decisional step 928 where it is determined if a next succeeding bitmap exists.

If a next succeeding bitmap exists, the YES branch of decisional step 928 leads to step 930 where the succeeding bitmap becomes the current bitmap. Step 930 returns to step 916 where a succeeding bitmap of the current bitmap series is received by the CPU 22. If a next succeeding bitmap does not exist, the NO branch of decisional step 928 leads to step 932 where an average image for each triangle of the current bitmap series is determined. The average image is the median value of the pixels of a triangle. Use of the average image makes the process less susceptible to degeneration. Proceeding to step 934, the average image of each triangle of the current bitmap series is stored to the storage device.

Next, at step 936, the current location of each triangle on the current bitmap is retrieved from the storage device. An affine transformation solution for transforming the average image of each triangle to the current location of the triangle on the current bitmap is then calculated by the computer system 20 at step 938. At step 940, a predicted bitmap is generated by applying the transformation solution of the average image of each triangle to the current location of each triangle on the current bitmap. The predicted bitmap is compared with the current bitmap at step 942.

At step 944 a correction bitmap is generated. The corrected bitmap comprises the data bits of the current bitmap that were not accurately predicted by the predicted bitmap. The corrected bitmap is stored to the storage device at step 948. Step 948 leads to decisional step 950 where it is determined if a succeeding bitmap exists.

If a succeeding bitmap exists, the YES branch of decisional step 950 leads to step 952 where the succeeding bitmap becomes the current bitmap. Step 952 returns to step 936 where the current location of each triangle on the current bitmap is retrieved from the storage device. If a next succeeding bitmap does not exist, the NO branch of decisional step 950 leads to decisional step 954 where it is determined if a succeeding bitmap series exists. If a succeeding bitmap series does not exist, encoding is finished and the NO branch of decisional step 954 leads to step 956. If a succeeding bitmap series exists, the YES branch of decisional step 954 leads to step 958 where the CPU 22 receives the succeeding bitmap series as the current bitmap series. Step 956 returns to step 902 where the figures of the first image of the current bitmap series is identified by the operator.

The process of FIG. 26 describes generation of a sprite or master object 90 for use by encoder process 64 of FIG. 3. The process of utilizing master object 90 to form predicted objects 102 is described with reference to FIG. 28.

Figure 28:
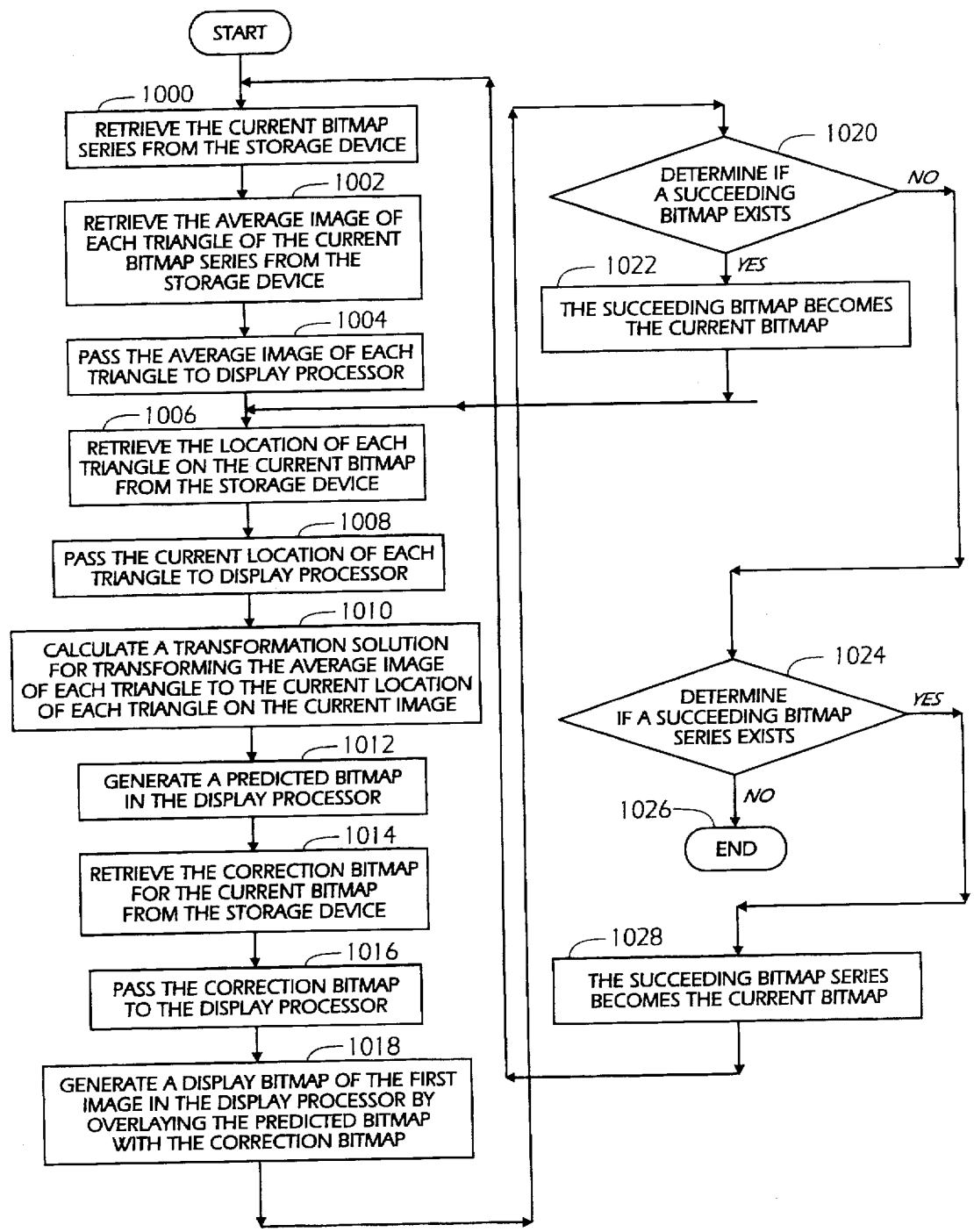
FIG. 28 is a functional block diagram of a sprite decoding process corresponding to the encoding process of FIG. 26.

As shown in FIG. 28, the procedure begins at step 1000 with a current bitmap series being retrieved. The current bitmap series comprises a plurality of sequential bitmaps of sequential images. The current bitmap series has a current bitmap that comprises a plurality of data bits which define a first image from the image source. The first image comprises at least one figure having at least one part.

At step 1002, the average image of each triangle of the current bitmap series is retrieved from the storage device. The average image of each triangle is then passed to a display processor (not shown) at step 704. It will be appreciated that computer system 20 (FIG. 1) can optionally include a display processor or other dedicated components. Proceeding to step 1006, the current location of each triangle on the current bitmap is retrieved from the storage device. The current location of each triangle is passed to the display processor at step 1008.

Next, an affine transformation solution for transforming the average image of each triangle to the current location of each triangle on the current bitmap is calculated by the display processor at step 1010. Proceeding to step 1012, a predicted bitmap is generated by the display processor by applying the transformation solution for transforming the average image of each triangle to the current location of each triangle on the current bitmap.

At step 1014, a correction bitmap for the current bitmap is retrieved from the storage device. The correction bitmap is passed to the display processor at step 716. A display bitmap is then generated in the display processor by overlaying the predicted bitmap with the correction bitmap. The display processor retains a copy of the average image of each triangle and passes the display bitmap to the frame buffer for display on the monitor.

Next, at decisional step 1020, it is determined if a succeeding 30 bitmap of the current bitmap series exists. If a succeeding bitmap of the current bitmap series exists, the YES branch of decisional step 1020 leads to step 1022. At step 1022, the succeeding bitmap becomes the current bitmap. Step 1022 returns to step 1006 where the location of each triangle on the current bitmap is retrieved from the storage device.

Returning to decisional step 1020, if a succeeding bitmap of the current bitmap series does not exist, the NO branch of decisional step 1020 leads to decisional step 1024. At decisional step 1024, it is determined if a succeeding bitmap series exists. If a succeeding bitmap series does not exist, then the process is finished and the NO branch of decisional step 1024 leads to step 1026. If a succeeding bitmap series exists, the YES branch of decisional step 1024 leads to step 1028. At step 1028, the succeeding bitmap series becomes the current bitmap series. Step 1028 returns to step 1000.

Representation and Encoding of General Arbitrary Shapes

Figure 29:
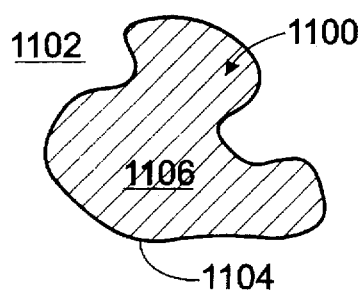
FIG. 29 is a diagrammatic representation of an exemplary simple arbitrary binary solid shape corresponding to a mask of an object included in a frame of a video sequence.

FIG. 29 is a diagrammatic representation of a solid binary arbitrary feature or shape 1100 representing a binary mask of an arbitrary object included in a frame of a video image sequence. As described above, each frame of a video image sequence typically includes multiple objects corresponding to multiple image features such as characters, props, and background. The configuration of solid shape 1100 is arbitrary to represent any such object having a solid or continuous interior.

As a binary representation relative to its background 1102, solid shape 1100 corresponds to a mask, such as those described hereinabove with respect to FIGS. 2A, 2B, and 3A, by which objects are identified and encoded. Solid shape 1100 is characterized by a continuous outer contour or boundary 1104 and a uniform or single-state interior 1106 within boundary 1104. Solid shape 1100 includes no disconnected or embedded portions of different binary states. Solid shape 1100 is capable of being compressed or encoded accurately with respect to its boundary 1104 by conventional contour coding techniques such as chain coding or polygonal contour approximation, or by the simplified chain encoding process described hereinabove with reference to FIGS. 25A-25C.

FIG. 30 is a diagrammatic representation of a general binary arbitrary feature or shape 1110 representing a binary mask of an arbitrary object included in the frame of a video image sequence. General shape 1110 preferably corresponds to a binary mask distinct from its background 1112 by which objects are identified and encoded. The configuration of general shape 1110 is general in that it represents generally any object, including objects having discontinuous or embedded regions or components within their interiors.

In this regard, solid shape 1100 represents a simplified subset of general shape 1110.

Figure 30A:
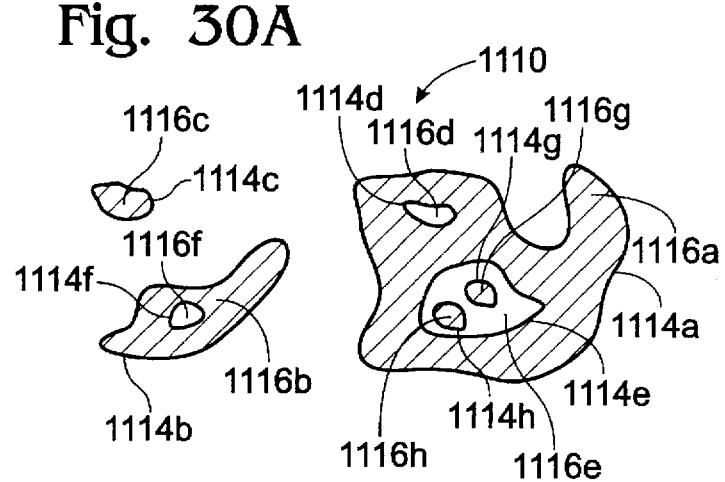
FIG. 30A is a diagrammatic representation of an exemplary general binary arbitrary shapes corresponding to a mask of a complex object in a frame of a video sequence.
Figure 30B:
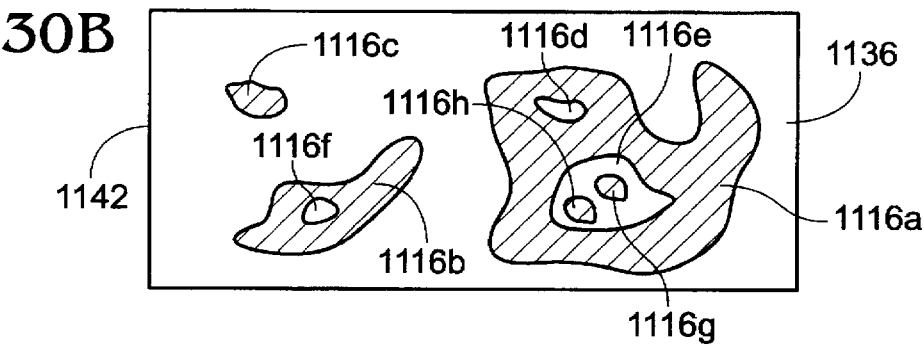
FIGS. 30B–30D are diagrammatic representations of the general binary arbitrary shapes.

General shape 1110 includes multiple continuous contours or boundaries 1114 that are disconnected or enclosed within each other. FIG. 30A shows a first set of disconnected boundaries 1114a–1114c corresponding to a first hierarchical level, a second set of disconnected boundaries 1114d–1114f corresponding to a second hierarchical level, and a third set of disconnected boundaries 1114g and 1114h corresponding to a third hierarchical level. Boundaries 1114a–1114h bound or encompass corresponding uniform or single-state components 1116a–1116h. Accordingly, general shape 1110 includes disconnected components (e.g., 1114a and 1114c) and embedded components (e.g., 1114e and 1114g) within host components (e.g., 1114a and 1114e); the embedded components being of different binary states than their host components. Embedded components are analogous to holes or islands within host components correspond to islands or holes, respectively.

Accurately recognizing and encoding the disconnected or embedded components of solid shape 1110 provide improved video compression because such general shapes correspond better to many objects commonly found in general video image sequences. The disconnected or embedded components of general shape 1110 cannot be represented by some conventional shape encoding techniques and are represented inefficiently by other techniques. As a consequence, such general shapes conventionally are simplified to ignore embedded components, which can introduce significant encoding errors during video compression.

Figure 31:
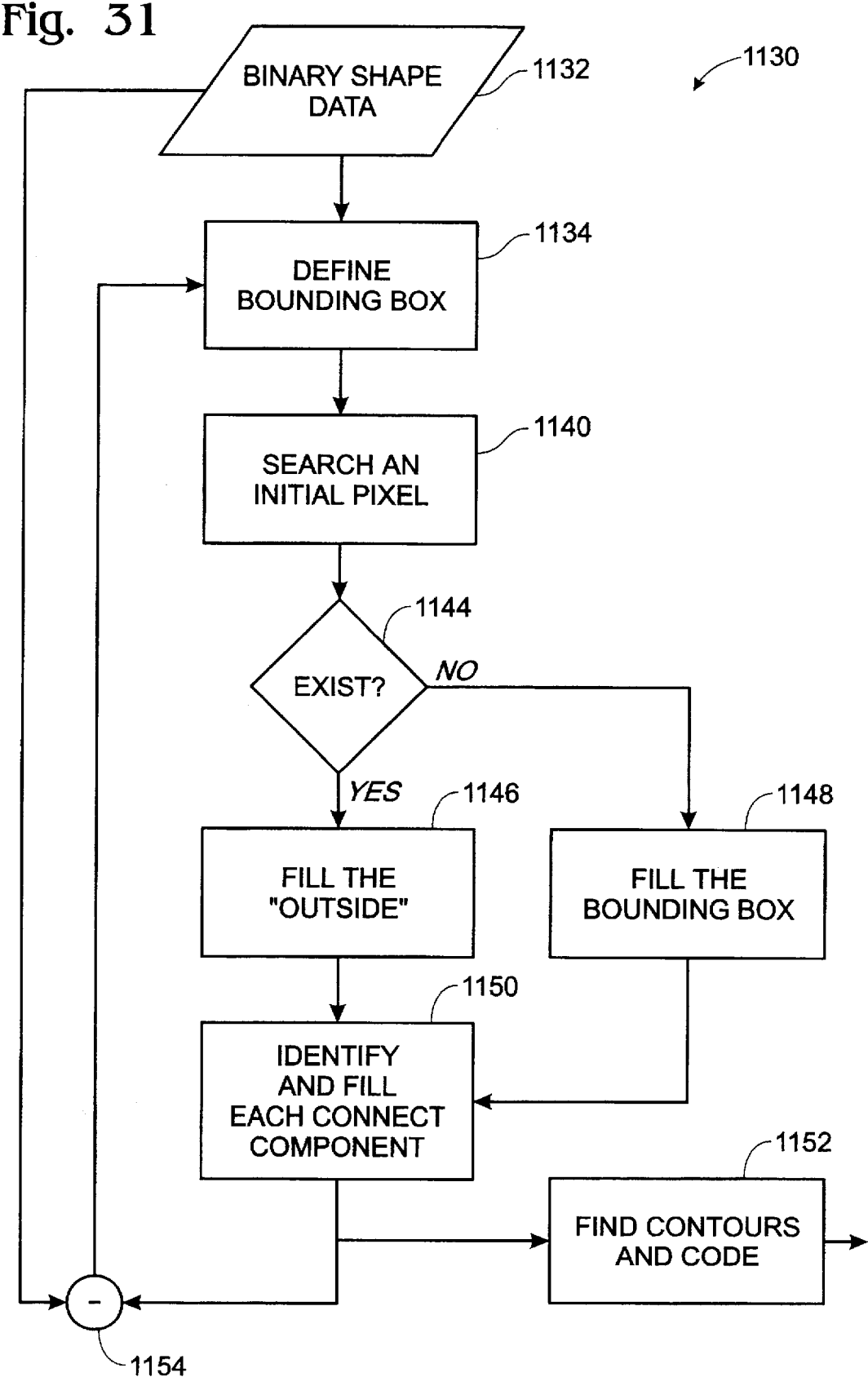
FIG. 31 is a functional block diagram of a hierarchical decomposition and encoding process capable of accurately representing general binary arbitrary shapes of the type shown in FIG. 30A.

FIG. 31 is a functional block diagram of a hierarchical decomposition and encoding process 1130 capable of accurately representing general arbitrary shape 1110 with its disconnected and embedded components 1116a–1116h. Hierarchical process 1130 automatically decomposes general binary arbitrary shapes into distinct component masks that have continuous boundaries and no embedded components of contrasting binary states. Process 1130 is hierarchical in that embedded components are decomposed from host components iteratively to form hierarchical levels of component masks. Each component mask is capable of being compressed or encoded accurately with respect to its boundary by conventional contour coding techniques such as chain coding or polygonal contour approximation, or by the simplified chain coding process described hereinabove with reference to FIGS. 25A-25C.

Hierarchical process 1130 receives binary shape data 1132 corresponding to general arbitrary shape 1110, which may include simple solid shapes and general shapes having disconnected or embedded components. For purposes of explanation, hierarchical representation process 1130 is described with reference to general arbitrary shape 1110 with its embedded and disconnected components 1116a–1116h, but is similarly applicable to simple shape 1100.

Process block 1134 indicates that a bounding box 1136 of pixels (FIG. 30B) is defined about and encompasses components 1116a–1116h of general arbitrary shape 1110. Preferably, bounding box 1136 is a right regular array of pixels with dimensions selected automatically or by a user. It will be appreciated that bounding box 1136 as used with respect to process 1130 preferably is oversized relative to the components 1116a–1116h of general arbitrary shape 1110. In some applications, a bounding box is deemed as being fitted closely to an enclosed feature. Bounding box 1136 is preferably oversized to assure that all components of a shape are enclosed.

Process block 1140 indicates that an initial pixel 1142 within bounding box 1136 and corresponding to background 1112 is sought. In the preferred binary representation, background 1112 is of a known binary state. Initial pixel 1142 is sought initially at a selected corner of bounding box 1136 (e.g., the upper left corner shown in FIG. 30B). If that location corresponds to general shape 1110 rather than background 1112, a search is commenced successively at the remaining corners and along the boundaries of bounding box 1136 to identify an initial pixel 1142 corresponding to the background 1112.

Decision block 1144 represents an inquiry whether an initial pixel 1142 is identified along the boundary of bounding box 1136 and corresponding to background 1112. Whenever such an initial pixel 1142 is identified, decision block 1144 proceeds to process block 1146. Whenever no pixel along the boundary of bounding box 1136 corresponds to background 1112, decision block 1144 proceeds to process block 1148.

Figure 30C:
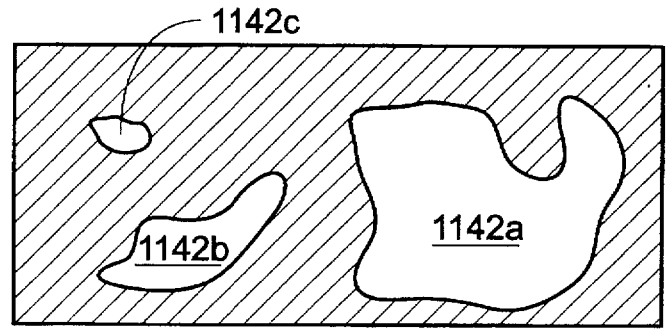

Process block 1146 indicates that all pixels of the binary state corresponding to background 1112 and connected together with initial pixel 1142 are assigned the opposite binary state. As a result, bounding box 1136 is "filled" around major objects 1116a–1116c and forms shapes complementary to major objects 1116a–1116c. This filling of bounding box 1136 may be performed by any conventional filling technique such as region grow, which is explained in *Computer Graphics: Principles and Practice*, 2d ed., Foley et al., Addison-Wesley Publishig Co., N.Y., (1991). As shown in FIG. 30C, the filling of background 1112 in bounding box 1136 leaves unfilled complementary connected components 1142a–1142c corresponding to respective major objects 1116a–1116c. Connected components 1142a–1142c encompass all objects embedded within major objects 1116a–1116c a provide a first hierarchical decomposition of general object 1110.

Process block 1148 indicates that the pixels within bounding box 1136 of the same binary state as, and connected to, the pixels along the boundary of bounding box 1136 are assigned the opposite binary state. It will be appreciated that the pixels filled by this process block relate not to background 1112, but rather an object or objects (not shown) that extend to the boundary of bounding box 1136. As a result, bounding box 1136 is "filled" around objects embedded within one or more host objects and forms shapes complementary to the embedded objects. This filling of bounding box 1136 may be performed by the same filling technique used in connection with process block 1146.

Process block 1150 indicates that connected components formed by process blocks 1146 and 1148 are identified and filled. With reference to the connected components formed by process block 1146, for example, connected components 1142a–1142c are identified by their contrasting binary state from that of the filled background 1112 and preferably are filled to form solid masks corresponding to respective major objects 1116a–1116c. The solid masks corresponding to connected components 1142a–1142c provide a basis for identifying and processing similarly objects embedded within major objects 1116a–1116c.

Process block 1152 indicates that a boundary or contour of each of the connected components identified by process block 1150 is encoded or compressed by a contour coding technique such as conventional chain coding or conventional polygonal contour approximation, or preferably, by the simplified chain coding process described hereinabove with references to FIGS. 25A–25C. It will be appreciated that each of the connected components (e.g., connected components 1142a–1142c) is effectively a simple binary object capable of being represented accurately by such contour encoding techniques. Complementary components 1142a–1142c represent one level of general arbitrary object decomposition that accurately represents objects at a common level of hierarchical decomposition. Subsequent iterations of process 1130 provides analogous representations of successively embedded objects.

Figure 30D:
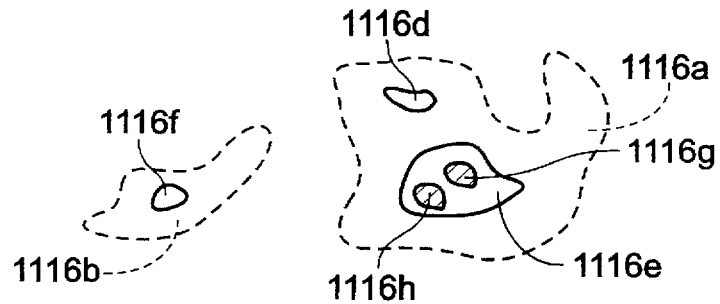

Difference block 1154 indicates that a logical difference is taken between the complementary components identified in accordance with process block 1150 and the corresponding objects in the original binary shape data 1132. The difference is determined on a pixel-by-pixel basis. For example, the difference between major objects 1116a–1116c and the solid masks formed from respective complementary components 1142a–1142c identifies any discontinuous objects embedded within objects 1116a–1116c. FIG. 30D is a diagrammatic representation of the resulting difference showing that within major object 1116a (shown in outline for reference purposes) embedded objects 1116d and 1116e are identified and that within major object 1116b (shown in outline for reference purposes) embedded object 1116f is identified. FIG. 30D also demonstrates that the absence of a difference between major object 1114c and complementary component 1142c indicates that no objects are embedded therein. As a result, encoding boundary 1116c of object 1114c completely describes and represents in a compressed format object 1114c.

Difference block 1154 identifies discontinuous embedded objects (e.g. 1116d, 1116e, and 1116f), which are delivered to process block 1132 for processing in the same manner as were major objects 1116a–1116c. Moreover, each successively embedded layer of objects, such as objects 1116g and 1116h within object 1116e, also is processed successively in this manner. Thus, successively embedded objects or layers are processed hierarchically by this method to encode accurately general arbitrary binary shapes. The difference operation of difference block 154 functions to identify discontinuous embedded objects. This function could be achieved alternatively by assigning the other binary state to the complementary components and summing them with the original binary shape data.

It will be appreciated that as binary objects, successively embedded discontinuous components alternate between first and second binary states. For reference purposes, objects identified by even-numbered operations of difference block 1154 (e.g. 0, 2 ... ) are referred to as "islands" and include in FIG. 30A objects 1116a–1116c, 1116g, and 1116h. Objects identified by odd-numbered operations of difference block 1154 (e.g. 1, 3 ... ) are referred to as "holes" and include in FIG. 30A objects 1116d, 1116e, and 1116f.

Reconstruction or recomposition of general binary arbitrary shape 1110 from the contour encoded objects identified hierarchically by encoding process 1130 may be performed hierarchically according to the sequence in which successive islands and holes are identified. Each successive hierarchical level is overlaid on a previous, hierarchically higher level. For example, complementary components 1142a–1142c would initially be decoded or decompressed from their contour encoded formats, as is known in the art or described above. Subsequently, complementary components 1142d–1142f corresponding to holes 1116d–1116f would be decoded or decompressed and overlaid on complementary components 1142a and 1142b. Finally, complementary components 1142g and 1142h corresponding to embedded islands 1116g and 1116h would be decompressed and overlaid onto the reconstructed shape. As a result, general arbitrary shape 1110 corresponding to a binary mask may be accurately encoded and decoded for compressed storage or transmission.

Figure 32:
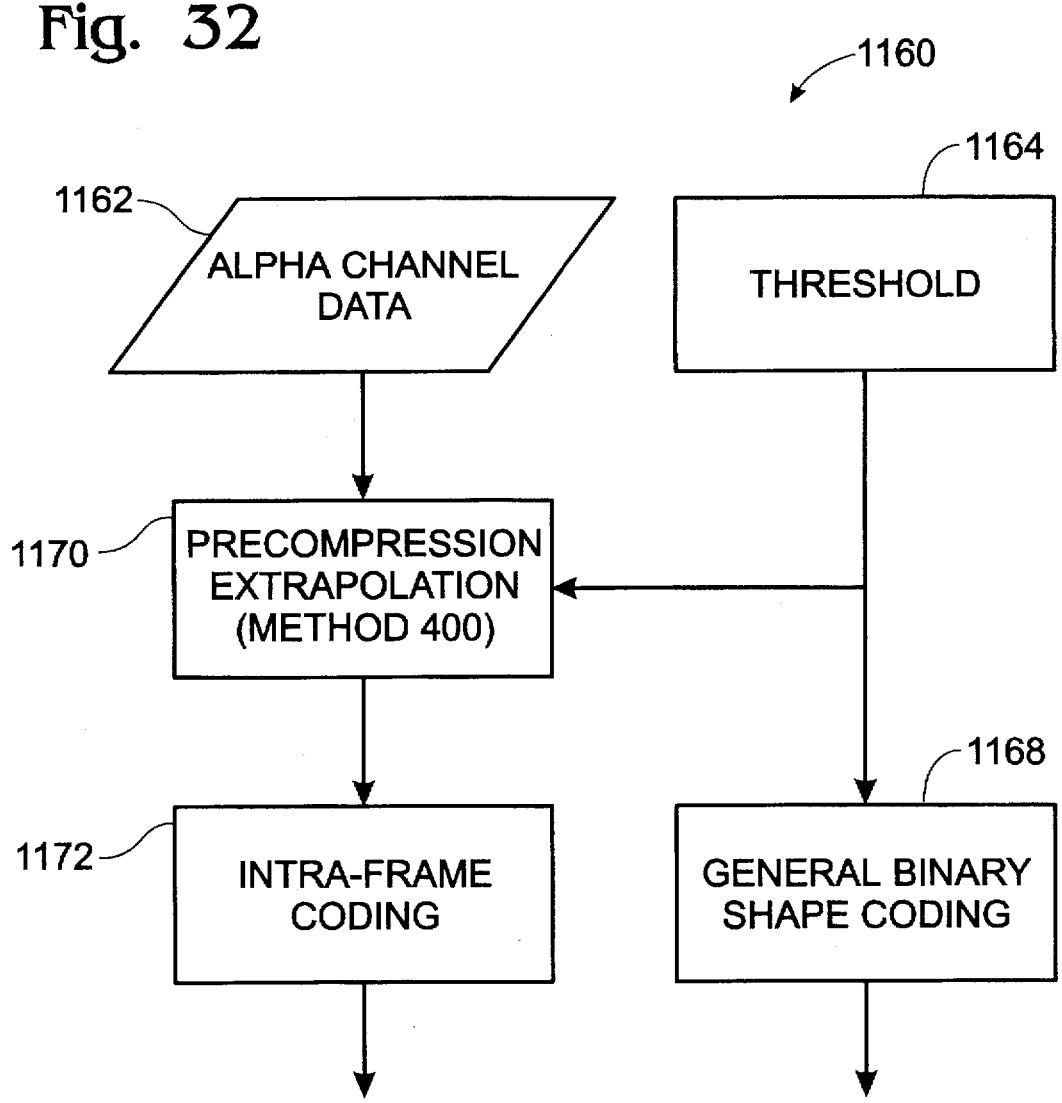
FIG. 32 is a functional block diagram of an encoding process for representing non-binary object information such as object transparency data.

FIG. 32 is a functional block diagram of an encoding process for representing non-binary object information such as object transparency data, which is sometimes referred to as an alpha channel. As is known in the art, each pixel of a video image has a pixel value corresponding to predefined image characteristics. Frequently, pixels are assigned color component values corresponding to red, green, and blue-color components that together provide a substantially full color range. Each color component could be represented, for example, by an 8-bit digital value. Alternatively, pixel values can be represented by a YUV uniform color space in which Y represents luminance and U and V represent chromaticity, as is known in the art. Each of such Y, U, and V color space components also could be represented by 8-bit digital values.

In addition to such color space representations for the pixels of an image, some object based video image representations include a transparency or "alpha" channel that represents the relative transparency of the pixels corresponding to a selected object. Alpha channels commonly are used in video coding or compression, as well as computer graphics, image composition, etc. On a normalized scale, for example, an alpha or transparency value of 0 could represent complete transparency and correspond to an object (e.g. background) over which any other object with a non-zero transparency value would be rendered. In contrast, a normalized transparency value of 1 could represent complete opacity such that a corresponding object would be rendered over any other object in an image. It will be appreciated that such transparency values can be represented by at least 8-bit, and frequently 12- or 16-bit, digital values and that the relative transparency values of overlapping objects is used to represent and render overlapping objects.

Encoding or compressing video data that includes a transparency channel requires that the transparency channel also be encoded or compressed.

However, acceptable encoding of a transparency channel requires that the boundaries of transparency representation be accurately encoded and decoded. Erroneous representations of the transparency channel boundaries of an object or objects creates discernible and undesirable discontinuities in a decompressed or regenerated image.

FIG. 32 is a functional block diagram of an encoding process 1160 for representing non-binary object information, such as object transparency data, so as to maintain accurate representations of object boundaries. Encoder process 1160 provides accurate transparency data boundary identification and encoding by hierarchical encoding process 1130 (FIG. 31). In addition, encoding process 1160 utilizes precompression extrapolation method 400 (FIGS. 17A and 17B) for extrapolating transparency values for objects of arbitrary configuration to a predefined configuration to facilitate compression or encoding in a conventional manner, such as by discrete cosine transform (DCT) or lattice wavelet compression, as described above.

This combination of hierarchical encoding process 1130 and precompression extrapolation method 400 allows transparency data to be encoded efficiently while maintaining highly accurate representations of transparency data boundaries. Moreover, it will be appreciated that encoding process 1160 would be similarly applicable to other multi-value object data types for which accurate boundary representations and compression efficiency are necessary or desirable.

Encoding process 1160 receives multi-value transparency data 1162 corresponding to a region of a video image frame. Typically, transparency data 1162 would correspond to one or more objects, some of which may be partly or completely overlapping others. Different transparency values typically would be associated with different ones of the objects according to the relative transparency or opacity of the objects.

Process block 1164 indicates that a threshold filter is applied to the transparency data. The threshold filter typically would have a relatively low, sometimes zero, threshold value to distinguish highly or completely transparent objects (e.g., background) from other objects. The threshold filter of process block 1164 provides a binary image representation that can include general arbitrary shapes of the type described hereinabove.

Process block 1168 indicates that the binary transparency data are applied to hierarchical encoding process 1130. Encoder process 1130 hierarchically decomposes and encodes the binary transparency data to provide precise encoded representations of the corresponding boundaries of the transparency data, as described above with reference to FIG. 31.

Process block 1170 indicates that the transparency data 1162 received by encoding process 1160 are extrapolated to a predefined configuration to facilitate compression. Preferably, the transparency data are extrapolated by precompression extrapolation method 400, described hereinabove with reference to FIGS. 17A and 17B, and the predefined configuration of extrapolation block boundary 406 (FIGS. 18) corresponds to bounding box 1136 of encoding process 1130.

Process block 1172 indicates that the extrapolated transparency data are encoded by an intraframe encoding process such as DCT or lattice wavelet encoding. It will be appreciated, however, that interframe encoding as described above with reference to process 64 can also be applied to the transparency data, resulting in a residual signal that preferably would be encoded by DCT or lattice wavelet encoding.

Encoding process 1160 provides as compressed or encoded data for storage or transmission an encoded boundary representation at process block 1168 and an intra-frame encoded representation of the transparency data at process block 1172. Decoding of this information includes conventional intra-frame decoding of the transparency value data (e.g. DCT or wavelet), decoding the boundary information corresponding to the binary transparency objects identified by the threshold filter of process block 1164, and applying the decoded boundary information as a mask to the decoded transparency value information to represent reconstituted or decompressed transparency data.

Skipping of Transparent Transformation and Sub-Transformation Blocks

The object-based video coding methods described above code shape and texture independently. The shape information can be used to increase coding efficiency because it enables coders/decoders to determine when to skip coding or decoding of transparent transformation blocks. Video coding methods sometimes encode transformation blocks in smaller blocks, such as 8×8 pixel blocks. The shape information can also be used to determine when to skip coding or decoding these smaller blocks. In the description to follow, the transformation blocks are referred to as "macroblocks" while the smaller blocks within each macroblock are called "blocks." To avoid confusion between transformation blocks and the smaller blocks that they are comprised of, we sometimes refer to the smaller blocks as sub-transformation blocks.

Figure 33:
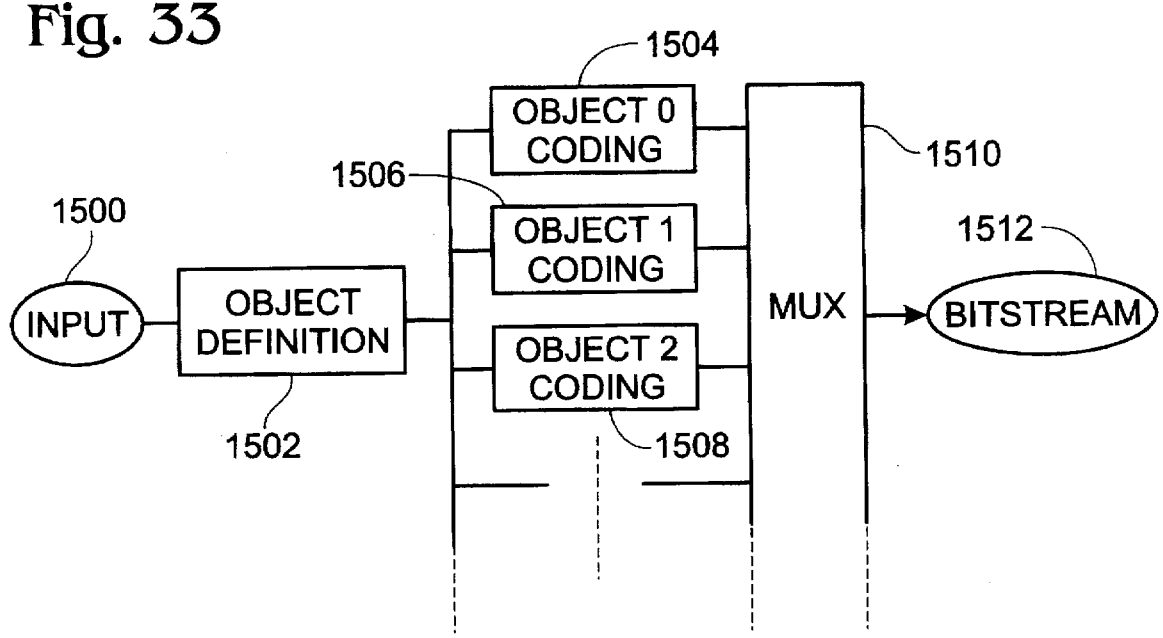
FIG. 33 is a block diagram illustrating the structure of an object-based video encoder.
Figure 34:
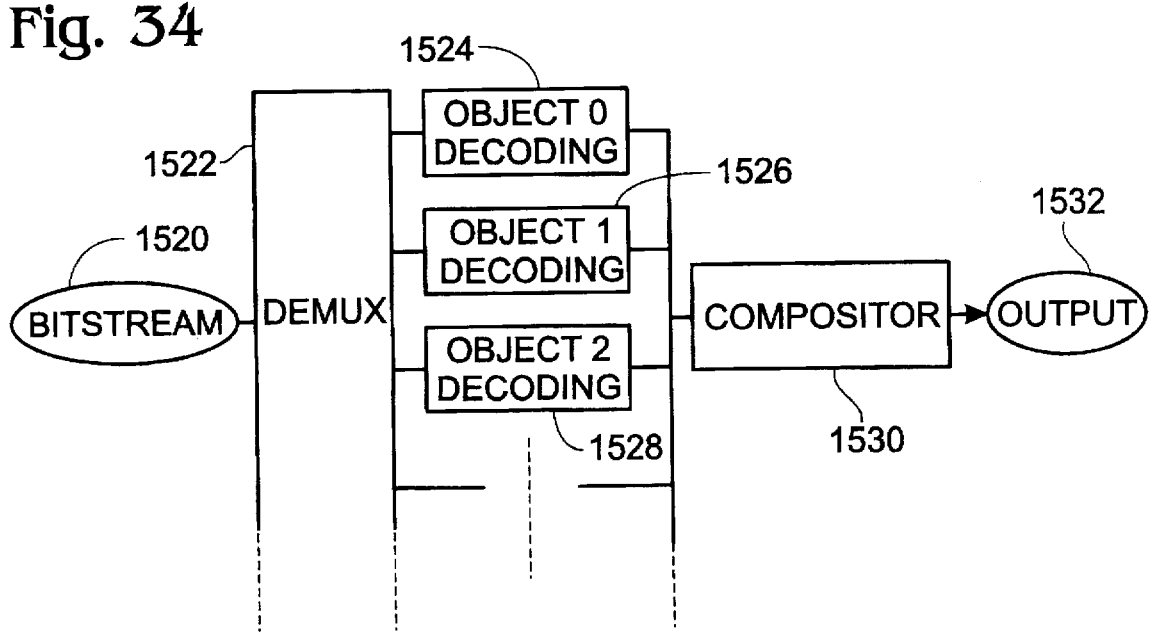
FIG. 34 is a block diagram illustrating the structure of an object-based video decoder.

In an object-based coding method, the video objects in a sequence of video frames are coded separately and the resulting compressed video data is combined into a bitstream. To decompress this bitstream, a decompressor (either hardware or software) separates the bitstream into separate objects, decodes object-based data to reconstruct the objects in the frames, and composites the objects to form the original sequence of video frames. FIGS. 33 and 34 are general block diagrams illustrating the structure of an object-based video encoder and decoder, respectively.

FIG. 33 illustrates an example of the structure of an object-based video encoder. The input to the encoder 1500 typically includes a sequence of video frames comprised of natural images, synthetic images (e.g., the output of a 3D rendering system or computer generated graphics), or a combination of both.

The object definition block 1502 of the encoder determines how to separate this input video sequence into objects. The object definition process generally includes identifying separate objects in the input video sequence and defining the shape of these objects. At the end of this process, an object has shape information and is associated with a bounding rectangle that encloses the object. Each of the objects represents parts of the image frames in the video sequence, and these parts are represented by image data such as an array of pixel values, where each pixel value has color components (YUV or RGB, for example). The shape information for an object describes the boundary or "contour" of the object within its bounding rectangle.

The shape information is either generated by segmentation or is predefined, as in the case of synthetic objects that already have an alpha plane. The shape information is typically represented by a mask such as an array of alpha values (e.g., 8 bit grey scale alpha) associated with a synthetic object or a binary mask generated during the segmentation process. Each object can have an arbitrary shape. One way to generate shape information for natural image video is to use the well-known "blue screen" technique. In this approach, an object or objects are filmed in front of blue screen. The blue background in each frame can then be used to generate the shape information of the object for each frame: the blue region in each frame represents the area outside an object, while the non-blue area represents the object.

After the object definition phase, the encoder separately codes objects as illustrated in the coding units 1504–1508 shown in FIG. 33. These coding units 1504–1508 encode the shape, motion and texture for each object.

The texture data of an object represents either: 1) an array of color intensity values such as YUV or RGB for intraframe coding; or 2) an error signal representing the difference between color values in a predicted object and the actual object for inter-frame coding. The coding units 1504–1508 use a coding method such as wavelet or DCT coding to code inter and intraframe texture data.

While we provide specific examples of shape, motion, and texture coding, the specific coding methods are not critical to the invention and conventional shape, motion and texture coding methods can be used.

The output of the coding units 1504–1508 is combined to form a bitstream of compressed video data. In FIG. 33, the process of combining coded object data is represented by the multiplexer 1510, which receives the output from the coding units and combines the coded objects into the bitstream 1512.

FIG. 34 is a block diagram illustrating an object-based video decoder. The decoder receives a bitstream 1520 of encoded video data and separates this bitstream into separately encoded objects as illustrated by the demultiplexer 1522.

The decoder separately decodes the objects in decoding blocks 1524–1528. For intra-frame encoded objects, the decoding blocks 1524–1528 decode the objects shape and texture. For inter-frame objects, the decoding blocks decode shape texture and motion for each object. The encoder then composites reconstructed objects in the compositor 1530 to produce reconstructed frames in a video sequence 1532.

Figure 35:
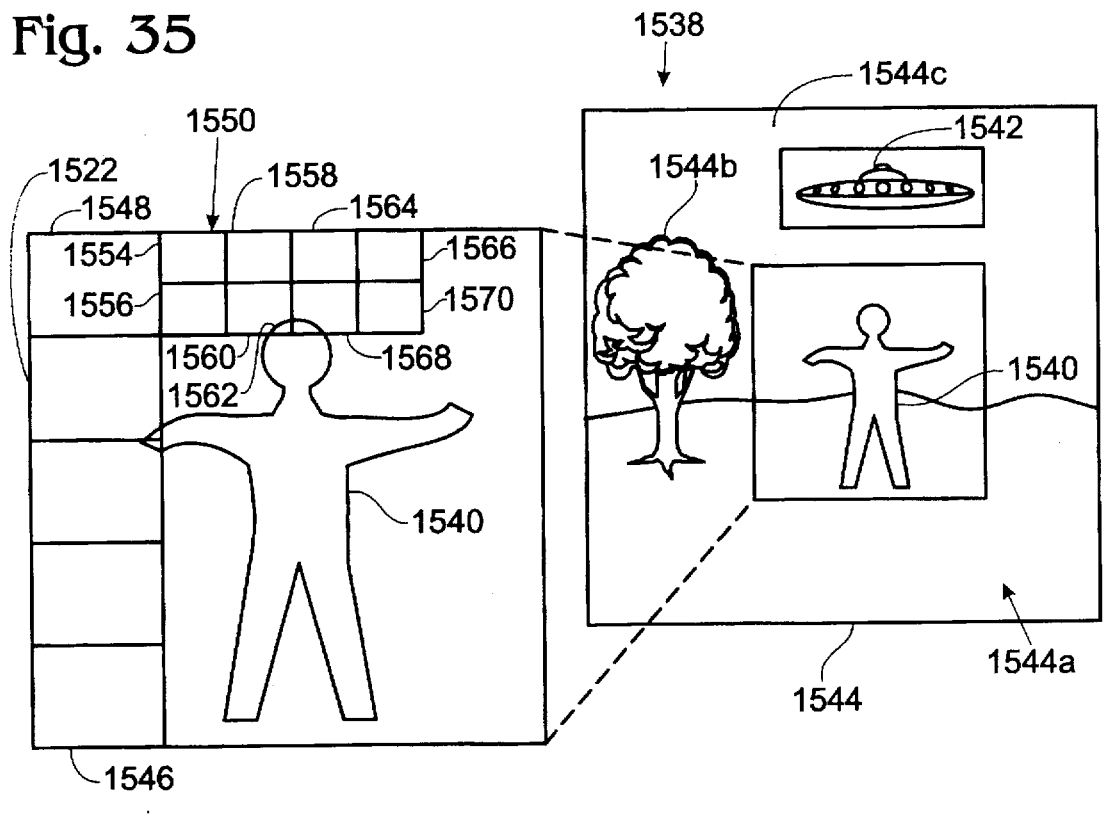
FIG. 35 illustrates how a frame of video can be divided into the objects in the frame.

As an example of object-based coding, FIG. 35 illustrates a frame of video in terms of the objects 1540–1544 that make up the frame. In this example, the frame 1538 is segmented into 3 objects: a person 1540, a spaceship 1542, and the background with landscape 1544a, tree 1544b, and sky 1544c. For simplicity we refer to the background generally using reference numeral 1544.

FIG. 35 shows the object representing a person 1540 in expanded form to show how this portion of the image is divided into transformation blocks. As part of the object definition process, the encoder computes a bounding rectangle 1546 for the object 1540. To code the object using transformation blocks, the encoder expands the bounding rectangle such that the rectangle is an integer multiple of transformation blocks (1548–1552) in both the vertical and horizontal direction. The transformation blocks 1548–1552 in this example are sometimes referred to as macroblocks. Each macroblock is further divided into sub-transformation blocks, referred to as "blocks."

During the coding process, the encoder codes the shape of the objects (e.g., 1540, 1542) separately from the objects' texture and motion data.

In FIG. 35 for example, the shape of the object representing the person 1540 is represented by a mask, and this mask is coded and decoded separately from the object's texture or motion data.

Since the object 1540 representing the person in video frame 1538 is separated from the other objects in the frame, the region inside the bounding box 1546 is likely to have some transparent macroblocks and blocks. The overhead and number of bits needed to encode the object's texture and motion data can be reduced by using shape to determine which transformation blocks (e.g., macroblocks) and sub-transformation blocks (e.g. blocks) are transparent (i.e. not covered by the object 1540). Once these transparent macroblocks and blocks are identified, the coder and decoder can skip coding for these macroblocks or blocks. Skipping of transparent transformation blocks applies when the entire transformation block is transparent. Skipping of transparent sub-transformation blocks applies to transformation blocks partially covered by an object. A "partially covered" macroblock may include one or more transparent blocks and one or more blocks covered by a portion of an object.

An example of a transparent macroblock is macroblock 1548, which lies entirely outside object 1540. An example of a partially covered macroblock is macroblock 1550, which includes transparent blocks 1554–1558 and partially covered block 1560 covered by a portion of the object 1562.

Before describing skipping of transparent transformation blocks, we describe object-based coding in more detail. This will provide a context for transparent block skipping, which is described in more detail below.

Figure 36:
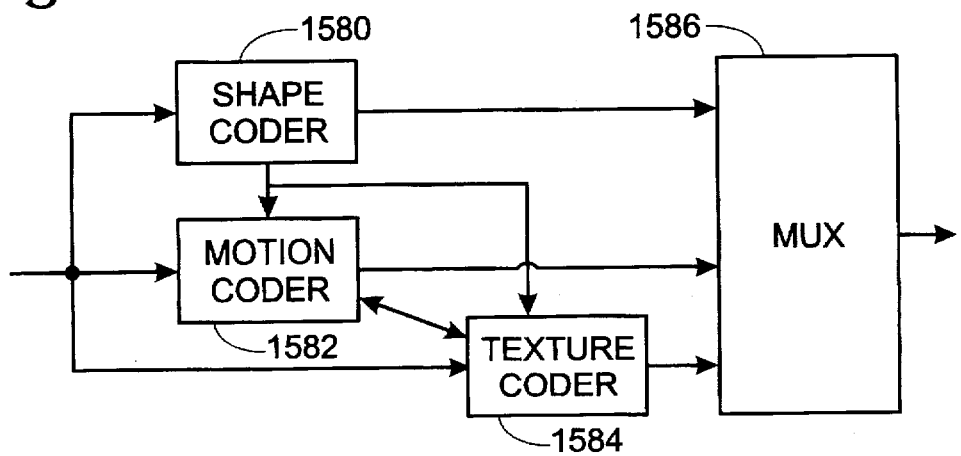
FIGS. 36 is a general block diagram illustrating parts of an object-based video encoder.
Figure 37:
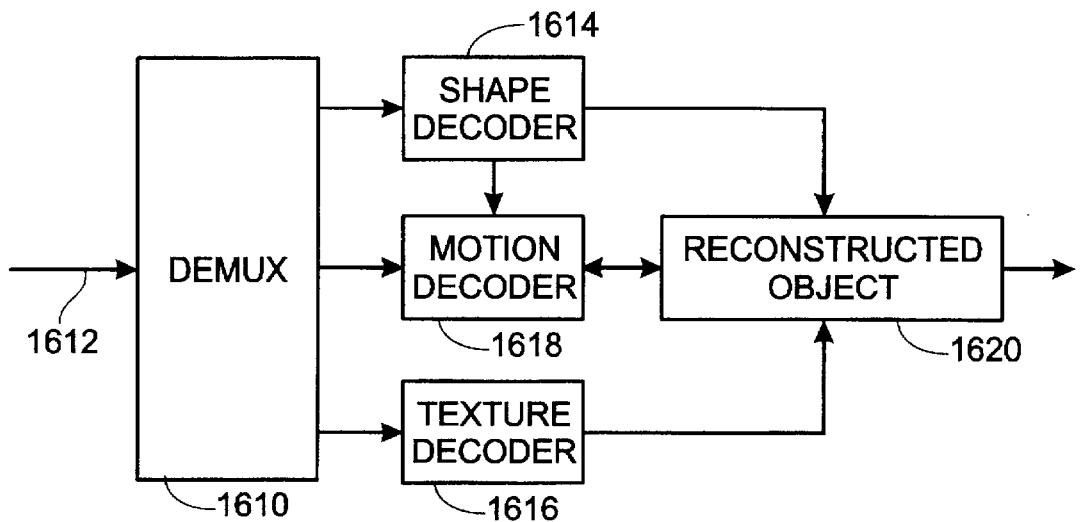
FIGS. 37 is a general block diagram illustrating parts of an object-based video decoder.

FIGS. 36 and 37 are block diagrams illustrating an object-based 25 encoder and decoder in more detail. The object coder shown in FIG. 36 includes three basic parts: a shape coder 1580, motion coder 1582 and texture coder 1584.

The shape coder 1580 reads an objects shape information such as an object mask and encodes it. The shape coder can use a variety of shape coding methods including the arbitrary shape coding methods described above.

The motion coder 1582 performs motion estimation and motion compensation on an object. It analyzes an object in position in a current frame and one or more other frames (previous or subsequent frames), and computes motion data defining how this object moves from frame to frame. Motion data can include a series of motion vectors and/or transform coefficients as described in detail above. The motion estimation data generated by the motion coder 1582 forms part of the bitstream representing the compressed video sequence and is used to predict the object's motion. The motion coder also computes error signals for inter-frame coded object data. These error signals represent the difference between a predicted object, transformed using the motion data, and the actual object for the current frame. The error signals are fed into the texture coder.

The texture coder 1584 codes the objects texture for both intra and inter-framed object data. In the intra-frame case, texture data includes an array of color values, whereas in the inter-frame case texture date comprises the error signals produced from motion compensation. A variety of still image compression techniques can be used to compress inter or intra-frame texture data. In the example illustrated in FIG. 35, each macroblock is divided into 8×8 pixel blocks, which can be compressed using conventional DCT or wavelet coding methods.

The multiplexer 1586 shown in FIG. 36 combines the coded shape, motion and texture data for an object into a bitstream of compressed video data.

Coded shape, motion, and texture data for each of the objects in the video sequence are combined to form the bitstream representing the video sequence. FIG. 37 illustrates a general block diagram of a decoder in an object-based video coding system. The demultiplexer 1610 reads the bitstream 1612 of coded video data and separates it into encoded shape data, motion data and texture data for the objects in the video sequence. The shape decoder 1614 decodes the shape information for objects. The shape information is decoded first so that the decoder can use it to identify transparent macroblocks and blocks associated with each object. As part of the process of reconstructing an object for a frame, the decoder applies the shape information to the object's texture data to remove decoded texture data falling outside the object's boundary.

The texture decoder 1616 decodes both intra-frame and inter-frame coded texture data for objects in the video sequence.

The motion decoder 1618 decodes the motion data and performs motion compensation to reconstruct an object. The motion decoder transforms a previously reconstructed object using decoded estimation data to compute a predicted object. It then combines the decoded error values from the texture decoder with the predicted object to compute a reconstructed object for the current frame. The output of the decoder in this reconstructed object 1620.

Figure 38:
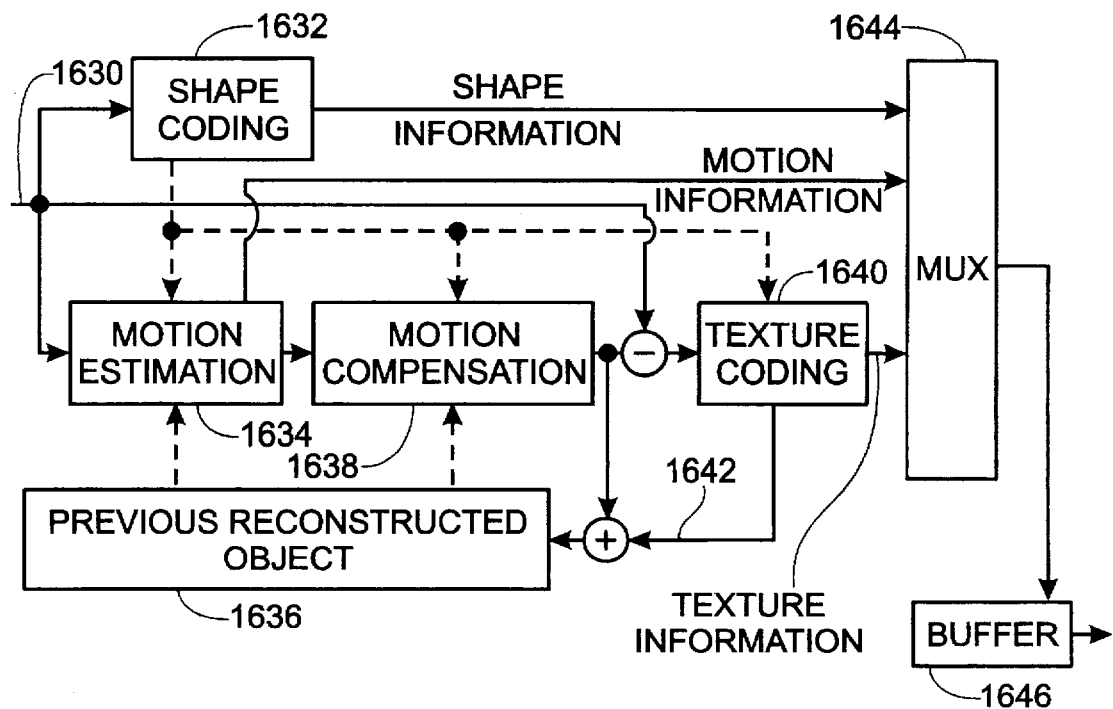
FIG. 38 is a block diagram illustrating an implementation of an object-based video encoder.

FIG. 38 is a block diagram illustrating a more specific implementation of an object-based video encoder. The input 1630 to the encoder includes a series of objects, their shape information and bounding rectangles. The shape information, therefore, is available before the encoder codes texture or motion data. This enables the encoder to determine which macroblock and blocks within the object's bounding rectangle are transparent and can be skipped.

The shape coding block 1632 receives the definition of an object including its bounding rectangle and extends the bounding rectangle to integer multiples of macroblocks. The shape information for an object in this implementation comprises a mask or "alpha plane." The shape coding block 1632 reads this mask and compresses it.

Motion estimation block 1634 reads an object including its bounding rectangle and a previously reconstructed object 1636 and computes motion estimation data used to predict the motion of an object from one frame to the next. The motion estimation block 1634 applies the motion estimation method described above or a conventional motion estimation method to compute this motion information. Examples of motion techniques that can be used in the motion estimation block 1634 include the polygon match method described above, integer pixel motion estimation, etc. The specific format of the motion information output from the motion estimation block 1634 can vary depending on the motion estimation method used. For example, the motion information can include motion vectors for a macroblock or transform coefficients such as the affine transform coefficients described in detail above.

The motion compensation block 1638 reads the motion data generated in the motion estimation block and the previously reconstructed object 1636 and computes a predicted object for the current frame. The encoder finds the difference between the actual object as specified in the input 1630 and the predicted object as computed in the motion compensation block 1638 to determine the error signal for the object.

Texture coding block 1640 compresses this error signal for interframe coded objects and compresses color values for the object from the input data stream 1630 for intra-frame coded objects. The feedback path 1642 from the texture coding block 1640 represents the error signal. The encoder uses this error signal along with the predicted object from the motion compensation block to compute the previously reconstructed object 1636.

The texture coding block 1640 codes intra-frame and error signal data for an object using any of a variety of still image compression techniques. Example compression techniques include DCT, wavelet, as well as other conventional image compression methods. Examples of these image compression techniques are described in further detail above with reference to compression of quantized objects and estimated error signals.

The bitstream of the compressed video sequence includes the shape, motion and texture coded information from the shape coding, motion estimation, and texture coding blocks. Multiplexer 1644 combines this data into the bitstream and outputs it to the buffer 1646.

Figure 39:
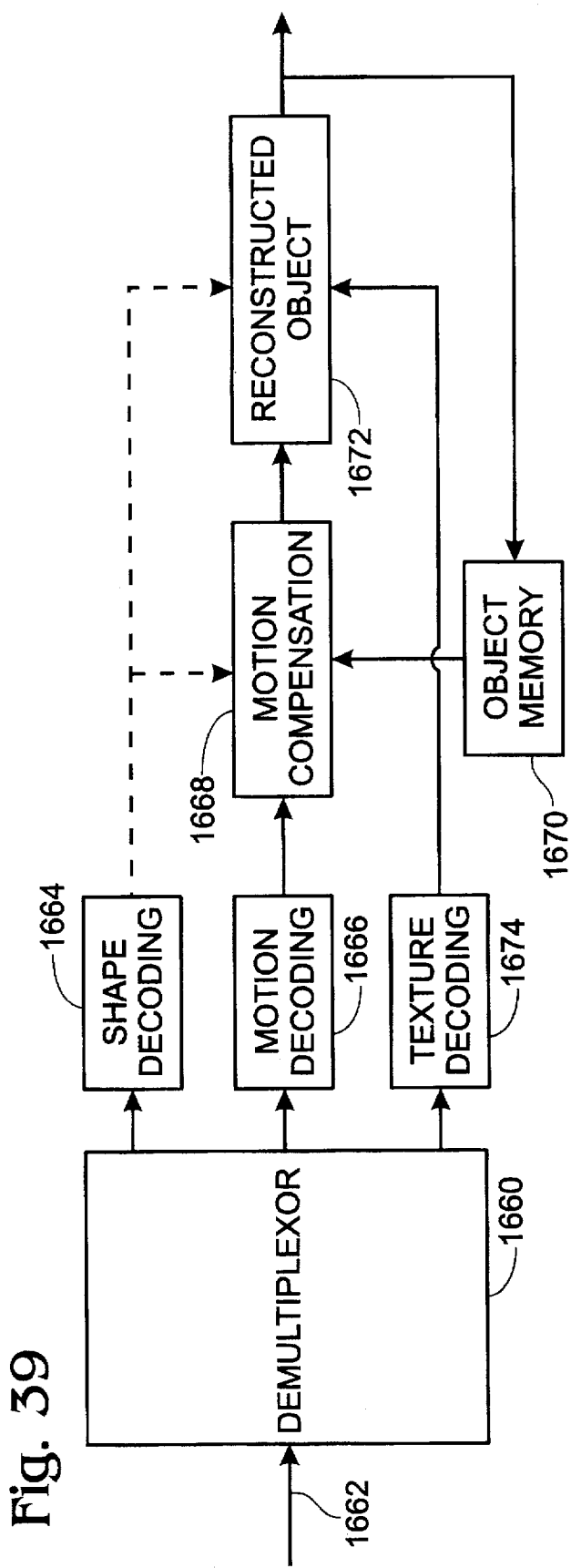
FIG. 39 is a block diagram illustrating an implementation of an object-based video coding method.

FIG. 39 is a block diagram illustrating a decoder for an object-based video coding method. A demultiplexer 1660 receives a bitstream representing a compressed video sequence and separates shapes, motion and texture encoded data on an object by object basis. Shape decoding block 1664 decodes the shape or contour for the current object. To accomplish this, it employs a shape decoder that implements the inverse of the shape encoding method used in the encoder of FIG. 38. The resulting shape data is a mask, such as a binary alpha plane or gray scale alpha plane representing the shape of the object.

The motion decoding block 1666 decodes the motion information in the bitstream. The decoded motion information includes motion data such as motion vectors for macroblocks blocks or transform coefficients, depending on the type of estimation method used in the encoder. The motion decoding block 1666 provides this motion information to the motion compensation block 1668, and the motion compensation block 1668 applies the motion data to previously reconstructed object data 1670.

The texture decoding block 1674 decodes error signals for interframe coded texture data and an array of color values for intra-frame texture data and passes this information to the block labeled reconstructed object. For inter-frame coded objects, the reconstructed object block 1672 applies the error signal data to the predicted object output from the motion compensation block to compute the reconstructed object for the current frame. For intra-frame coded objects the texture decoding block 1674 decodes the color values for the object and places the reconstructed object in the reconstructed object block 1672. Previously reconstructed objects are temporarily stored in object memory 1670 and are used to construct the object for other frames.

As introduced above, shape information can be used to determine when motion and/or texture coding can be skipped for macroblocks and blocks.

Figure 40:
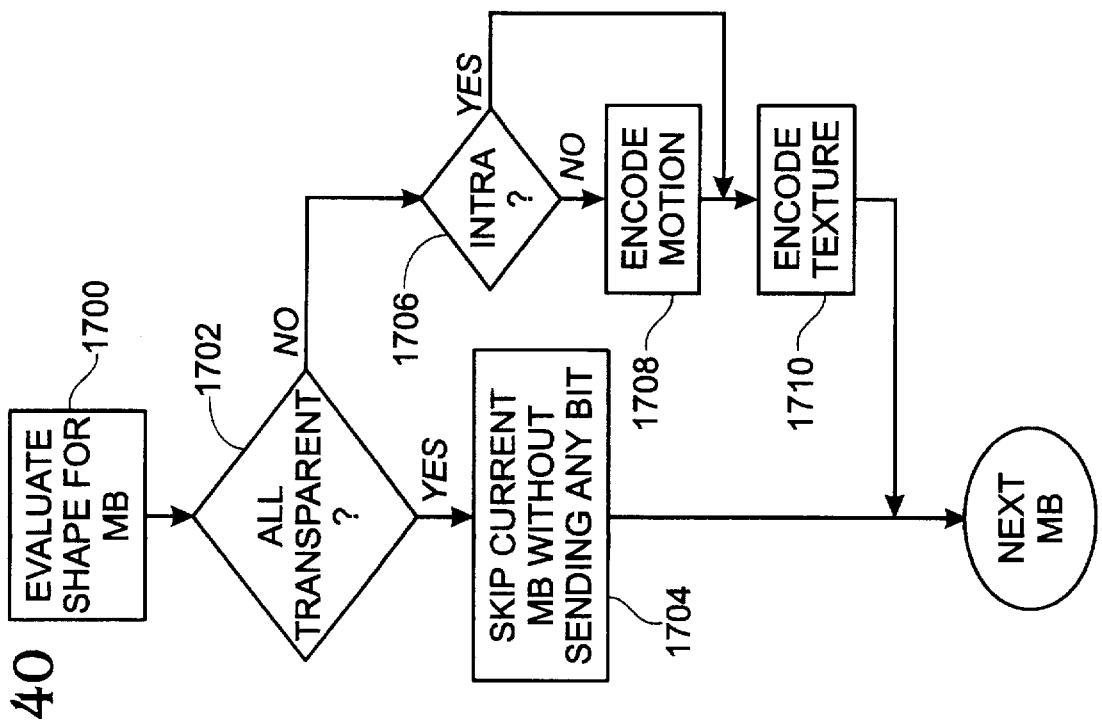
FIG. 40 is a flow diagram illustrating a method implemented in an object-based video encoder to skip transparent macroblocks.

FIG. 40 is a flow diagram illustrating the method implemented in the encoder to skip transparent macroblocks. The shape information generated during the object definition phase of the encoding process can be used to determine which macroblocks and blocks within an object's bounding rectangle are transparent. Before encoding motion or texture data for a macroblock, the encoder evaluates the shape data for the current macroblock as shown in step 1700. Decision block 1702 represents the step of determining whether the current macroblock is entirely transparent from the shape information.

If the current macroblock is transparent, the encoder can skip the current macroblock without sending any bits to indicate that the block has been skipped or any bits used to represent transparent pixels.

If the current macroblock is not entirely transparent, then the encoder codes the macroblock depending on whether it is an intra or inter-frame macroblock. Decision block 1706 and the encoding steps 1708, 1710 following it generally illustrate the difference in the encoding process for intra and interframe macroblocks. For inter-frame blocks, the encoder encodes both motion estimation information as well as texture information. For intra-frame blocks, the encoder codes texture and does not necessarily have to encode motion.

As illustrated in FIG. 40, the shape information enables the encoder to identify transparent macroblocks and skip texture encoding and possibly motion encoding for the macroblock. When it identifies a transparent macroblock, the encoder skips directly to the next macroblock without encoding any bits for the current macroblock.

Figure 41:
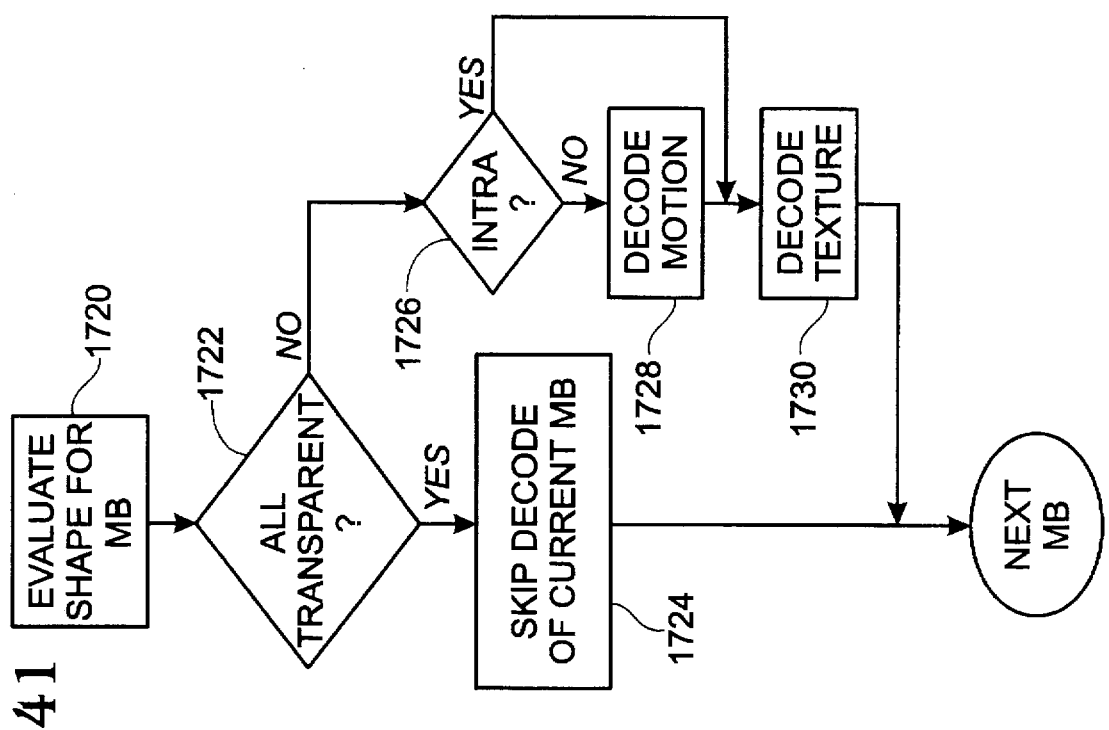
FIG. 41 is a flow diagram illustrating a method for skipping transparent macroblocks in an object-based video decoder.

The shape information can also be used to skip decoding operations in the decoder. FIG. 41 is a flow diagram illustrating a method for skipping transparent macroblocks in the decoder. Before decoding motion or texture data, the decoder evaluates the shape information for the current macroblock as shown in block 1720. Decision block 1722 reflects that the decoder determines whether a macroblock is transparent from the shape information before decoding motion or texture data. If the current macroblock is entirely transparent, the decoder skips the macroblock and proceeds directly to the next macroblock as shown in step 1724.

The type of decoding skipped for the current macroblock depends on whether the macroblock represents intra or inter-frame coded data. Decision block 1726 and the following steps 1728 and 1730 illustrate the difference in decoding intra and inter-frame macroblocks in cases where the current macroblock is not entirely transparent. If the macroblock is not transparent and represents intra-frame data, the decoder proceeds to decode texture information for the macroblock. If, on the other hand, the current macroblock is an interframe frame coded macroblock, the decoder proceeds to decode motion data and texture data for the macroblock. In this case, the texture data represents error signals used in motion compensation.

FIG. 41 generally illustrates how shape information can be used to skip transparent macroblocks. In addition to the advantage gained by skipping decoding steps, the decoder is further improved since it does not need to decode any overhead bits used to identify "skipped" blocks.

Shape information can be used to skip transparent portions of transformation blocks in object-based video coding methods where transformation blocks are divided into and coded using sub-transformation blocks within each transformation block. Macroblocks are typically divided into smaller blocks so that texture coding can be applied on these individual blocks within the macroblock. In some implementations, motion information can be coded on a block by block rather basis as well. Some macroblocks may include one or more transparent blocks. Coding these transparent blocks adds unnecessary coding an decoding operations and adds more bits to the bitstream.

The opportunity to skip transparent blocks arises for a partially covered macroblocks. If a macroblock is entirely transparent, the transparent macroblock skipping method above can be used to avoid unnecessary coding operations and bits in the bitstream. On the other hand, if an object touches each of the blocks within a macroblock, none of the blocks are entirely transparent. Therefore, block skipping in this context applies to partially covered macroblocks: macroblocks including at least one transparent block.

FIG. 35 illustrates an example of a partially transparent macroblock with at least one transparent block. Macroblock 1550 includes three transparent blocks, 1554, 1556, and 1558, as well as a nontransparent block 1560. When this block is encoded or decoded, texture coding can be skipped for each of the transparent blocks 1554, 1556, 1558. In addition, if motion information is coded for each block, motion coding can be skipped for the transparent blocks as well.

Figure 42:
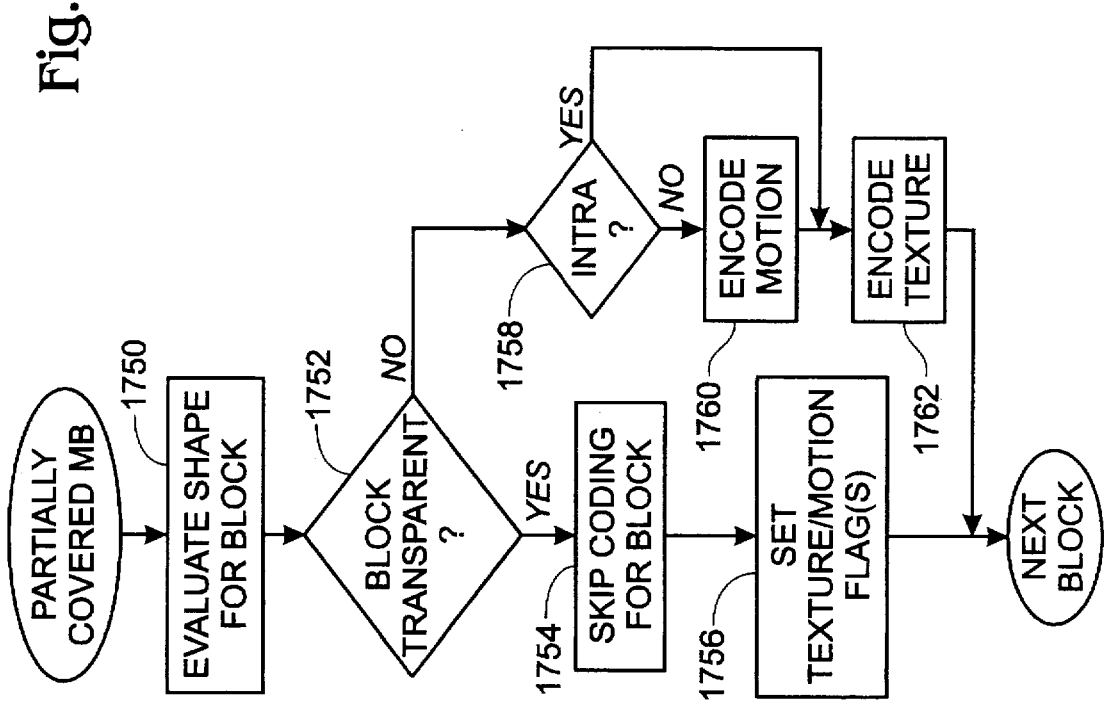
FIG. 42 is a flow diagram illustrating transparent block skipping for partially covered macroblocks in an object-based video encoder.

FIG. 42 is a flow diagram illustrating block skipping for partially covered macroblocks in an encoder. While processing the current macroblock the encoder evaluates the shape for a block within this macroblock as shown in step 1750. As illustrated by decision block 1752, the encoder evaluates whether the block is transparent from the shape information. If the current block within the macroblock is entirely transparent, the encoder skips coding for the block. This includes skipping texture coding for the block and possibly motion coding (see step 1754).

In some implementations of object-based video coding methods, it is sometimes necessary to set certain parameters for block (see optional step 1756). For example in one implementation, the encoder sets a texture flag indicating that the texture coefficients for each pixel in the block are zero and also sets a motion flag indicating that the motion vector for the transparent block is zero.

It is necessary to set these flags in this implementation because the values of these flags would otherwise be undefined, and the undefined status of these flags could actually increase the overhead associated with the macroblock that contains the transparent block. The overhead could be increased because these flags are used to determine when decoding of the texture data associated with the macroblock can be skipped in cases where the texture has not changed for a current frame. This form of skipping is different than skipping a transparent macroblock because it is not dependent on the extent to which the object covers the macroblock. Rather, it depends on how the texture data changes from frame to frame. In the event that the texture has not changed for the macroblock, the decoder does not have to decode the texture because it has already constructed the same data for a previously reconstructed object.

The above description of skipping transparent sub-transformation blocks in the encoder results when the encoder determines that a block within a partially covered transformation block is transparent. If the current block is not transparent, then the encoder must encode texture and possibly motion data for the block. Decision block 1758 and the steps following it (1760 and 1762) represent the difference in block encoding depending on whether the block is intra or inter-frame coded. If the block is an intra-frame coded block, the encoder in this implementation only codes the texture information. On the other hand, if the current block is an inter-frame coded block the encoder must code motion data for the block as well. Of course, this only applies to implementations where motion data is coded on a block by block basis. In cases where only texture data is coded on block by block basis, the shape information for partially covered macroblocks can only be used to skip texture coding for transparent blocks within the macroblock.

Figure 43:
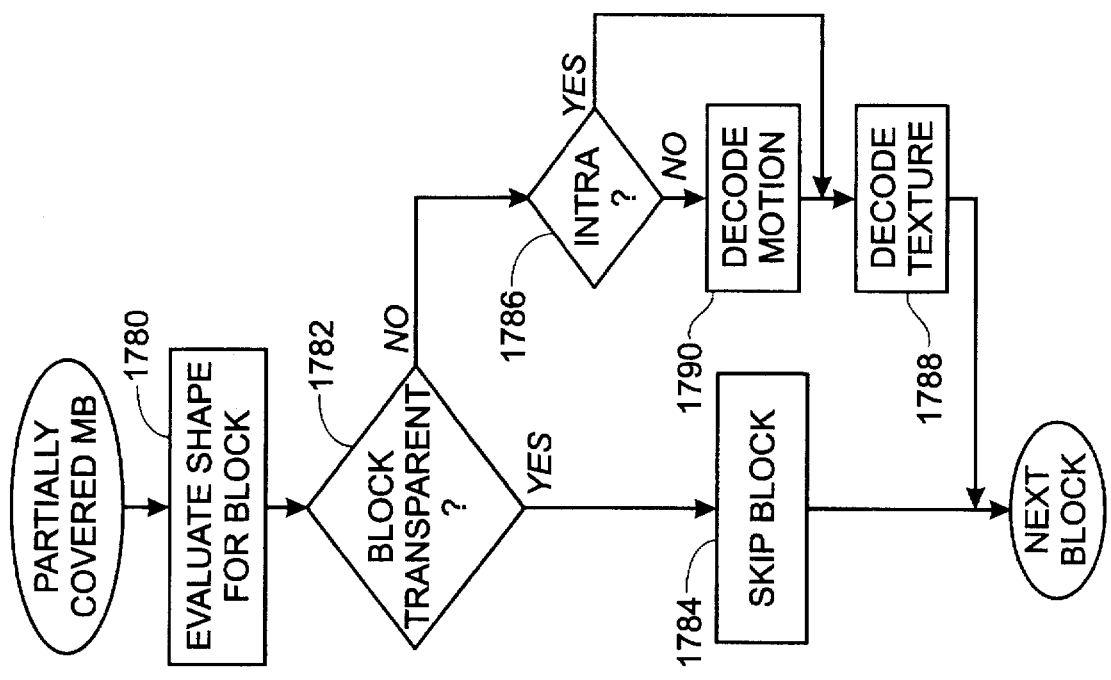
FIG. 43 is a flow diagram illustrating transparent block skipping for partially covered macroblocks in an object-video decoder.

FIG. 43 is a flow diagram illustrating the process for transparent block skipping in a decoder. This process is very similar to transparent block skipping in the encoder. As the decoder decodes the current macroblock, it evaluates the shape for the current block as shown in step 1780. Decision step 1782 represents the determination whether the current block is entirely transparent. If the current block is entirely transparent, the decoder skips the block and proceeds to decode the next block.

If however, the current block is not entirely transparent the decoder proceeds to decode texture data and possibly motion data for the block. The decision block 1786 represents the different types of decoding for inter and intra-frame coded blocks. For intra-frame coded blocks, the decoder decodes texture information representing color values for the object (see step 1788). For inter-frame coded objects, the decoder potentially decodes motion data along with texture data if motion data is coded on a block by block basis within the macroblock (see steps 1788 and 1790.

As illustrated in FIGS. 42 and 43, object-based encoders and decoders can reduce operations by identifying transparent blocks within a transformation block from an object's shape information. The methods described above reduce texture coding and decoding operations significantly since transparent blocks are not filled with zeros and encoded or decoded. Similarly, motion coding at the block level can be skipped as well.

Block Transparency Status for Interframe Shape Coding

Some object based video coding methods code shape information for a frame by using motion estimation and compensation on the shape of video objects. This approach is similar to motion estimation and compensation performed on texture, except that it is performed on shape information and residual error values are not coded. This form of shape coding is sometimes referred to as inter-frame shape coding.

When the shape of an object in a sequence of video is encoded using motion data, the decoder must decode motion data before it can reconstruct the shape for a frame. Since the shape information is not available before the motion data, it cannot be used to identify transparent blocks within a partially transparent macroblock. As such, there is a need for a method for encoding transparent blocks in partially covered macroblocks that are coded using inter-frame shape coding. If the status of transparent blocks are encoded in the bitstream, the decoder can then determine which blocks are transparent, even though the shape information is not available until after the motion data is decoded.

One way to encode the status of a partially transparent macroblock in these circumstances is to add block transparency status information to the bitstream. The block transparency status information generally refers to a data bit or bits which indicate which blocks within a partially covered macroblock are transparent.

The block transparency status information adds additional bits to the bitstream, and therefore, should only be used in cases where it is necessary to determine whether motion decoding should be performed for blocks within a macroblock. In one implementation of this method, the block transparency status information is encoded in block transparency status bits (BTS). We generally refer to this block transparency status data as block transparency status flags. The BTS data is only present when the following three criteria are satisfied:

1. Motion prediction/compensation is used to code an object. In other words, the object is inter-frame coded, and specifically, the shape is interframe coded.

If shape is not coded using motion compensation, the shape can be decoded before motion data is decoded and then used to identify transparent blocks within a partially covered macroblock.

2. The macroblock at issue is a partially covered (i.e., partially transparent ). This information can be determined on the encoder side by looking at the shape information and determining from the shape information whether an object overlaps one or more, but not all, of the blocks in a macroblock.

3. The macroblock is encoded using more than one motion vector (e.g., two to four motion vectors, each corresponding to a block within the macroblock). If there is no motion vector for a macroblock, then there is no need for BTS since there will be no motion decoding for the macroblock anyway. If there is only one motion vector for the macroblock, it needs to be decoded and there is no additional benefit for using BTS data.

The implementation of the BTS requires support in the encoder and decoder. The encoder must evaluate when the BTS should be added to the compressed bitstream based on the above criteria. To summarize, the encoder adds the BTS to the bitstream in cases where shape is inter-frame coded, the macroblock is partially transparent, and there are at least two motion vectors for the macroblock.

Since the encoder selects the type of coding for each object and macroblock, it knows whether it has coded shape using motion compensation for a given macroblock. To code shape using motion compensation, the encoder performs motion estimation on the texture data and the output of the motion estimation step process is motion data (e.g. motion vectors) defining how shape or texture changes between different frames. Specifically, in one implementation for example, the encoder performs motion estimation on the luminance data to compute the motion vector or vectors for a macroblock. The motion vectors can also be computed from alpha data.

The encoder applies the motion vector or vectors to a shape for a first frame to find the predicted shape for a second frame. It then computes the error between the predicted shape and the actual shape for the second frame. If the error is within a predefined tolerance, the encoder does not need to send the shape for the second frame, but rather, it encodes the shape using the motion data. Conversely, if the error exceeds the tolerance, the encoder codes the shape for the second frame and places it in the bitstream.

In one specific implementation of inter-frame shape coding, the encoder performs motion compensation on the alpha block, and then, before computing the prediction error, clamps the compensated alpha data for a block by rounding the values to 0 or 255. The encoder computes the prediction error for a 16×16 alpha block by dividing the block into sub-blocks, computing the summation of absolute prediction error for each sub-block, and then determining whether each absolute prediction error is less than the predefined tolerance. In addition to meeting this error criteria, there are three other criteria for using inter-frame alpha coding: the compensated alpha block must not be all zeros, the compensated alpha block and the actual block must not be all 255, and the YUV texture data for the macroblock must be inter-frame coded.

The encoder can determine whether a macroblock is partially transparent by evaluating the shape information for the macroblock as explained previously. Information about the alpha data in a macroblock or block is sometimes encoded using a special code. For example, in one specific implementation, a code called the first_MMR_code is used to indicate whether alpha data exists, and indicates cases where alpha values in a block are all 255 (opaque), or all zero (transparent), etc.

The encoder knows the number of motion vectors used for a given macroblock because it controls motion estimation and compensation. The mode of the motion coding used in the coder is typically specified for a macroblock. For example, if the motion coding is set to advanced mode, meaning that there are 2-4 motion vectors for a macroblock, then the macroblock is coded to indicate this advanced motion coding mode.

If the above three conditions are detected in the encoder, the encoder sets the BTS in the bitstream for a macroblock. In one implementation, the BTS is a four bit number where each bit indicates whether a corresponding block in the macroblock is totally tranparent (zero), or otherwise (one).

On the decoder side, the decoder reads the BTS to determine whether it can skip decoding motion data for one or more of the blocks in a macroblock. If it can skip motion decoding, it moves directly to the next block and only decodes motion vector data for blocks for which the corresponding BTS bit is set.

An example of the macroblock structure is as follows:

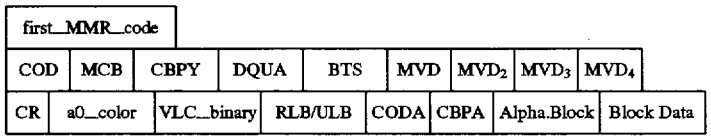

The codes and data in this example structure are defined as follows:

COD—A bit indicating that the macroblock is coded. COD is only present for macroblocks of objects that are coded using motion prediction and compensation.

MCBPC—A variable length code word giving information about the type of coding used for this macroblock and also providing the Coded Block Pattern for Chrominance (CBPC).

CBPY—The Coded Block Pattern for luminance, Y. This code is used to specify whether the transform coeffients for luminance within a block are all zero.

DQUANT—A code used to indicate a change in the quantizer for an object.

BTS—The block transparency status bits. A four bit code word indicating whether each block in a partially transparent macroblock is entirely transparent.

MVD—Motion vector information provided for inter-frame coded macroblocks. It includes a variable length code word for the horizontal component, and a variable length code word for the vertical component.

$MVD_2$, $MVD_3$, and $MVD_4$—Motion vector data present in advanced prediction mode.

CR—This refers to a conversion ratio used in shape coding. Shape information for an object can be size converted for rate control and rate reduction. The conversion ratio can be, for example, 1 (for the original size), ½ and ¼.

a0_color—One bit code indicating the color of the first pixel in a macroblock.

VLC_binary—Variable length code for binary shape information.

RLB/ULB—Residual Length of binary shape information/ unchanged length of binary shape information.

The codes CODA, CBPA, and "Alpha Block Data" are a portion of the bitstream representing the encoding of alpha data for a macroblock.

CODA—This is a single bit indicating whether all of the values in the alpha macroblock are 255 (the macroblock is opaque).

CBPA—This code is the Coded Block Pattern for Alpha. This is the same as CBPY. The CBPA bit is set to zero for macroblocks and blocks with all zero alpha values.

Alpha Block Data—These are the alpha values for a macroblock. Note that no data needs to be sent in this portion if the macroblock is opaque or is entirely transparent.

Block Data—This is the rest of the data for the blocks in the macroblock (e.g., the texture data).

Note that in this example, the BTS flags are provided before the motion vector data in the macroblock structure. This enables the decoder to determine whether it can skip motion decoding for one of the blocks in the macroblocks (the motion vectors correspond to the Y sub-transformation blocks for the macroblock). Thus, if a block in a partially transparent macroblock is entirely transparent, the decoder skips the step of decoding motion data for that block.

Reducing the Overhead of the Coded Block Pattern for Texture

In some object based video coding methods, the encoder places a code called the Coded Block Pattern (CBP) in the bitstream to indicate the coded block pattern for individual blocks (sub-transformation blocks) in a macroblock.

For instance, in the macroblock structure set forth above, there are six blocks in a macroblock: four for luminance(Y) and 2 for chrominance (C). In this case, there are two kinds of Coded Block Patterns (CBP): CBPY, the coded block pattern for luminance, and CPBC, the coded block pattern for chrominance.

In cases where there are one or more transparent blocks within a partially transparent macroblock, the overhead associated with coded block pattern for luminance can be reduced because there is no need to code CBPY data for a transparent block. The overhead for coded block pattern data for luminance can be reduced because there is normally coded block pattern data for each of the 4 blocks, whereas the coded block pattern data for a chrominance block is the same as the macroblock it belongs to. The amount of overhead for CBPY can be reduced since it no longer requires 4 bits for each MB if there are one or more transparent blocks in the macroblock.

Rather than transmit a bit for each block, the bitstream only needs to include CBCY data for non-transparent blocks in a partially transparent macroblock. To reduce the number of bits needed to encode CBPY, therefore, the encoder determines whether any of the blocks in a partially transparent macroblock are entirely transparent. If at least one of the blocks is entirely transparent, then only the non-transparent blocks are coded.

Only one bit is needed for each non-transparent block to indicate whether the transform coefficients are all zero. In one specific implementation, these bits corresponding to non-transparent blocks are converted into a variable length code according to whether the texture in the macroblock is an intra-frame coded block (I) or is a predicted type block (i.e., coded using motion estimation/compensation).

The encoder uses a variable length code (VLC) table to determine which VLC to use for transparent blocks. In the tables below, the value "1" represents the block is coded, and the value "0" indicates that the block is not coded. Below, we list a specific implementation of the VLC tables in cases where there are 2, 3, or 4 non-transparent macroblocks. In cases where only one block in the partially transparent macroblock is non-transparent, no table is needed since only one CBPY bit is sent.

1 CBPY: no VLC table is needed.
2 CBPY:

| CBPY (I) | CBPY (P) | VLC code | number of bits |
|---|---|---|---|
| 11 | 00 | 1 | 1 |
| 10 | 01 | 01 | 2 |

-continued

| CBPY (I) | CBPY (P) | VLC code | number of bits |
|---|---|---|---|
| 01 | 10 | 001 | 3 |
| 00 | 11 | 0001 | 4 |

3 CBPY:

| CBPY (I) | CBPY (P) | VLC code | number of bits |
|---|---|---|---|
| 111 | 000 | 1 | 1 |
| 110 | 001 | 001 | 3 |
| 101 | 010 | 00011 | 5 |
| 100 | 011 | 00010 | 5 |
| 011 | 100 | 010 | 3 |
| 010 | 101 | 00001 | 5 |
| 001 | 110 | 000001 | 6 |
| 000 | 111 | 011 | 3 |

4 CBPY

| Index | CBPY(I) (1 2 3 4) | CBPY(P) (1 2 3 4) | Number of Bits | Codes |
|---|---|---|---|---|
| 0.00 | 0 0<br>0 0 | 1 1<br>1 1 | 4 | 0011 |
| 1 | 0 0<br>0 1 | 1 1<br>1 0 | 5 | 0010 1 |
| 2 | 0 0<br>1 0 | 1 1<br>0 1 | 5 | 0010 0 |
| 3 | 0 0<br>1 1 | 1 1<br>0 0 | 4 | 1001 |
| 4 | 0 1<br>0 0 | 1 0<br>1 1 | 5 | 0001 1 |
| 5 | 0 1<br>0 1 | 1 0<br>1 0 | 4 | 0111 |
| 6 | 0 1<br>1 0 | 1 0<br>0 1 | 6 | 0000 10 |
| 7 | 0 1<br>1 1 | 1 0<br>0 0 | 4 | 1011 |
| 8 | 1 0<br>0 0 | 0 1<br>1 1 | 5 | 0001 0 |
| 9 | 1 0<br>0 1 | 0 1<br>1 0 | 6 | 0000 11 |
| 10 | 1 0<br>1 0 | 0 1<br>0 1 | 4 | 0101 |
| 11 | 1 0<br>1 1 | 0 1<br>0 0 | 4 | 1010 |
| 12 | 1 1<br>0 0 | 0 0<br>1 1 | 4 | 0100 |
| 13 | 1 1<br>0 1 | 0 0<br>1 0 | 4 | 1000 |
| 14 | 1 1<br>1 0 | 0 0<br>0 1 | 4 | 0110 |
| 15 | 1 1<br>1 1 | 0 0<br>0 0 | 2 | 11 |

The last table used for cases where all four blocks are non-transparent is not new. It is the standard table currently proposed in MPEG-4. The coding approach of CBPY for cases where there is at least one transparent block are new and provide a significant reduction in the number of bits needed to encode partially transparent macroblocks. These partially transparent macroblocks usually fall at the boundary of an object.

The CBPY bits used for partially transparent macroblocks provide a significant reduction in the number of bits needed to encode the Coded Block Pattern relative to the table used to encode four CBPY bits. The VLC bits are selected such that the shortest codes are used for Coded Block Patterns that tend to occur most frequently for Intra-frame and Inter-frame (Predicted) macroblocks. While not a requirement, the VLC codes should include at least one non-zero bit. Having at least one non-zero bit facilitates error checking of the bitstream.

While we have described block skipping with reference to specific encoder and decoder structures and methods, it is important to emphasize that the invention can be applied in a variety of object-based video coding systems. The specific coding methods employed are not critical to the invention and other shape, and motion coding techniques can be used besides the specific coding techniques described and illustrated in this application. The object-based coding techniques can be implemented in software or hardware coders/decoders or systems using a combination of hardware and software.

In view of the many possible embodiments to which the principles of our invention may be applied, it should be recognized that the illustrated embodiments are only examples of the invention and should not be taken as a limitation on the scope of the invention. Rather, the scope of the invention is defined by the following claims. We therefore claim as our invention all that comes within the scope and spirit of these claims.

We claim:

1. In an object-based video coding method, a method for reducing coding overhead comprising:

separately encoding video objects in a sequence of video frames including:
separately encoding shape for each of the objects,
separately encoding texture for each of the objects, and
while coding texture for a first object, evaluating the shape of the first object to determine whether a transformation block in the first object is transparent based on the shape for the first object, and if so, then skipping texture coding for the transformation block; and separately decoding video objects in the sequence of video frames including:
separately decoding shape for each of the objects,
separately decoding texture for each of the objects, and
while decoding texture for a first object, evaluating whether a transformation block in the first object is transparent based on the shape of the first object, and if so, then skipping texture decoding for the transformation block.

2. The method of claim 1 wherein the steps of evaluating the shape are performed repeatedly to identify transparent transformation blocks within the first object and other objects in the sequence of video frames.

3. The method of claim 1 wherein the texture of the first object is intra-frame coded.

4. The method of claim 1 wherein the texture of the first object is inter-frame coded.

5. The method of claim 1 wherein the step of separately encoding video objects includes the following steps:

separately coding motion data for each of the objects,
while coding motion data for a first object, evaluating whether the transformation block is transparent, and if so, then skipping motion coding for the transformation block;

and wherein the step of separately decoding the video objects includes the following steps:
separately coding motion data for each of the objects,
while decoding the motion data for a first object, evaluating whether the transformation block is transparent, and if so, then skipping motion decoding for the transformation block.

6. The method of claim 1 further including:

while coding texture for a transformation block partially covered by the first object, evaluating the shape of the first object to determine whether a subtransformation block in the partially covered transformation block is transparent based on the shape of the first object, and if so, then skipping texture coding for the sub-transformation block.

7. The method of claim 1 further including:

while coding motion for a transformation block partially covered by the first object, evaluating the shape of the first object to determine whether a subtransformation block in the partially covered transformation block is transparent based on the shape of the first object, and if so, then skipping motion coding for the sub-transformation block.

8. The method of claim 1 further including:

while coding texture and motion for a transformation block partially covered by the first object, evaluating the shape of the first object to determine whether a sub-transformation block in the partially covered transformation block is transparent based on the shape of the first object, and if so, then skipping texture and motion coding for the sub- transformation block.

9. The method of claim 8 further including:

if the sub-transformation block is transparent, encoding a motion flag associated with the sub-transformation block indicating that there is no motion data associated with the sub-transformation block, and encoding a texture flag associated with the sub-transformation block indicating that there is no texture data associated with the sub-transformation block; and while decoding the partially covered transformation block, reading the motion flag and the texture flag associated with sub-transformation blocks of the partially covered transformation block to determine whether the partially covered transformation block includes motion or texture data that requires decoding.

10. An object-based video coder for coding objects in a video sequence into a bit stream, where the objects comprise portions of video frames in the video sequence and are each associated with a bounding rectangle that encloses the objects in the video frames, and where the bounding rectangles are divided into transformation blocks, the encoder comprising:

a shape encoder for coding shape of the objects in the video sequence;

a motion encoder for computing motion estimation data for the objects in the video sequence, for computing error values between predicted objects and the objects in the video sequence, and for coding the motion estimation data for transformation blocks covered by the objects;

a texture encoder for encoding pixels comprising the objects for transformation blocks covered by the objects, and in communication with the motion encoder for encoding the error values for the transformation blocks covered by the objects; wherein the texture encoder is operable to read the shape of the objects to identify the transparent transformation blocks and operable to skip the encoding of pixels and error values of the transparent transformation blocks; and a multiplexor in communication with the shape, texture and motion coder for combining encoded shape, motion estimation and texture data into the bitstream.

11. The encoder of claim 10 wherein the motion coder is operable to read the shape of the objects to identify transparent transformation blocks in the bounding rectangles and is operable to skip the coding of motion estimation data for the transparent transformation blocks.

12. The encoder of claim 10 wherein the transformation blocks are divided into sub-transformation blocks, wherein the texture coder is operable to read the shape information of the objects to identify transparent subtransformation blocks, and wherein the texture coder is operable to skip texture coding of the transparent sub-transformation blocks.

13. An object-based video decoder for decoding a bitstream of compressed video objects into objects in a video sequence, where the objects comprise portions of video frames in the video sequence and are each associated with a bounding rectangle that encloses the objects in the video frames, and where the bounding rectangles are divided into transformation blocks, the decoder comprising:

a shape decoder for decoding shape of the compressed objects in the bitstream;

a texture decoder for decoding pixels from the compressed objects, and for decoding the error values for the objects; wherein the texture decoder is operable to read the shape of the objects to identify the transparent transformation blocks and operable to skip the decoding of pixels and error values of the transparent transformation blocks a motion decoder for computing motion estimation data for the objects in the video sequence, for computing error values between predicted objects and the objects in the video sequence, and for coding the motion estimation data for transformation blocks.

14. A computer readable medium on which is stored software for coding video data, which when executed by a computer, perform the steps of:

separately encoding video objects in a sequence of video frames including:
separately coding shape for each of the objects,
separately coding texture for each of the objects, and
while coding texture for a first object, evaluating whether a transformation block is covered by the shape of the first object based on the shape for the first object, and if not, then skipping texture coding for the transformation block.

15. In an object-based video coding method, a method for reducing coding overhead comprising:

separately encoding video objects in a sequence of video frames including:
encoding shape for each of the objects, including performing motion compensation on at least a first partially transparent transformation block in a first object,
setting a block transparency status flag corresponding to an entirely transparent sub-transformation block in the partially transparent transformation block,
encoding motion data for at least the first object, and
encoding texture for each of the objects; and separately decoding video objects in the sequence of video frames including:
decoding motion data for at least the first object, including evaluating the block transparency flag, and skipping motion decoding for the entirely transparent sub-transformation block;
decoding shape for each of the objects,
decoding texture for each of the objects, and
reconstructing the sequence of video frames from the decoded shape, motion and texture data.

16. The method of claim 15 wherein the step of separately encoding video objects includes:

encoding shape, texture, and motion vectors in transformation blocks for each of a plurality of the objects in the video sequence, wherein at least some of the transformation blocks are partially transparent transformation blocks;

setting a block transparency status flag associated with sub-transformation blocks within the partially transparent transformation blocks to indicate which sub-transformation blocks within the partially transparent transformation blocks, if any, are entirely transparent; and wherein the step of separately decoding the video objects includes:

evaluating the block transparency status flags for the partially transparent transformation blocks; and skipping decoding of the motion vectors for sub-transformation blocks for which a corresponding block transparency flag is set.

17. In an object-based video coding method, a method for reducing coding overhead comprising:

separately encoding video objects in a sequence of video frames including:
separately encoding shape for each of the objects,
separately encoding texture for each of the objects, and
while coding texture for a transformation block partially covered by a first object, evaluating the shape of the first object to determine whether a sub-transformation block in the partially covered transformation block is transparent based on the shape of the first object, and if so, then skipping texture coding for the sub-transformation block and encoding a coded block pattern bit or bits only for non-transparent sub-transformation blocks in the partially covered transformation block; and separately decoding video objects in the sequence of video frames including:
separately decoding shape for each of the objects,
separately decoding texture for each of the objects, and
while decoding texture for a transformation block partially covered by the first object, evaluating the shape of the first object to determine whether a sub-transformation block in the partially covered transformation block is transparent based on the shape of the first object, and if so, then skipping texture decoding for the sub-transformation block.

18. The method of claim 17 wherein coded block pattern bit or bits comprise a variable length code selected from one of three variable length code tables where each of the variable length code tables correspond to the number of non-transparent sub-transformation blocks in the transformation block.

* * * * *

UNITED STATES PATENT AND TRADEMARK OFFICE
CERTIFICATE OF CORRECTION

PATENT NO. : 5,748,789

DATED : May 5, 1998

INVENTOR(S) : Lee et al.

It is certified that error appears in the above-identified patent and that said Letters Patent is hereby corrected as shown below:

Column 1, line 21, "a fill-length" should read --a full-length--.

Column 14, line 58, "$r'_{ij}, g'_{ij},$ and $b'_{ij}$" should read --$r_{ij}, g_{ij},$ and $b_{ij}$--.

Column 15, line 10, "and $y'_1$" should read -- and $y'_i$ --.

Column 18, line 54, "$(x_i, y_i,)$" should read --$(x_i, y_i)$--.

Column 21, line 31, "$(x_i, y_i)$" should read --$(x_1, y_1)$--.

Column 21, line 54, "$x'_1 = ax_i + C$" should read --$x'_i = ax_i + C$--.

Column 21, line 61, "$x = a\cos\theta x + \sin\theta y + c$" should read --$x' = a\cos\theta x + \sin\theta y + c$--.

Column 21, line 62, "$y = \sin\theta x + a + \cos\theta y + f$" should read --$y' = \sin\theta x + a + \cos\theta y + f$--.

Column 25, line 6, "is that is" should read --is that it--.

Column 25, line 7 "-padded padded" should read -- -padded--.

Column 27, line 11, "component 10" should read --component $I_0$--.

Column 28, line 17, "vidoe" should read --video--.

Column 29, line 10, between "processes" and "video" please insert --such as MPEG-1, MPEG-2, and H.26X, the decompression or decoding of the--

Column 30, line 17, "Chanin Encoding" should read --Chain Encoding--

Column 32, line 16, "Huffinan" should read --Huffman--.

Column 32, line 20, "Huffinan" should read --Huffman--.

Column 32, line 21, "Huffinan" should read --Huffman--.

UNITED STATES PATENT AND TRADEMARK OFFICE
CERTIFICATE OF CORRECTION

PATENT NO. : 5,748,789
DATED : May 5, 1998
INVENTOR(S) : Lee et al.

It is certified that error appears in the above-identified patent and that said Letters Patent is hereby corrected as shown below:

Column 32, line 26, "Huffinan" should read --Huffman--.
Column 32, line 27, "Huffinan" should read --Huffman--.
Column 33, line 56, "the defines" should read --that defines--.
Column 35, line 9, "is stored the☐" should read --is stored in the--.
Column 36, line 31, "succeeding 30 bitmap" should read --succeeding bitmap--.
Column 36, line 49, "Arbitraty" should read --Arbitrary--.
Column 38, line 52, "a provide" should read --and provide--.
Column 39, line 43, "formal☐ should read --format--.
Column 47, line 38, "block rather basis as well" should read --block by block basis as well--.
Column 47, line 40, "coding an" should read --coding and--.
Column 48, line 64, "1790." should read --1790).--.
Column 49, line 51, "The macroblock at issue is a partially covered (i.e., partially transparent)." should read --The macroblock at issue is partically covered (i.e., partially transparent).--.

In the Claims:

Column 56, line 24, "blocks" should read --blocks;--.

Signed and Sealed this

Twenty-first Day of September, 1999

*Attest:*

Q. TODD DICKINSON

*Attesting Officer*    Acting Commissioner of Patents and Trademarks